United States Patent
Pinnau et al.

(10) Patent No.: US 6,361,582 B1
(45) Date of Patent: Mar. 26, 2002

(54) GAS SEPARATION USING $C_{3+}$ HYDROCARBON-RESISTANT MEMBRANES

(75) Inventors: Ingo Pinnau, Palo Alto; Zhenjie He, Fremont; Andre R. Da Costa, Palo Alto; Karl D. Amo, Mountain View; Ramin Daniels, San Jose, all of CA (US)

(73) Assignee: Membrane Technology and Research, Inc., Menlo Park, CA (US)

( * ) Notice: Subject to any disclaimer, the term of this patent is extended or adjusted under 35 U.S.C. 154(b) by 0 days.

(21) Appl. No.: 09/574,303

(22) Filed: May 19, 2000

(51) Int. Cl.⁷ .......................... B01D 53/22; B01D 71/36
(52) U.S. Cl. ................. 95/45; 95/47; 95/50; 95/51; 95/55
(58) Field of Search ............... 95/45, 47–55; 96/4, 13, 14

(56) References Cited

U.S. PATENT DOCUMENTS

| | | | |
|---|---|---|---|
| 3,133,132 A | 5/1964 | Loeb et al. ................. 264/49 |
| 3,308,107 A | 3/1967 | Selman et al. ............ 260/87.5 |
| 3,488,335 A | 1/1970 | Braun ..................... 260/88.3 |
| 3,651,618 A | * 3/1972 | Klein et al. ............... 95/55 X |
| 3,798,185 A | 3/1974 | Skiens et al. .............. 260/2.5 |
| 3,865,845 A | 2/1975 | Resnick ................. 260/340.9 |
| 4,230,463 A | 10/1980 | Henis et al. ................. 55/16 |
| 4,243,701 A | 1/1981 | Riley et al. ............... 427/244 |
| 4,399,264 A | 8/1983 | Squire .................... 526/247 |
| 4,431,786 A | 2/1984 | Squire .................... 526/247 |
| 4,548,619 A | * 10/1985 | Steacy ....................... 95/55 |
| 4,565,855 A | 1/1986 | Anderson et al. ......... 526/247 |
| 4,594,399 A | 6/1986 | Anderson et al. ......... 526/247 |
| 4,654,063 A | * 3/1987 | Auvil et al. ............. 95/55 X |
| 4,754,009 A | 6/1988 | Squire .................... 526/247 |
| 4,863,761 A | 9/1989 | Puri ....................... 427/175 |
| 4,880,442 A | 11/1989 | Hayes ....................... 55/16 |
| 4,892,564 A | * 1/1990 | Cooley ....................... 95/55 |
| 4,897,457 A | 1/1990 | Nakamura et al. ......... 526/247 |
| 4,910,276 A | 3/1990 | Nakamura et al. ......... 526/247 |
| 5,021,602 A | 6/1991 | Clement et al. ........... 558/230 |
| 5,051,114 A | 9/1991 | Nemser et al. ............... 55/16 |
| 5,117,272 A | 5/1992 | Nomura et al. ............ 357/52 |
| 5,141,642 A | 8/1992 | Kusuki et al. ............. 210/490 |
| 5,156,888 A | 10/1992 | Haubs et al. .............. 427/163 |
| 5,242,636 A | 9/1993 | Sluma et al. ............ 264/45.8 |
| 5,268,411 A | 12/1993 | Yokotsuka et al. .......... 524/462 |
| 5,288,304 A | * 2/1994 | Koros et al. .................. 95/45 |
| 5,318,417 A | 6/1994 | Kopp et al. .................. 425/97 |
| 5,407,466 A | 4/1995 | Lokhandwala et al. ......... 95/49 |
| 5,498,682 A | 3/1996 | Navarrini et al. ........... 526/247 |
| 5,507,860 A | * 4/1996 | Rao et al. .................. 95/55 X |
| 5,510,406 A | 4/1996 | Matsuo et al. ............. 524/237 |
| 5,710,345 A | 1/1998 | Navarrini et al. ........... 568/596 |
| 5,772,733 A | * 6/1998 | Lokhandwala et al. ..... 95/50 X |
| 5,779,763 A | * 7/1998 | Pinnau et al. .............. 95/55 X |
| 5,883,177 A | 3/1999 | Colaianna et al. .......... 524/462 |
| 5,962,612 A | 10/1999 | Takakura et al. ........... 526/249 |
| 6,011,192 A | 1/2000 | Baker et al. ............... 585/818 |
| 6,040,419 A | 3/2000 | Drysdale ................... 528/408 |
| 6,053,965 A | * 4/2000 | Lokhandwala ............. 95/50 X |
| 6,128,919 A | * 10/2000 | Daus et al. ................ 95/51 X |
| 6,161,386 A | * 12/2000 | Lokhandwala ............. 95/50 X |

FOREIGN PATENT DOCUMENTS

| | | | |
|---|---|---|---|
| EP | 0649676 | 4/1995 | ........... B01D/67/00 |

OTHER PUBLICATIONS

I. Pinnau et al., "Gas and Vapor Transporte Properties of Amorphous Perfluorinated Copolymer Membranes . . . ,"*J. Membrane Science*, 109, p. 125–133 (1996).

A. Alentiev et al., "High Transport Parameters and Free Volume of Perfluorodioxole Copolymers," J. Membrane Science, 126, p. 123–132 (1997).

V. Arcella et al., "A Study on a Perfluoropolymer Purification and Its Application to Membrane Formation," *J. Membrane Science*, 163, p. 203–209 (1999).

J. Henis, "Chapter 10—Commercial and Practical Aspects of Gas Separation Membranes," in *Polymeric Gas Separation Membranes*, Paul and Yampol'skii (eds.), CRC Press (1994).

S. Ando et al., "Perfluorinated Polymers for Optical Waveguides," Chemtech, Dec. 1994, p. 20–27.

* cited by examiner

Primary Examiner—Robert H. Spitzer
(74) Attorney, Agent, or Firm—J. Farrant

(57) ABSTRACT

A process for separating a gas from a gas mixture containing the gas and a $C_{3+}$ hydrocarbon vapor, using gas-separation membranes selective for the gas over the $C_{3+}$ hydrocarbon vapor. The membranes use a selective layer made from a polymer having repeating units of a fluorinated polymer, and demonstrate good resistance to plasticization by the organic components in the gas mixture under treatment, and good recovery after exposure to liquid aromatic hydrocarbons.

47 Claims, 23 Drawing Sheets

GAS SEPARATION USING $C_{3+}$ HYDROCARBON-RESISTANT MEMBRANES

FIELD OF THE INVENTION

The invention relates to the separation of gases from hydrocarbon gas mixtures, such separations including hydrogen from hydrocarbons, carbon dioxide from hydrocarbons, and hydrocarbons from one another. The separation is carried out using hydrocarbon-resistant membranes, and is useful in refineries, petrochemical plants, natural gas fields and the like.

BACKGROUND OF THE INVENTION

Polymeric gas-separation membranes are well known and are in use in such areas as production of oxygen-enriched air, production of nitrogen from air, separation of carbon dioxide from methane, hydrogen recovery from various gas mixtures and removal of organic vapors from air or nitrogen.

The preferred membrane for use in any gas-separation application combines high selectivity with high flux. Thus, the membrane-making industry has engaged in an ongoing quest for polymers and membranes with improved selectivity/flux performance. Many polymeric materials are known that offer intrinsically attractive properties. That is, when the permeation performance of a small film of the material is measured under laboratory conditions, using pure gas samples and operating at modest temperature and pressure conditions, the film exhibits high permeability for some pure gases and low permeability for others, suggesting useful separation capability.

Unfortunately, gas separation in an industrial plant is seldom so simple. The gas mixtures to which the separation membranes are exposed may be hot, contaminated with solid or liquid particles, or at high pressure, may fluctuate in composition or flow rate or, more likely, may exhibit several of these features. Even in the most straightforward situation possible, where the gas stream to be separated is a two-component mix, uncontaminated by other components, at ambient temperature and moderate pressure, one component may interact with the membrane in such a way as to change the permeation characteristics of the other component, so that the separation factor or selectivity suggested by the pure gas measurements cannot be achieved. In gas mixtures that contain condensable components, it is frequently, although not always, the case that the mixed gas selectivity is lower, and at times considerably lower, than the ideal selectivity. The condensable component, which is readily sorbed into the polymer matrix, swells or, in the case of a glassy polymer, plasticizes the membrane, thereby reducing its selective capabilities. A technique for predicting mixed gas performance under real conditions from pure gas measurements with any reliability has not yet been developed.

A good example of these performance problems is the separation of hydrogen from mixtures containing hydrogen, methane and other hydrocarbons. Increasing reliance on low-hydrogen, high-sulfur crudes, coupled with tighter environmental regulations, has raised hydrogen demand in refineries. This is primarily due to increased hydrodesulfurization and hydrocracking; as a result many refineries are now out of balance with respect to hydrogen supply. At the same time, large quantities of hydrogen-containing off-gas from refinery processes are currently rejected to the refinery's fuel gas systems. Besides being a potential source of hydrogen, these off-gases contain hydrocarbons of value, for example, as liquefied petroleum gas (LPG) and chemical feedstocks.

The principal technologies available to recover hydrogen from these off-gases are cryogenic separation, pressure swing adsorption (PSA), and membrane separation. Membrane gas separation, the newest, is based on the difference in permeation rates of gas components through a selective membrane. Many membrane materials are much more permeable to hydrogen than to other gases and vapors. One of the first applications of gas separation membranes was recovery of hydrogen from ammonia plant purge streams, which contain hydrogen and nitrogen. This is an ideal application for membrane technology, because the membrane selectivity is high, and the feed gas is clean (free of contaminants, such as heavier hydrocarbons). Another successful application is to adjust hydrogen/carbon monoxide or hydrogen/methane ratios for synthesis gas production. Again, the feed gas is free of heavy hydrocarbon compounds.

Application of membranes to refinery separation operations has been much less successful. Refinery gas streams contain contaminants such as water vapor, acid gases, olefins, aromatics, and other hydrocarbons. At relatively low concentrations, these contaminants cause membrane plasticization and loss of selectivity. At higher concentrations they can condense on the membrane and cause irreversible damage to it. When a feedstream containing such components and hydrogen is introduced into a membrane system, the hydrogen is removed from the feed gas into the permeate and the gas remaining on the feed side becomes progressively enriched in hydrocarbons, raising the dewpoint. For example, if the total hydrocarbon content increases from 60% in the feed gas to 85% in the residue gas, the dewpoint may increase by as much as 25° C. or more, depending on hydrocarbon mix. Maintaining this hydrocarbon-rich mixture as gas may require it to be maintained at high temperature, such as 60° C., 70° C., 80° C. or even higher, which is costly and may itself eventually adversely affect the mechanical integrity of the membrane. Failure to do this means the hydrocarbon stream may enter the liquid-phase region of the phase diagram before it leaves the membrane module, and condense on the membrane surface, damaging it beyond recovery. Even if the hydrocarbons are kept in the gas phase, separation performance may fall away completely in the presence of hydrocarbon-rich mixtures. These issues are discussed, for example, in J. M. S. Henis, "Commercial and Practical Aspects of Gas Separation Membranes" Chapter 10 of D. R. Paul and Y. P. Yampol'skii, *Polymeric Gas Separation Membranes*, CRC Press, Boca Raton, 1994. This reference gives upper limits on various contaminants in streams to be treated by polysulfone membranes of 50 psi hydrogen sulfide, 5 psi ammonia, 10% saturation of aromatics, 25% saturation of olefins and 11° C. above paraffin dewpoint (pages 473–474).

A great deal of research has been performed on improved membrane materials for hydrogen separation. A number of these materials appear to have significantly better properties than the original cellulose acetate or polysulfone membranes. For example, modem polyimide membranes have been reported with selectivity for hydrogen over methane of 50 to 200, as in U.S. Pat. Nos. 4,880,442 and 5,141,642. Unfortunately, these materials appear to remain susceptible to severe loss of performance through plasticization and to catastrophic collapse if contacted by liquid hydrocarbons. Several failures have been reported in refinery applications where these conditions occur. This low process reliability has caused a number of process operators to discontinue applications of membrane separation for hydrogen recovery.

Another example of an application in which membranes have difficulty delivering and maintaining adequate performance is the removal of carbon dioxide from natural gas.

Natural gas provides more than one-fifth of all the primary energy used in the United States, but much raw gas is "subquality", that is, it exceeds the pipeline specifications in nitrogen, carbon dioxide and/or hydrogen sulfide content. In particular, about 10% of gas contains excess carbon dioxide. Membrane technology is attractive for removing this carbon dioxide, because many membrane materials are very permeable to carbon dioxide, and because treatment can be accomplished using the high wellhead gas pressure as the driving force for the separation. However, carbon dioxide readily sorbs into and interacts strongly with many polymers, and in the case of gas mixtures such as carbon dioxide/methane with other components, the expectation is that the carbon dioxide at least will have a swelling or plasticizing effect, thereby adversely changing the membrane permeation characteristics. These issues are again discussed in the Henis reference cited above.

In the past, cellulose acetate, which can provide a carbon dioxide/methane selectivity of about 10–20 in gas mixtures at pressure, has been the membrane material of choice for this application, and about 100 plants using cellulose acetate membranes are believed to have been installed. Nevertheless, cellulose acetate membranes are not without problems. Natural gas often contains substantial amounts of water, either as entrained liquid, or in vapor form, which may lead to condensation within the membrane modules. However, contact with liquid water can cause the membrane selectivity to be lost completely, and exposure to water vapor at relative humidities greater than about 20–30% can cause irreversible membrane compaction and loss of flux. The presence of hydrogen sulfide in conjunction with water vapor is also damaging, as are high levels of $C_{3+}$ hydrocarbons. These issues are discussed in more detail in U.S. Pat. No. 5,407,466, columns 2–6, which patent is incorporated herein by reference.

Yet another challenging area is the separation of mixtures of light hydrocarbon vapors. For example, olefins, particularly ethylene and propylene, are important chemical feedstocks. About 17.5 million tons of ethylene and 10 million tons of propylene are produced in the United States annually, much as a by-product of petrochemical processing. Before they can be used, the raw olefins must be separated from mixtures containing saturated hydrocarbons and other components. Currently, separation of olefin/paraffin mixtures is usually carried out by distillation. The low relative volatilities of the components make this process costly and complicated; distillation columns are typically up to 300 feet tall and the process is very energy-intensive. More economical separation processes are needed. Using a membrane to separate olefins from paraffins is an alternative to distillation that has been considered. However, the separation is difficult because of the similar molecular sizes and condensabilities of the components, as well as the challenge of operating the membranes in a hydrocarbon-rich environment, and no material that can provide adequate performance with real vapor mixtures under pressure has been found.

Thus, the need remains for membranes that will provide and maintain adequate performance under the conditions of exposure to hydrocarbons, and particularly $C_{3+}$ hydrocarbons, that are commonplace in refineries, chemical plants, or gas fields.

Films or membranes made from fluorinated polymers having a ring structure in the repeat unit are known. For example:

1. U.S. Pat. Nos. 4,897,457 and 4,910,276, both to Asahi Glass, disclose various perfluorinated polymers having repeating units of perfluorinated cyclic ethers, and cite the gas-permeation properties of certain of these, as in column 8, lines 48–60 of 4,910,276.

2. A paper entitled "A study on perfluoropolymer purification and its application to membrane formation"(V. Arcella et al., Journal of Membrane Science, Vol. 163, pages 203–209 (1999)) discusses the properties of membranes made from a copolymer of tetrafluoroethylene and a dioxole. Gas permeation data for various gases are cited.

3. European Patent Application 0 649 676 A1, to L'Air Liquide, discloses post-treatment of gas separation membranes by applying a layer of fluoropolymer, such as a perfluorinated dioxole, to seal holes or other defects in the membrane surface.

4. U.S. Pat. No. 5,051,114, to Du Pont, discloses gas separation methods using perfluoro-2,2-dimethyl-1,3-dioxole polymer membranes. This patent also discloses comparative data for membranes made from perfluoro(2-methylene-4-methyl- 1,3-dioxolane) polymer (Example XI).

5. A paper entitled "Gas and vapor transport properties of amorphous perfluorinated copolymer membranes based on 2,2-bistrifluoromethyl-4,5-difluoro- 1,3-dioxole/tetrafluoroethylene" (I.Pinnau et al., Journal of Membrane Science, Vol. 109, pages 125–133 (1996)) discusses the free volume and gas permeation properties of fluorinated dioxole/tetrafluoroethylene copolymers compared with substituted acetylene polymers. This reference also shows the susceptibility of this dioxole polymer to plasticization by organic vapors and the loss of selectivity as vapor partial pressure in a gas mixture increases (FIGS. 3 and 4).

Most of the data reported in the prior art references listed above are for permanent gases, carbon dioxide and methane, and refer only to measurements made with pure gases. The data reported in item 5 indicate that even these fluorinated polymers, which are characterized by their chemical inertness, appear to be similar to conventional hydrogen-separating membranes in their inability to withstand exposure to propane and heavier hydrocarbons.

SUMMARY OF THE INVENTION

The invention is a process for separating a gas from a gas mixture containing a $C_{3+}$ hydrocarbon vapor. The separation is carried out by running a stream of the gas mixture across a membrane that is selective for the desired gas to be separated over the $C_{3+}$ hydrocarbon vapor. The process results, therefore, in a permeate stream enriched in the desired gas and a residue stream depleted in that gas. The process differs from processes previously available in the art in that:

(i) the membranes are able to maintain useful separation properties in the presence of $C_{3+}$ hydrocarbon vapor at high levels in the gas mixture, and (ii) the membranes can recover from accidental exposure to liquid organic compounds.

To quantify these attributes, the membranes used in the process of the invention are characterized in terms of their selectivity before and after exposure to liquid hydrocarbons. Specifically, the membranes have a post-exposure selectivity for the desired gas over the $C_{3+}$ hydrocarbon vapor, after exposure of the separation membrane to a liquid hydrocarbon, for example, toluene, and subsequent drying, that is at least about 60%, 65% or even 70% of a pre-exposure selectivity for the desired gas over the $C_{3+}$ hydrocarbon vapor, the pre- and post-exposure selectivities being measured with a test gas mixture of the same composition and under like conditions.

At least the selective layer responsible for the gas discriminating properties of the membranes is made from an amorphous glassy polymer or copolymer. The polymer is fluorinated, generally heavily fluorinated, by which we mean having a fluorine:carbon ratio of atoms in the polymer of at least about 1:1. Preferably, the polymer is perfluorinated. Typically, the polymer is further characterized by a fractional free volume no greater than about 0.3 and by a glass transition temperature, Tg, of at least about 100° C.

In a basic embodiment, the process of the invention includes the following steps:

(a) passing a gas mixture comprising a desired gas and a $C_{3+}$ hydrocarbon vapor across the feed side of a separation membrane having a feed side and a permeate side, the separation membrane having a selective layer comprising a polymer having:
   (i) a ratio of fluorine to carbon atoms in the polymer greater than 1:1;
   (ii) a fractional free volume no greater than about 0.3; and
   (iii) a glass transition temperature of at least about 100° C.; and the separation membrane being characterized by a post-exposure selectivity for the desired gas over the $C_{3+}$ hydrocarbon vapor, after exposure of the separation membrane to liquid toluene and subsequent drying, that is at least about 65% of a pre-exposure selectivity for the desired gas over the $C_{3+}$ hydrocarbon vapor, as measured pre- and post-exposure with a test gas mixture of the same composition and under like conditions;

(b) providing a driving force for transmembrane permeation;

(c) withdrawing from the permeate side a permeate stream enriched in the desired gas compared to the gas mixture;

(d) withdrawing from the feed side a residue stream depleted in the desired gas compared to the gas mixture.

The permeating desired gas may be either a valuable gas that it is desired to retrieve as an enriched product, or a contaminant that it is desired to remove. Thus either the permeate stream or the residue stream, or both, may be the useful products of the process. Gases that may be separated from $C_{3+}$ hydrocarbons by the process include, but are not limited to, hydrogen, nitrogen, oxygen, air, argon, carbon dioxide, methane, ethane, light olefins and light hydrocarbon isomers. Examples of $C_{3+}$ hydrocarbon vapors from which the gas may be separated include, but are not limited to paraffins, both straight and branched, for example, propane, butanes, pentanes, hexanes; olefins and other aliphatic unsaturated organics, for example, propylene, butene; aromatic hydrocarbons, for example, benzene, toluene, xylenes; vapors of halogenated solvents, for example, methylene chloride, perchloroethylene; alcohols; ketones; and diverse other volatile organic compounds.

Various materials may be used for the polymeric selective layer to meet the characterizing requirements. These include, but are not limited to:

(i) polymers comprising a fluorinated dioxole monomer;
(ii) polymers comprising a fluorinated dioxolane monomer;
(iii) polymers comprising a fluorinated alkyl ether monomer;
(iv) perfluorinated polyimides;
(v) amorphous copolymers of tetrafluoroethylene.

Particularly preferred materials for the selective layer of the membrane used to carry out the process of the invention are copolymers of a fluorinated dioxole with tetrafluoroethylene. A specific most preferred material is such a copolymer having the structure:

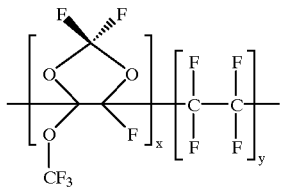

where x and y represent the relative proportions of the dioxole and the tetrafluoroethylene blocks, such that x+y=1.

Contrary to what would be expected from the data presented in the Pinnau et al. *Journal of Membrane Science* paper, we have unexpectedly found that membranes formed from such fluorinated dioxole/tetrafluoroethylene copolymers can withstand exposure to $C_{3+}$ hydrocarbons well enough to provide useful separation capability for gas mixtures that include $C_{3+}$ hydrocarbons. This resistance persists even when the $C_{3+}$ hydrocarbons are present at high levels, such as 5%, 10%, 15% or even more.

A particularly important advantage of the invention is that the membranes can retain selectivity for desired gases, such as hydrogen, nitrogen, carbon dioxide, methane, or light olefin, even in the presence of streams rich in, or even essentially saturated with, $C_{3+}$ hydrocarbons. This distinguishes these membrane materials from all other membrane materials previously used commercially for such separations. Membranes made from fluorinated dioxoles have been believed previously to behave like conventional membrane materials in suffering from debilitating plasticization in a hydrocarbon containing environment, to the point that they may even become selective for hydrocarbons over permanent gas even at moderate $C_{3+}$ hydrocarbon partial pressures. We have discovered that this is not the case for the membranes taught herein. This unexpected result is achieved because the membranes used in the invention are unusually resistant to plasticization by hydrocarbon vapors.

The membranes are also resistant to contact with liquid hydrocarbons, in that they are able to retain their selectivity for hydrogen over methane after transient or even prolonged exposure to liquid aromatics, for example. This is a second beneficial characteristic that differentiates the processes of the invention from prior art processes. In the past, exposure of the membranes to liquid hydrocarbons frequently meant that the membranes were irreversibly damaged and had to be removed and replaced.

These unexpected and unusual attributes render the process of the invention useful in situations where it was formerly difficult or impractical for membrane separation to be used, or where membrane lifetimes were poor.

Because the preferred polymers are glassy and rigid, an unsupported film of the polymer may be usable in principle as a single-layer gas separation membrane. However, such layer will normally be far too thick to yield acceptable transmembrane flux, and in practice, the separation membrane usually comprises a very thin selective layer that forms part of a thicker structure, such as an asymmetric membrane or a composite membrane. The making of these types of membranes is well known in the art. If the membrane is a composite membrane, the support layer may optionally be made from a fluorinated polymer also, making the membrane a totally fluorinated structure and enhancing chemical resistance. The membrane may take any form, such as hollow fiber, which may be potted in cylindrical bundles, or flat sheets, which may be mounted in plate-and-frame modules or formed into spiral-wound modules.

The driving force for permeation across the membrane is the pressure difference between the feed and permeate sides, which can be generated in a variety of ways. The pressure difference may be provided by compressing the feedstream, drawing a vacuum on the permeate side, or a combination of both. The membrane is able to tolerate high feed pressures, such as above 200 psia, 300 psia, 400 psia or more. As mentioned above, the membrane is able to operate satisfactorily in the presence of $C_{3+}$ hydrocarbons at high levels. Thus, the partial pressures of the hydrocarbons in the feed may be close to saturation. For example, depending on the mix of hydrocarbons and the temperature of the gas, the aggregate partial pressure of all $C_{3+}$ hydrocarbons in the gas might be as much as 10 psia, 15 psia, 25 psia, 50 psia, 100 psia, 200 psia or more. Expressed as a percentage of the saturation vapor pressure at that temperature, the partial pressure of hydrocarbons, particularly $C_{3+}$ hydrocarbons, may be 20%, 30%, 50% or even 70% or more of saturation.

The membrane separation process may be configured in many possible ways, and may include a single membrane unit or an array of two or more units in series or cascade arrangements. The processes of the invention also include combinations of the membrane separation process defined above with other separation processes, such as adsorption, absorption, distillation, condensation or other types of membrane separation.

In another aspect, the invention is a process for separating hydrogen from hydrocarbons in a multicomponent mixture containing at least hydrogen and one or more $C_{3+}$ hydrocarbon vapors. Such a mixture might typically, but not necessarily, be found as a petrochemical plant or a refinery process or waste stream, such as streams from reformers, crackers, hydroprocessors and the like.

The process involves running a stream containing hydrogen across the feed side of a membrane that is selectively permeable to the hydrogen over the hydrocarbons in the stream. The hydrogen is concentrated in the permeate stream; the residue stream is thus correspondingly depleted of hydrogen. The process can separate hydrogen from methane, hydrogen from $C_{2+}$ hydrocarbons, hydrogen from $C_{3+}$ hydrocarbon vapors, or any combination of these.

In a basic embodiment, the process of the invention includes the following steps:

(a) passing a gas mixture comprising hydrogen and a $C_{3+}$ hydrocarbon vapor across the feed side of a separation membrane having a feed side and a permeate side, the separation membrane having a selective layer comprising a polymer having:
(i) a ratio of fluorine to carbon atoms in the polymer greater than 1:1;
(ii) a fractional free volume no greater than about 0.3; and
(iii) a glass transition temperature of at least about 100° C.; and the separation membrane being characterized by a post-exposure selectivity for hydrogen over the $C_{3+}$ hydrocarbon vapor, after exposure of the separation membrane to liquid toluene and subsequent drying, that is at least about 65% of a pre-exposure selectivity for hydrogen over the $C_{3+}$ hydrocarbon vapor, as measured pre- and post-exposure with a test gas mixture of the same composition and under like conditions;

(b) providing a driving force for transmembrane permeation;

(c) withdrawing from the permeate side a permeate stream enriched in hydrogen compared to the gas mixture;

(d) withdrawing from the feed side a residue stream depleted in hydrogen compared to the gas mixture.

The process differs from previous hydrogen/hydrocarbon separation processes in the nature of the membrane that is used. The membranes are, as described above, able to maintain useful separation properties in the presence of organic vapors at high activity, and able to recover from accidental exposure to liquid hydrocarbons.

The scope of the invention in this aspect is not intended to be limited to any particular gas streams, but to encompass any situation where a gas stream containing hydrogen and hydrocarbon gas is to be separated. The composition of the gas may vary widely, from a mixture that contains minor amounts of hydrogen in admixture with various hydrocarbon components, including relatively heavy hydrocarbons, such as $C_5$–$C_8$ hydrocarbons or heavier, to a mixture of mostly hydrogen, such as 80% hydrogen, 90% hydrogen or above, with methane and other very light components.

The process of the invention typically provides a selectivity, in mixtures containing multiple hydrocarbons including a $C_{3+}$ hydrocarbon, for hydrogen over methane of at least about 10, for hydrogen over propane of at least about 50, and for hydrogen over n-butane of at least about 100. Frequently, the hydrogen/methane selectivity achieved is 20 or more, even in the presence of significant concentrations of $C_{3+}$ hydrocarbons.

In yet another aspect, the invention is a process for separating olefins from paraffins, particularly propylene from propane. Such mixtures are found as olefin manufacturing effluent streams, and in various petrochemical plant streams, for example.

The process involves running a stream comprising propylene and propane across the feed side of a membrane that is selectively permeable to propylene. The propylene is concentrated in the permeate stream; the residue stream is thus correspondingly depleted of propylene.

In a basic embodiment, the process of the invention includes the following steps:

(a) passing a gas mixture comprising propylene and propane across the feed side of a separation membrane having a feed side and a permeate side, the membrane having a selective layer comprising a polymer having:
(i) a ratio of fluorine to carbon atoms in the polymer greater than 1:1;
(ii) a fractional free volume no greater than about 0.3; and
(iii) a glass transition temperature of at least about 100° C.; and the separation membrane being characterized by a post-exposure selectivity for propylene over propane, after exposure of the separation membrane to liquid toluene and subsequent drying, that is at least about 65% of a pre-exposure selectivity for propylene over propane as measured pre- and post-exposure with a test gas mixture of the same composition and under like conditions;

(b) providing a driving force for transmembrane permeation;

(c) withdrawing from the permeate side a permeate stream enriched in propylene compared to the gas mixture;

(d) withdrawing from the feed side a residue stream depleted in propylene compared to the gas mixture.

The process typically provides a propylene/propane selectivity of at least about 2.5, and more preferably at least about 3, which can be sustained, even with streams composed entirely of $C_{3+}$ hydrocarbons, over a range of pressures.

In yet another aspect, the invention is a process for separating carbon dioxide from methane and other hydrocarbons. Such a mixture might be encountered during the processing of natural gas, of associated gas from oil wells, or of certain petrochemical streams, for example.

The process involves running a stream containing carbon dioxide across the feed side of a membrane that is selectively permeable to the carbon dioxide over methane and the other hydrocarbons in the stream. The carbon dioxide is concentrated in the permeate stream; the residue stream is thus correspondingly depleted of carbon dioxide.

The process of the invention typically provides a selectivity, in mixtures containing multiple hydrocarbons including a $C_{3+}$ hydrocarbon, for carbon dioxide over methane of at least about 5, even at high carbon dioxide activity. Frequently, the carbon dioxide/methane selectivity achieved is 10 or more, and may be as much as 15 or more, even in the presence of significant concentrations of $C_{2+}$ hydrocarbons.

Other separation processes that can be carried out within the scope of the invention include, but are not limited to, separation of other permanent gases, for example, nitrogen, oxygen, air or argon, from organics; separation of methane from $C_{3+}$ organics; and separation of isomers from one another.

It is an object of the present invention to provide a membrane-based process for separation of gases from gas mixtures containing $C_{3+}$ hydrocarbon vapors. Additional objects and advantages of the invention will be apparent from the description below to those of ordinary skill in the art.

It is to be understood that the above summary and the following detailed description are intended to explain and illustrate the invention without restricting its scope.

DETAILED DESCRIPTION OF THE INVENTION

Figure 1:
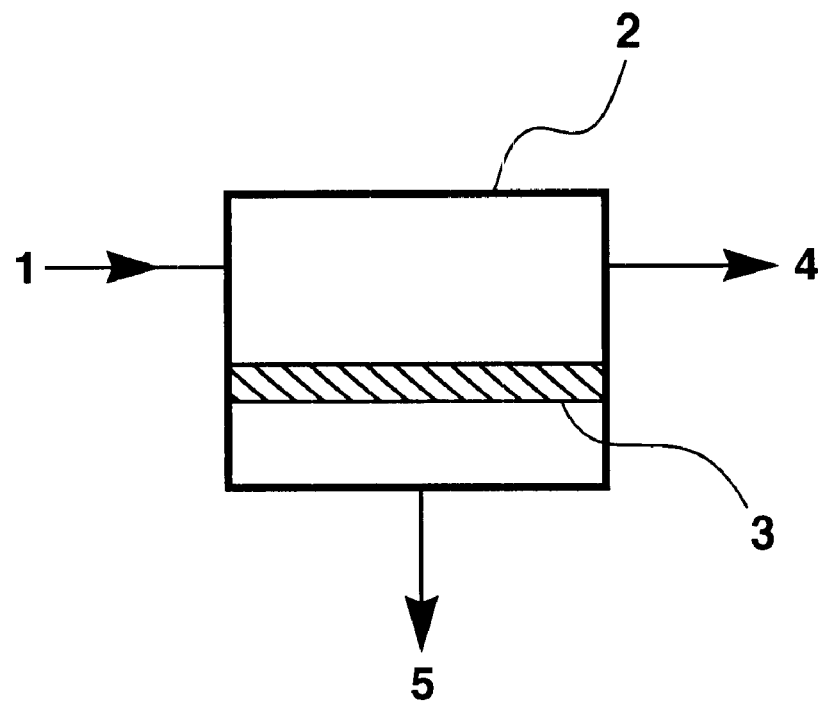
FIG. 1 is a schematic representation of the process of the invention in its most basic form.

The term gas as used herein means a gas or a vapor.

The terms hydrocarbon and organic vapor or organic compound are used interchangeably herein, and include, but are not limited to, saturated and unsaturated compounds of hydrogen and carbon atoms in straight chain, branched chain and cyclic configurations, including aromatic configurations, as well as compounds containing oxygen, nitrogen, halogen or other atoms.

The term $C_{2+}$ hydrocarbon means a hydrocarbon having at least two carbon atoms; the term $C_{3+}$ hydrocarbon means a hydrocarbon having at least three carbon atoms; and so on.

The term light hydrocarbon means a hydrocarbon molecule having no more than about six carbon atoms.

The term heavier hydrocarbon means a $C_{3+}$ hydrocarbon.

All percentages herein are by volume unless otherwise stated.

The invention is a process for separating a gas from a gas mixture containing a $C_{3+}$ hydrocarbon vapor. The separation is carried out by running a stream of the gas mixture across a membrane that is selective for the desired gas to be separated over the $C_{3+}$ hydrocarbon vapor. The process results, therefore, in a permeate stream enriched in the desired gas and a residue stream depleted in that gas.

In a basic embodiment, the process of the invention includes the following steps:

(a) passing a gas mixture comprising a desired gas and a $C_{3+}$ hydrocarbon vapor across the feed side of a separation membrane having a feed side and a permeate side, the separation membrane having a selective layer comprising a polymer having:
  (i) a ratio of fluorine to carbon atoms in the polymer greater than 1:1;
  (ii) a fractional free volume no greater than about 0.3; and
  (iii) a glass transition temperature of at least about 100° C.; and the separation membrane being characterized by a post-exposure selectivity for the desired gas over the $C_{3+}$ hydrocarbon vapor, after exposure of the separation membrane to liquid toluene and subsequent drying, that is at least about 65% of a pre-exposure selectivity for the desired gas over the $C_{3+}$ hydrocarbon vapor, as measured pre- and post-exposure with a test gas mixture of the same composition and under like conditions;

(b) providing a driving force for transmembrane permeation;

(c) withdrawing from the permeate side a permeate stream enriched in the desired gas compared to the gas mixture;

(d) withdrawing from the feed side a residue stream depleted in the desired gas compared to the gas mixture.

The feed gas mixture to be separated often contains additional components, such as methane or ethylene, as well as $C_{3+}$ hydrocarbons, that will be separated from the desired gas by the process. In this case, the process results in a permeate stream enriched in the desired gas and depleted in both the $C_{3+}$ hydrocarbon and the additional component compared with the feed gas mixture, and a residue stream depleted in the desired gas and enriched in both the $C_{3+}$ hydrocarbon and the additional component compared with the feed gas mixture.

The process differs from processes previously available in the art in that:
(i) the membranes are able to maintain useful separation properties in the presence of organic vapors, such as $C_{3+}$ hydrocarbons, even at high levels in the gas, and
(ii) the membranes can recover from accidental exposure to liquid organic compounds.

To quantify these attributes, the membranes used in the process of the invention are characterized in terms of their selectivity before and after exposure to liquid hydrocarbons. Specifically, the membranes have a post-exposure selectivity for the desired gas over the $C_{3+}$ hydrocarbon vapor, after exposure of the separation membrane to a liquid hydrocarbon, for example, toluene, and subsequent drying, that is at least about 60%, 65% or even 70% of a pre-exposure selectivity for the desired gas over the $C_{3+}$ hydrocarbon vapor, the pre- and post-exposure selectivities being measured with a test gas mixture of the same composition and under like conditions.

In applying this test to determine whether the membrane is suitable for use in the process of the invention, it is important to test the membrane itself, and not just a film of the selective layer polymer. A thick film, for example 50 $\mu$m or more thick, of the selective layer polymer may appear to resist dissolution and swelling and maintain selectivity, even when soaked for days in liquid hydrocarbon. However, when used in an asymmetric or composite membrane with a selective layer thin enough to provide useful transmembrane flux for the desired gas (which may mean a selective layer as thin as 10 $\mu$m, 5 $\mu$m, 1 $\mu$m or less), the same material may disintegrate within minutes of contact with the hydrocarbon liquid.

It is also important that the test gas mixtures used to measure the selectivity before and after exposure have essentially the same composition, and that the test be carried out under essentially the same conditions of pressure, temperature, gas flow and membrane area, since all of these parameters may have an effect on selectivity. The test gas mixture should obviously contain the desired gas and the $C_{3+}$ hydrocarbon vapor, for example, propane, propylene or benzene, from which the desired gas is to be separated in the process, but need not be identical in composition to the feed gas mixture to the process, since this may change from time to time in any case.

It is preferred that the hydrocarbon liquid to which the membrane is exposed in the test is an aromatic liquid, such as toluene, rather than a paraffin, for example, since this provides more aggressive test conditions. The test can be carried out in any convenient manner. A simple and preferred protocol is to measure the membrane selectivity using a bench-top test cell apparatus such as is familiar to those of skill in the art, remove the membrane stamp from the test cell, immersing it in liquid toluene for a period, remove it, dry it in air and retest it as before. For an adequate test, the period of immersion should be representative of the exposure that might occur during a system upset when the membrane is in use, such as one or two hours, or overnight (about eight hours).

At least the selective layer responsible for the gas discriminating properties of the membrane is made from a glassy polymer or copolymer. The polymer should be substantially amorphous. Crystalline polymers are typically essentially insoluble and thus render membrane making difficult, as well as exhibiting generally very low gas permeabilities. Crystalline polymers are not normally suitable for the selective layer, therefore.

The selective layer polymer should be fluorinated, and generally the degree of fluorination should be high, to increase the chemical inertness and resistance of the material. By high, we mean having a fluorine:carbon ratio of atoms in the polymer of at least 1:1. Most preferably, the polymer is perfluorinated, even if the perfluorinated structure has a less than 1:1 fluorine:carbon ratio.

Since the polymers used for the selective layer need to remain rigid and glassy during operation, they should also have glass transition temperatures comfortably above temperatures to which they are typically exposed during the process. Polymers with glass transition temperature above about 100° C. are preferred, and, subject also to the other requirements and preferences above, the higher the glass transition temperature, in other words, the more rigid the polymer, the more preferred it is.

Polymers that have been used in commercial gas-separation systems to date are not suitable for use as selective layer materials insofar as they are unable to meet the characterizing requirements of resistance to $C_{3+}$ hydrocarbons. Such polymers include cellulose acetate, polysulfone and polyimides that are not perfluorinated. As discussed above and shown in the experimental examples below, these materials lose their flux, or selectivity, or both, properties as a result of exposure to $C_{3+}$ hydrocarbons at high activity or prolonged exposure to hydrocarbons at lower activity.

Various materials may be used for the polymeric selective layer to meet the characterizing requirements. These include, but are not limited to:

(i) polymers comprising a fluorinated dioxole monomer;
(ii) polymers comprising a fluorinated dioxolane monomer;
(iii) polymers comprising a fluorinated alkyl ether monomer;
(iv) perfluorinated polyimides; and
(v) polymers incorporating tetrafluoroethylene units.

None of these are new polymers in themselves. In fact, general polymer formulations embracing those suitable for use in the invention are described in patents dating back from the present day to the 1960s, for example, U.S. Pat. Nos. 3,308,107; 3,488,335; 3,865,845; 4,399,264; 4,431,786; 4,565,855; 4,594,399; 4,754,009; 4,897,457; 4,910,276; 5,021,602; 5,117,272; 5,268,411; 5,498,682; 5,510,406; 5,710,345; 5,883,177; 5,962,612; and 6,040,419.

Not all individual polymers within the above structural definitions and preferences are suitable for use as membrane selective layers in the invention. For example, homopolymers of tetrafluoroethylene are very chemically inert and, thus, resistant to plasticization. However, at temperatures of interest for membrane gas separations, they tend to be crystalline or semi-crystalline. As a result, the gas permeabilities through the polymer in non-porous form are too low to be of interest for use for the selective layer of a gas-separation membrane. Incorporated into copolymers, however, they enhance chemical resistance and physical rigidity. Therefore, combinations of tetrafluoroethylene with other monomer units that result in overall amorphous, yet rigid, highly fluorinated, copolymers are particularly preferred.

As a further example that some members of the polymer groups cited above are not suitable for practice of the invention, certain of the dioxole polymers and copolymers of perfluoro-2,2-dimethyl-1,3-dioxole reported in U.S. Pat. No. 5,051,114 have been shown to be susceptible to plasticization to the point of switching from being selective for nitrogen over hydrocarbons to being selective for hydrocarbons over nitrogen as the hydrocarbon partial pressure increases. These polymers are, however, characterized by very high fractional free volume within the polymer, typically above 0.3. For example, a paper by A. Yu. Alentiev et al, "High transport parameters and free volume of perfluorodioxole copolymers", *Journal of Membrane Science*, Vol. 126, pages 123–132 (1997) reports fractional free volumes of 0.32 and 0.37 for two grades of perfluoro-2,2-dimethyl1, 3-dioxole copolymers (Table 1, page 125). Likewise, these polymers are of low density compared with other polymers, such as below about 1.8 g/cm³ and are unusually gas permeable, for instance, exhibiting pure gas permeabilities as high as 1,000 Barrer or more for oxygen and as high as 2,000 Barrer or more for hydrogen. It is believed that polymers with denser chain packing, and thus lower fractional free volume, higher density and lower permeability, are more resistant to plasticization. Hence, the polymers used in the invention to form the selective, discriminating layer of the membrane should preferably be limited, in addition to the specific structural limitations defined and discussed above, to those having a fractional free volume less than about 0.3.

In referring to fractional free volume (FFV), we mean the free volume per unit volume of the polymer, defined and calculated as:

$$FFV = SFV/v_{sp}$$

where SFV is the specific free volume, calculated as:

$$SFV = v_{sp} - v_0 = v_{sp} - 1.3 v_W$$

and where:

$v_{sp}$ is the specific volume (cm³/g) of the polymer determined from density or thermal expansion measurements, $v_0$ is the zero point volume at 0° K, and $v_W$ is the van der Waals volume calculated using the group contribution method of Bondi, as described in D. W. van Krevelan, *Properties of Polymers*, $3_{rd}$ Edition, Elsevier, Amsterdam, 1990, pages 71–76.

Expressed in terms of density, the selective layer polymers should preferably have a density above about 1.8 g/cm³. Expressed in terms of permeability, the selective layer polymers will generally exhibit an oxygen permeability no higher than about 300 Barrer, more typically no higher than about 100 Barrer, and a hydrogen permeability no higher than about 1,000 Barrer, more typically no higher than about 500 Barrer.

Preferred polymers for the selective layer of the membrane are formed from fluorinated monomers of dioxoles, which are five-member rings of the form

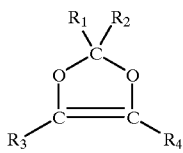

where $R_1$, $R_2$, $R_3$, and $R_4$ each independently may be hydrogen, fluorine, other halogen, alkyl or other group, subject to the resulting polymer meeting the specified definition in terms of fractional free volume and degree of fluorination. These materials polymerize by opening of the double bond and may take the form of homopolymers or copolymers with other repeat units. Copolymers that include tetrafluoroethylene units are particularly preferred.

Specific most preferred materials are copolymers of tetrafluoroethylene with 2,2,4-trifluoro-5-trifluoromethoxy-1,3-dioxole having the structure:

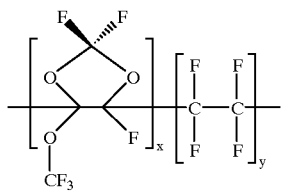

where x and y represent the relative proportions of the dioxole and the tetrafluoroethylene blocks, such that x+y=1.

Such materials are available commercially from Ausimont S.p.A., of Milan, Italy under the trade name Hyflon® AD. Different grades are available varying in proportions of the dioxole and tetrafluoroethylene units, with fluorine:carbon ratios of between 1.5 and 2, depending on the mix of repeat units. For example, grade Hyflon AD 60 contains a 60:40 ratio of dioxole to tetrafluoroethylene units, has a fractional free volume of 0.23, a density of 1.93 g/cm³ and a glass transition temperature of 121° C., and grade Hyflon AD 80 contains an 80:20 ratio of dioxole to tetrafluoroethylene units, has a fractional free volume of 0.23, a density of 1.92 g/cm³ and a glass transition temperature of 134° C.

Similar types of preferred materials are dioxolanes, also five-member rings but with the polymerizable bonds outside the main ring.

Alternative preferred materials are polymers prepared from highly fluorinated alkyl ether monomers, especially those polymerizable into cyclic ether repeat units with five or six members in the ring. Among these, particularly preferred is the set of polyperfluoro (alkenyl vinyl ethers) including polyperfluoro (allyl vinyl ether) and polyperfluoro (butenyl vinyl ether). A specific most preferred material of this type has the structure:

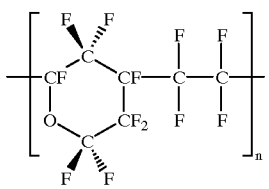

where n is a positive integer.

This material is available commercially from Asahi Glass Company, of Tokyo, Japan under the trade name Cytop®. Cytop has a fractional free volume of 0.21, a density of 2.03 g/cm³ and a glass transition temperature of 108° C., and a fluorine:carbon ratio of 1.7.

Yet another group of materials that is believed to contain useful selective layer materials is perfluorinated polyimides. Such materials have been investigated for use as optical waveguides, and their preparation is described, for example, in S. Ando et al., "Perfluorinated polymers for optical waveguides", CHEMTECH, December, 1994. To be usable as membrane materials, the polyimides have to be capable of being formed into continuous films. Thus, polyimides that incorporate ether or other linkages that give some flexibility to the molecular structure are preferred. Particular examples are polymers comprising repeat units prepared from the perfluorinated dianhydride 1,4-bis(3,4-dicarboxytrifluorophenoxy) tetrafluorobenzene (10FEDA), which has the structure:

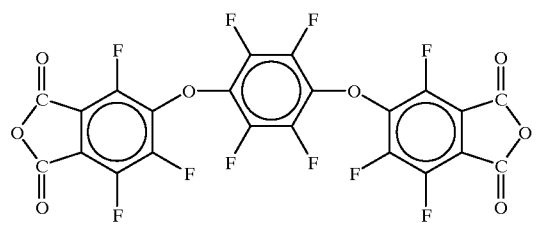

Diamines with which 10FEDA can be reacted to form polyamic acids and hence polyimides include 4FMPD, which has the structure:

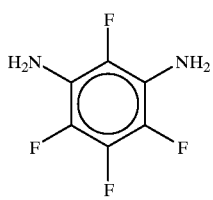

The resulting 10FEDA/4FMPD polyimide has the repeat unit structure:

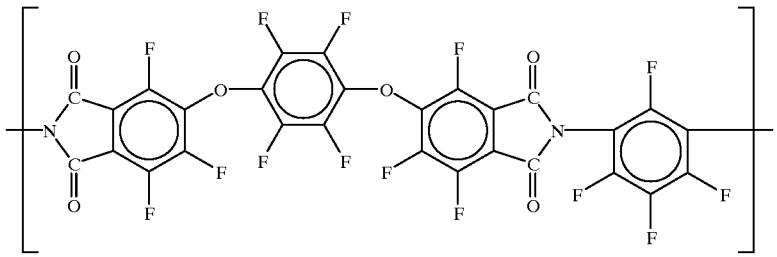

The polymer chosen for the selective layer can be used to form films or membranes by any convenient technique known in the art, and may take diverse forms. Because the polymers are glassy and rigid, an unsupported film, tube or fiber of the polymer may be usable in principle as a single-layer membrane. However, such single-layer films will normally be too thick to yield acceptable transmembrane flux, and in practice, the separation membrane usually comprises a very thin selective layer that forms part of a thicker structure. This may be, for example, an integral asymmetric membrane, comprising a dense skin region that forms the selective layer and a microporous support region. Such membranes were originally developed by Loeb and Sourirajan, and their preparation in flat sheet or hollow fiber form is now conventional in the art and is described, for example, in U.S. Pat. Nos. 3,133,132 to Loeb, and 4,230,463 to Henis and Tripodi.

As a further, and a preferred, alternative, the membrane may be a composite membrane, that is, a membrane having multiple layers. Modern composite membranes typically comprise a highly permeable but relatively non-selective support membrane, which provides mechanical strength, coated with a thin selective layer of another material that is primarily responsible for the separation properties. Typically, but not necessarily, such a composite membrane is made by solution-casting the support membrane, then solution-coating the selective layer. General preparation techniques for making composite membranes of this type are well known, and are described, for example, in U.S. Pat. No. 4,243,701 to Riley et al., incorporated herein by reference. If the membrane is made in the form of a composite membrane, it is particularly preferred to use a fluorinated or perfluorinated polymer, such as polyvinylidene fluoride, to make the microporous support membrane. Again, the membrane may take flat-sheet, tube or hollow-fiber form. The most preferred support membranes are those with an asymmetric structure, which provides a smooth, comparatively dense surface on which to coat the selective layer. Support membranes are themselves frequently cast onto a backing web of paper or fabric. As an alternative to coating onto a support membrane, it is also possible to make a composite membrane by solution-casting the polymer directly onto a non-removable backing web, as mentioned above. In hollow-fiber form, multilayer composite membranes may be made by a coating procedure as taught, for example, in U.S. Pat. Nos. 4,863,761; 5,242,636; and 5,156,888, or by using a double-capillary spinneret of the type taught in U.S. Pat. Nos. 5,141,642 and 5,318,417.

The membrane may also include additional layers, such as a gutter layer between the microporous support membrane and the selective layer, or a sealing layer on top of the selective layer. A gutter layer generally has two purposes. The first is to coat the support with a material that seals small defects in the support surface, and itself provides a smooth, essentially defect-free surface onto which the selective layer may be coated. The second is to provide a layer of highly permeable material that can channel permeating molecules to the relatively widely spaced pores in the support layer. Preferred materials for the gutter layer are fluorinated or perfluorinated, to maintain high chemical resistance through the membrane structure, and of very high permeability. Particularly preferred for the gutter layer, although they are unsuitable for the selective layer, are the perfluorinated dioxole polymers and copolymers of U.S. Pat. No. 5,051,114 referred to above, having fractional free volume greater than 0.3 and extraordinarily high permeability, such as copolymers of perfluoro-2,2-dimethyl-1,3-dioxole and tetrafluoroethylene, available commercially as Teflon® AF from DuPont Fluoroproducts of Wilmington, Delaware. Such materials, or any others of good chemical resistance that provide protection for the selective layer without contributing significant resistance to gas transport, are also suitable as sealing layers.

Multiple selective layers may also be used.

The thickness of the selective layer or skin of the membranes can be chosen according to the proposed use, but will generally be no thicker than 10 $\mu$m, and typically no thicker than 5 $\mu$m. It is preferred that the selective layer be sufficiently thin that the membrane provide a pressure-normalized hydrogen flux, as measured with pure hydrogen gas at 25° C., of at least about 100 GPU (where 1 GPU= $1 \times 10^{-6}$ cm$^3$(STP)/cm$^2$ .s.cmHg), more preferably at least about 200 GPU and most preferably at least about 400 GPU. In general, the membranes of the invention provide trans-membrane gas fluxes that are high compared with membranes using conventional hydrogen-separating materials, such as polyimides, cellulose acetate and polysulfone.

Once formed, the membranes exhibit a combination of good mechanical properties, thermal stability, and high chemical resistance. The fluorocarbon polymers that form the selective layer are typically insoluble except in perfluorinated solvents and are resistant to acids, alkalis, oils, low-molecular-weight esters, ethers and ketones, aliphatic and aromatic hydrocarbons, and oxidizing agents, making them suitable for use not only in the presence of $C_{3+}$ hydrocarbons, but in many other hostile environments.

The membranes of the invention may be prepared in any known membrane form and housed in any convenient type of housing and separation unit. We prefer to prepare the membranes in flat-sheet form and to house them in spiral-wound modules. However, flat-sheet membranes may also be mounted in plate-and-frame modules or in any other way. If the membranes are prepared in the form of hollow fibers or tubes, they may be potted in cylindrical housings or otherwise.

The membrane separation unit comprises one or more membrane modules. The number of membrane modules required will vary according to the volume of gas to be treated, the composition of the feed gas, the desired compositions of the permeate and residue streams, the operating pressure of the system, and the available membrane area per module. Systems may contain as few as one membrane module or as many as several hundred or more. The modules may be housed individually in pressure vessels or multiple elements may be mounted together in a sealed housing of appropriate diameter and length.

The process of the invention in its most basic form is shown in FIG. 1. Referring to this figure, a feedstream, 1, containing a gas mixture including a desired gas and one or more $C_{3+}$ hydrocarbon vapors, is passed into membrane separation unit 2 and flows across the feed side of membrane 3, which is characterized by having a selective layer comprising a polymer having:

(i) a ratio of fluorine to carbon atoms in the polymer greater than 1:1;

(ii) a fractional free volume no greater than about 0.3; and (iii) a glass transition temperature of at least about 100° C.; and by its resistance to $C_{3+}$ hydrocarbons in vapor or liquid form.

Under a pressure difference between the feed and permeate sides of the membrane, the desired gas passes preferentially to the permeate side, and gas-enriched stream, 5, is withdrawn from the permeate side. The remaining gas-depleted, organic-enriched residue stream, 4, is withdrawn from the feed side.

The composition and pressure at which the feedstream is supplied to the membrane modules varies depending on the source of the stream. If the feed gas stream to be treated is at high pressure compared with atmospheric, such as 200 psia, 400 psia, 500 psia or above, the separation may be effected simply by making use of this high pressure to provide an adequate driving force and feed:permeate pressure ratio. Otherwise, a pressure difference can be provided by compressing the feed stream, by drawing a vacuum on the permeate side of the membrane, or a combination of both. Polymer membranes can typically withstand pressure differences between the feed and permeate side up to about 1,500–2000 psi, so it might occasionally be necessary to let down the gas pressure before it can be fed to the membrane system.

An important consideration is the effect of hydrocarbons, particularly $C_{3+}$ hydrocarbons, in the feed stream. Unlike prior art membranes, the membranes of the invention can maintain useful gas/hydrocarbon separation performance, in terms of transmembrane gas flux and selectivity, when exposed to high concentrations of such organics, even when the gas mixture is close to saturation with these compounds. This is true with respect to a broad range of hydrocarbons, including paraffins, olefins, aromatics, such as benzene, toluene and xylenes (BTEX), alcohols and chlorinated compounds. These properties are different from those reported in the literature for dioxole membranes, as well as obtained with prior art conventional commercial membrane materials, such as cellulose acetate, polysulfone, or non-perfluorinated polyimide.

Even if condensation of organic liquid does accidentally occur from time to time, the membrane unit can generally be purged with, for example, an inert gas such as nitrogen, and the membranes will frequently continue thereafter to exhibit adequate gas/hydrocarbon selectivity properties.

In contrast, prior art membranes in commercial use are generally plasticized and irreversibly damaged by exposure to $C_{3+}$ hydrocarbon vapors at any significant concentration, such as more than about 10%, 20% or 25%, or at more modest concentrations, such as less than 10%, for prolonged periods, and cannot withstand even fleeting exposure to condensed organic liquids.

As a rough general guide, expressed as a concentration, the feed gas treated by the process of the invention may have a hydrocarbons content, including $C_{3+}$ hydrocarbons, of at least about 5%, 10%, 15%, 20% or higher. Expressed in terms of partial pressure, the feed stream may often be acceptable with a partial pressure of $C_{3+}$ hydrocarbons of as high as 15 psia, 25 psia, 50 psia, 100 psia or more, assuming a gas temperature of ambient or above; and the residue stream partial pressure of $C_{3+}$ hydrocarbons together can often be as high as 50 psia, 100 psia, 150 psia or 200 psia, again assuming a temperature of ambient or above. Expressed as the ratio of the feed pressure, P, to the saturation vapor pressure, $P_{sat}$ of the gas mixture, which is an approximate measure of the activity of the gas, the feed gas may be supplied to the membrane separation step at pressure and temperature conditions that result in the percentage $P/P_{sat}$ being at least about 25%, 30%, 50%, 60 %, 70% or higher. Methane and $C_2$ components, which tend to have low boiling points, and to be less condensable and less harmful in terms of their plasticizing ability, can generally be present in any concentration.

Depending on the performance characteristics of the membrane, and the operating parameters of the system, the process can be designed for varying levels of gas purification and recovery. Single-stage gas-separation processes typically remove up to about 80–95% of the preferentially permeating component from the feed stream and produce a permeate stream significantly more concentrated in that component than the feed gas. This degree of separation is adequate for many applications. If the residue stream requires further purification, it may be passed to a second bank of modules for a second processing step. If the permeate stream requires further concentration, it may be passed to a second bank of modules for a second-stage treatment. Such multistage or multistep processes, and variants thereof, will be familiar to those of skill in the art, who will appreciate that the process may be configured in many possible ways, including single-stage, multistage, multistep, or more complicated arrays of two or more units in series or cascade arrangements.

In light of their unusual and advantageous properties, the membranes and processes of the invention are useful for many separation applications. Specific examples include, but are not limited to separation of permanent gases, for example, nitrogen, oxygen, air, argon or hydrogen, from organics; separation of methane from $C_{3+}$ organics; separation of carbon dioxide from organics; separation of light olefins from other organics; and separation of isomers from one another, such as n-butane from iso-butane.

Of particular importance, the membranes and processes of the invention are useful for many applications where hydrogen is to be separated from mixtures containing hydrogen and one or more hydrocarbons. In another aspect, therefore, the invention is a process for treating refinery or petrochemical plant streams containing hydrogen and hydrocarbons, to separate hydrogen from the hydrocarbons.

The following list of applications of the invention in this aspect is exemplary, but not limiting: separation of hydrogen from methane and other light hydrocarbons in process and off-gas streams from: hydrocrackers; hydrotreaters of various kinds, including hydrodesulfurization units; coking reactors; catalytic reformers; catalytic crackers; specific isomerization, alkylation and dealkylation units; steam reformers; hydrogenation and dehydrogenation processes; and steam crackers for olefin production, as well as in streams from manufacture of primary petrochemicals, chemical intermediates, fuels, polymers, agricultural chemicals and the like.

The treatment process of this invention, with respect to FIG. 1, involves running a refinery, chemical plant or the like stream, 1, containing a hydrogen/hydrocarbon mixture, typically including hydrogen, methane and $C_{3+}$ hydrocarbon vapors, across the feed side of a membrane separation unit 2, containing a membrane characterized as before, 3, that is selectively permeable to the hydrogen over the methane and other hydrocarbons in the stream. The hydrogen is concentrated in the permeate stream, 5; the residue stream, 4, is thus correspondingly depleted of hydrogen.

In other words, the process of the invention includes the following steps:

(a) passing a gas mixture comprising hydrogen and a $C_{3+}$ hydrocarbon vapor across the feed side of a separation membrane having a feed side and a permeate side, the separation membrane having a selective layer comprising a polymer having:
  (i) a ratio of fluorine to carbon atoms in the polymer greater than 1:1;
  (ii) a fractional free volume no greater than about 0.3; and
  (iii) a glass transition temperature of at least about 100° C.; and the separation membrane being characterized by a post-exposure selectivity for hydrogen over the $C_{3+}$ hydrocarbon vapor, after exposure of the separation membrane to liquid toluene and subsequent drying, that is at least about 65% of a pre-exposure selectivity for hydrogen over the $C_{3+}$ hydrocarbon vapor, as measured pre- and post-exposure with a test gas mixture of the same composition and under like conditions;

(b) providing a driving force for transmembrane permeation;

(c) withdrawing from the permeate side a permeate stream enriched in hydrogen compared to the gas mixture;

(d) withdrawing from the feed side a residue stream depleted in hydrogen compared to the gas mixture.

The process differs from previous hydrogen/hydrocarbon separation processes in the nature of the membrane that is used. The membranes are, as described above, able to maintain useful separation properties in the presence of organic vapors, particularly $C_{3+}$ hydrocarbons, at high partial pressure, and able to recover from accidental exposure to liquid hydrocarbons.

The scope of the invention in this aspect is not intended to be limited to any particular gas streams, but to encompass any situation where a gas stream containing hydrogen and hydrocarbon gas is to be separated. The composition of the gas may vary widely, from a mixture that contains minor amounts of hydrogen in admixture with various hydrocarbon components, including relatively heavy hydrocarbons, such as $C_5$–$C_8$ hydrocarbons or heavier, to a mixture of mostly hydrogen, such as 80% hydrogen, 90% hydrogen or above, with methane and other very light components. Typical examples of compositions and pressures of feed gases suitable for treatment by the process of the invention, include, but are not limited to, mixtures of hydrogen with methane and $C_2$–$C_8$ paraffins and olefins having a $C_{3+}$ hydrocarbon vapor content of as much as 15–20% or more at a total feed pressure of 400 psia; mixtures of hydrogen and methane of any composition and pressure; and mixtures of hydrogen with $C_1$–$C_4$ paraffins having a total hydrocarbon content of as much as 60% or more at a total feed pressure of 500 psia.

The process of the invention typically provides a selectivity, in mixtures containing multiple hydrocarbons including a $C_{3+}$ hydrocarbon, for hydrogen over methane of at least about 10, for hydrogen over propane of at least about 50, and for hydrogen over n-butane of at least about 100. Frequently, the hydrogen/methane selectivity achieved is 20 or more, even in the presence of significant concentrations of $C_{3+}$ hydrocarbons.

Applications range from those treating very large streams, such as separation of hydrogen/light hydrocarbon mixtures in ethylene plant cold trains, to those handling much smaller streams, including recovery of hydrogen from vent streams generated by hydrogen reduction processes.

An exemplary use of the process is to recover hydrogen from refinery waste streams containing less than about 40% hydrogen, and rich in $C_{3+}$ hydrocarbons, for which PSA or cryogenic condensation is not economically attractive. Prior to the availability of the present process, the only use for such streams was generally as fuel. The process of the invention can be used to recover a hydrogen-rich permeate stream, containing, for example, 90% hydrogen, from such a feed stream. A stream of such composition may be recompressed and used in other refinery unit operations, or subjected to further treatment to yield high purity hydrogen as required. The hydrocarbon-rich residue stream may be piped to the fuel header, thereby reducing the volume of fuel gas produced, or sent for LPG recovery, for example.

A second exemplary application is hydrogen and olefin recovery from fluid catalytic cracking (FCC) off-gas. Such streams typically contain 10–20% hydrogen at 100–250 psig, and are a potential source of light olefins also. The process of the invention can be used to recover both hydrogen and hydrocarbons from these streams. The hydrogen product, typically containing 80–90% hydrogen, can be used as is or sent for additional treatment. The hydrocarbon-rich residue can be used as fuel, or can be sent for olefin recovery from the hydrocarbon mixture by cryogenic distillation or the like.

Other exemplary applications include separation of hydrogen from steam cracker product gas generated by the manufacture of ethylene or propylene by cracking ethane or propane with steam, and selective purging of reactor loops to remove methane or other contaminants from the loop. Such selective purging processes are discussed with respect to other types of membranes in U.S. Pat. No. 6,171,472, for example.

The invention has been described in this aspect as it relates to the separation of hydrogen from hydrocarbon-containing gas mixtures. Processes that concern the separation of other permanent gases from gas mixtures containing hydrocarbons are also possible using the membranes as characterized above. Specific examples include, but are not limited to, separation of nitrogen, oxygen or air from methane, ethylene and other organics; and separation of argon from ethylene.

For instance, as it relates to separation of nitrogen and/or oxygen from organic compounds, the invention includes the following steps:

(a) passing a gas mixture comprising nitrogen and/or oxygen, and a $C_{3+}$ hydrocarbon vapor across the feed side of a separation membrane having a feed side and a permeate side, the membrane having a selective layer comprising a polymer having:
  (i) a ratio of fluorine to carbon atoms in the polymer greater than 1:1;
  (ii) a fractional free volume no greater than about 0.3; and (iii) a glass transition temperature of at least about 100° C.; and the separation membrane being characterized by a post-exposure selectivity for nitrogen or oxygen over the $C_{3+}$ hydrocarbon vapor, after exposure of the separation membrane to liquid toluene and subsequent drying, that is at least about 65% of a pre-exposure selectivity for nitrogen or oxygen over the $C_{3+}$ hydrocarbon vapor, as measured pre- and post-exposure with a test gas mixture of the same composition and under like conditions;

(b) providing a driving force for transmembrane permeation;

(c) withdrawing from the permeate side a permeate stream enriched in nitrogen and/or oxygen compared to the gas mixture;

(d) withdrawing from the feed side a residue stream depleted in nitrogen and/or oxygen compared to the gas mixture.

Such a process is useful, for example, in separating nitrogen from methane to treat natural gas that is out of specification by containing excess nitrogen. In this case, the natural gas stream to be treated contains methane in addition to $C_{3+}$ hydrocarbons. The process is also useful for treating gas mixtures in which nitrogen is to be separated from ethylene, such as occur in polyolefin manufacturing. Yet another use is to treat off-gases from numerous industrial processes that produce waste streams containing organic vapors in air or nitrogen, such as arise when organic solvents are used in coating, spraying, cleaning, painting, or printing applications of all kinds, from organic liquid storage tank vents, from chemical manufacturing, or from foundry cold boxes using organic catalysts for metal casting. In this case, diverse organic vapors may be present in the stream, for example, halogenated solvents, alkyl amines, ketones or alcohols.

The process of the invention can provide a selectivity, in gas mixtures, for nitrogen over methane of as high as 2, 2.5 or even 3. Although these numbers seem small, they are remarkable, in that few prior art membrane materials offer any selectivity at all for nitrogen over methane. For example, polysulfone, cellulose acetate and polycarbonate all have nitrogen/methane selectivity of only about 1 or below, that is, they often exhibit slight methane/nitrogen selectivity. Polyimides, the best group of prior art materials in this regard, offer typical nitrogen/methane selectivity, even as measured with pure gases, only in the range between 1 and 2.3.

The process of the invention can also provide exceptional selectivity, in gas mixtures, for nitrogen over ethylene of as high as 4, 5 or above. This performance is again unusual compared with other materials.

As it relates to separation of nitrogen from more complex organic molecules, the process of the invention can provide much higher mixed-gas selectivities, such as 20, 40, 50, 100 or higher, depending on the nature of the organic compound and the process conditions.

Yet another possible permanent gas/organic compound separation is that of argon from ethylene. A large number of chemical products are produced by catalytic oxidation of an appropriate organic feedstock. For example, ethylene oxide is made by oxidation of ethylene, as are acetaldehyde, vinyl acetate and vinyl chloride; propylene oxide and acrylonitrile are produced by oxidation of propylene; benzoic acid by oxidation of toluene; and caprolactam by oxidation of cyclohexane. Such oxidation processes operate in a loop, with modest conversion per pass, so that large amounts of unreacted organic feedstock are recirculated back to the reaction zone at each pass. The processes often use a feed of oxygen-enriched air or high-purity oxygen as the oxygen source, leading to a build-up of unreacted argon, which enters with the feed oxygen, in the reactor loop. The process of the invention can be used to selectively purge argon from the loop, while retaining the ethylene, propylene or other organic feedstock for recycle to the process. In this respect, the process of the invention typically provides a selectivity, in gas mixtures, for argon over ethylene of as high as 4, 5, 6, 7 or above. These are again very unusual and advantageous properties.

In yet another aspect, the invention is a process for separating carbon dioxide from methane and $C_{3+}$ hydrocarbon vapors. Such a mixture might be encountered during the processing of natural gas, of associated gas from oil wells, or of certain petrochemical streams, for example.

For natural gas to be accepted into the pipeline, it must normally contain no more than 4% carbon dioxide. As mentioned above, much raw natural gas is out of specification in this regard, as well as being too rich in $C_{3+}$ hydrocarbons content. Carbon dioxide rich streams also arise as a result of oil extraction by miscible flood operations, in which carbon dioxide is injected into the formation to lower the viscosity of the oil. The resulting gas extracted with the oil is initially rich in methane, but over time may contain as much as 80% or more carbon dioxide.

The process of the invention may be used to treat such streams as shown again with reference to FIG. 1. A stream containing carbon dioxide, 1, is passed across the feed side of a membrane separation unit, 2, containing a membrane as defined above, 3, that is selectively permeable to the carbon dioxide over methane and other hydrocarbons in the stream. The carbon dioxide is concentrated in the permeate stream, 5; the residue stream, 4, is thus correspondingly depleted of carbon dioxide and enriched in hydrocarbons.

In a basic embodiment, the process of the invention includes the following steps:

(a) passing a gas mixture comprising carbon dioxide, methane and a $C_{3+}$ hydrocarbon vapor across the feed side of a separation membrane having a feed side and a permeate side, the membrane having a selective layer comprising a polymer having:

(i) a ratio of fluorine to carbon atoms in the polymer greater than 1:1;

(ii) a fractional free volume no greater than about 0.3; and (iii) a glass transition temperature of at least about 100° C.; and the separation membrane being characterized by a post-exposure selectivity for carbon dioxide over the $C_{3+}$ hydrocarbon vapor, after exposure of the separation membrane to liquid toluene and subsequent drying, that is at least about 65% of a pre-exposure selectivity for carbon dioxide over the $C_{3+}$ hydrocarbon vapor, as measured pre- and post-exposure with a test gas mixture of the same composition and under like conditions;

(b) providing a driving force for transmembrane permeation;

(c) withdrawing from the permeate side a permeate stream enriched in carbon dioxide compared to the gas mixture;

(d) withdrawing from the feed side a residue stream depleted in carbon dioxide compared to the gas mixture.

The process differs from previous carbon dioxide/methane separation processes in the nature of the membrane that is used. The membranes are, as described above, able to maintain useful separation properties in the presence of $C_{3+}$ hydrocarbon vapor at high partial pressure, and able to recover from accidental exposure to liquid hydrocarbons. The membranes are also able to withstand high partial pressures of carbon dioxide.

The process of the invention typically provides a selectivity, in mixtures containing multiple hydrocarbons including a $C_{3+}$ hydrocarbon, for carbon dioxide over methane of at least about 5, even at high carbon dioxide activity. Frequently, the carbon dioxide/methane selectivity achieved is 10 or more, and may be as much as 15 or more, even in the presence of significant concentrations of $C_{2+}$ hydrocarbons.

In a different aspect, the invention is a process for separating not inorganic gases or vapors from organic gases or vapors, but organic gases or vapors from one another. In this aspect, the process of the invention, again with reference to FIG. 1, involves running a stream containing a mixture of organic compounds, 1, across the feed side of a membrane separation unit, 2, containing a membrane as defined above, 3, that is selectively permeable to a first organic compound over a second organic compound in the stream. The first hydrocarbon is concentrated in the permeate stream, 5; the residue stream, 4, is thus correspondingly depleted of that hydrocarbon.

In this aspect, therefore, the process of the invention includes the following steps:
(a) passing a gas mixture comprising first and second organic components across the feed side of a separation membrane having a feed side and a permeate side, the membrane having a selective layer comprising a polymer having:
  (i) a ratio of fluorine to carbon atoms in the polymer greater than 1:1;
  (ii) a fractional free volume no greater than about 0.3; and
  (iii) a glass transition temperature of at least about 100° C.; and the separation membrane being characterized by a post-exposure selectivity for the first organic component over the second organic component after exposure of the separation membrane to liquid toluene and subsequent drying, that is at least about 65% of a pre-exposure selectivity for the first organic component over the second organic component as measured pre- and post-exposure with a test gas mixture of the same composition and under like conditions;
(b) providing a driving force for transmembrane permeation;
(c) withdrawing from the permeate side a permeate stream enriched in the first organic component compared to the gas mixture;
(d) withdrawing from the feed side a residue stream depleted in the first organic component compared to the gas mixture.

The process differs from previous hydrocarbon/hydrocarbon separation processes in the nature of the membrane that is used. The membranes are, as described above, more resistant to plasticization by hydrocarbons than prior art membranes, and are able to recover from accidental exposure to liquid hydrocarbons.

The process of the invention may be used for diverse separations of organic components, including, but not limited to, separation of methane from $C_{3+}$ hydrocarbons, separation of olefins from paraffins; and separation of isomers, such as n-butane from iso-butane. As it relates to the separation of methane from other hydrocarbons, the invention includes the following steps:

(a) passing a gas mixture comprising methane and a $C_{3+}$ hydrocarbon vapor across the feed side of a separation membrane having a feed side and a permeate side, the membrane having a selective layer comprising a polymer having:
  (i) a ratio of fluorine to carbon atoms in the polymer greater than 1:1;
  (ii) a fractional free volume no greater than about 0.3; and
  (iii) a glass transition temperature of at least about 100° C.; and the separation membrane being characterized by a post-exposure selectivity for methane over the $C_{3+}$ hydrocarbon vapor, after exposure of the separation membrane to liquid toluene and subsequent drying, that is at least about 65% of a pre-exposure selectivity for methane over the $C_{3+}$ hydrocarbon vapor, as measured pre- and post-exposure with a test gas mixture of the same composition and under like conditions;
(b) providing a driving force for transmembrane permeation;
(c) withdrawing from the permeate side a permeate stream enriched in methane compared to the gas mixture;
(d) withdrawing from the feed side a residue stream depleted in methane compared to the gas mixture.

In this aspect, the invention can be used in natural gas processing, for example, to lower the Btu value and dewpoint of gas that initially contains excess $C_{3+}$ hydrocarbons. The invention may also be used to remove the lightest hydrocarbons, specifically methane and ethane, from process streams, to prevent their build up in a reactor loop, for example.

The process of the invention typically provides a selectivity for methane over $C_{3+}$ hydrocarbons, such as propane, butane or heavier, in mixtures containing multiple hydrocarbons including the $C_{3+}$ hydrocarbon, of at least about 4 or 5, and in many cases, at least about 8. Frequently, the selectivity achieved is 10 or more, and may be as much as 15 or more, even in the presence of significant concentrations of $C_{3+}$ hydrocarbons.

As it relates to the separation of olefins from paraffins, the invention is particularly useful for separating propylene from propane. Such mixtures are found as olefin manufacturing effluent streams, and in various petrochemical plant streams, for example.

The process involves running a stream comprising propylene and propane across the feed side of a membrane that is selectively permeable to propylene. The propylene is concentrated in the permeate stream; the residue stream is thus correspondingly depleted of propylene.

In a basic embodiment, the process of the invention includes the following steps:
(a) passing a gas mixture comprising propylene and propane across the feed side of a separation membrane having a feed side and a permeate side, the membrane having a selective layer comprising a polymer having:
  (i) a ratio of fluorine to carbon atoms in the polymer greater than 1:1;
  (ii) a fractional free volume no greater than about 0.3; and
  (iii) a glass transition temperature of at least about 100° C.; and the separation membrane being characterized by a post-exposure selectivity for propylene over propane after exposure of the separation membrane to liquid toluene and subsequent drying, that is at least about 65% of a pre-exposure selectivity for propylene over propane as measured pre- and post-exposure with a test gas mixture of the same composition and under like conditions;

(b) providing a driving force for transmembrane permeation;

(c) withdrawing from the permeate side a permeate stream enriched in propylene compared to the gas mixture;

(d) withdrawing from the feed side a residue stream depleted in propylene compared to the gas mixture.

The process typically provides a propylene/propane selectivity of at least about 2.5, more preferably at least about 3, which can be sustained, even with streams composed entirely of $C_{3+}$ hydrocarbons, over a range of pressures.

Since the membranes used in the invention are selective for both olefins and hydrogen over paraffins, the membrane separation step may be used, where both are present, to produce a permeate enriched in both olefins and hydrogen, leaving a residue stream enriched in paraffins. The olefins in the permeate stream may then be separated from the hydrogen to deliver product streams of each.

Optionally, the processes of the invention already discussed may include other separation steps used in conjunction with the defined membrane separation process. Examples of such separation steps include adsorption, absorption, condensation, and distillation. The other separation steps may be carried out upstream, downstream or both of the membrane separation step, that is, with reference to FIG. 1 on any of streams 1, 4 and 5. Specific examples of such processes are discussed in more detail in copending serial number 09/574,420, entitled "Gas Separation Using Organic-Vapor-Resistant Membranes" incorporated herein by reference in its entirety.

The invention is now illustrated in further detail by specific examples. These examples are intended to further clarify the invention, and are not intended to limit the scope in any way.

EXAMPLES

Example 1

Membrane Making

Asymmetric, microporous poly(vinylidene fluoride) [PVDF] support membranes were prepared. Composite membranes were prepared using the following coating solutions:

1 wt % copolymer solution of 40% tetrafluoroethylene/ 60% 2,2,4-trifluoro-5-trifluorometoxy-1,3-dioxole (Hyflon® AD60), (Ausimont, Italy), in a perfluorinated solvent (Fluorinert FC-84), (3M, St. Paul, MN).

1 wt % copolymer solution of 20% tetrafluoroethylene/ 80% 2,2,4-trifluoro-5-trifluorometoxy-1,3-dioxole (Hyflon® AD80), (Ausimont, Italy), in FC-84 solvent.

1 wt % polyperfluoro (alkenyl vinyl ether) (Cytop®), (Asahi Glass, Japan), in FC-84 solvent.

The support membranes were dip-coated in a solution of one of the three selective polymer solutions at 1 ft/min coating speed, then dried in an oven at 60° C. for 10 minutes. The resulting membranes had a selective layer thickness ranging from 0.2–0.5 µm. Samples of each finished composite membrane were cut into 12.6 cm² stamps and tested in a permeation test-cell apparatus with pure gases at 35° C. feed temperature and 65 psia feed pressure. During each test, the feed, permeate, and residue compositions were analyzed by gas chromatography (GC). The gas fluxes of the membranes were measured, and the selectivities were calculated. Table 1 summarizes the fluxes and Table 2 summarizes the selectivities of the composite membranes, calculated as the ratio of the pure gas fluxes.

TABLE 1

| | Pure-Gas Pressure-Normalized Flux (GPU) | | |
|---|---|---|---|
| Gas | Hyflon ® AD60 | Hyflon ® AD80 | Cytop ® |
| Nitrogen | 52 | 184 | 34 |
| Oxygen | 180 | 574 | 130 |
| Helium | 1,360 | 1,850 | 1,270 |
| Hydrogen | 790 | 2,040 | 620 |
| Argon | 85.4 | 289 | 56 |
| Carbon Dioxide | 433 | — | 300 |
| Methane | 17.6 | 65.8 | 11 |
| Ethane | 4.5 | 18.8 | 3 |
| Ethylen | 9.8 | 35.9 | 5.7 |
| Propane | 1.1 | — | 3.4 |
| Propylene | 5.1 | 25.6 | — |
| $CF_4$ | 0.94 | 3.38 | 0.48 |
| $NF_3$ | 10.3 | 38.8 | 5.7 |

1 GPU = 1 × 10$^{-6}$ cm³ (STP)/cm² · s · cmHg

TABLE 2

| | Selectivity (–) | | |
|---|---|---|---|
| Gas Pair | Hyflon ® AD60 | Hyflon ® AD80 | Cytop ® |
| $N_2/CF_4$ | 55 | 58 | 71 |
| $O_2/N_2$ | 3.5 | 3.1 | 3.8 |
| $N_2/CH_4$ | 2.9 | 2.8 | 3.2 |
| $He/H_2$ | 1.7 | 0.91 | 2.0 |
| $Ar/CH_4$ | 4.8 | 4.4 | 5.3 |
| $Ar/C_2H_4$ | 8.7 | 8.0 | 9.7 |
| $CO_2/CH_4$ | 26 | — | 28 |
| $H_2/CH_4$ | 45 | 31 | 59 |
| $N_2/C_2H_4$ | 5.3 | 5.1 | 6.0 |
| $N_2/C_2H_6$ | 10 | 7.2 | — |

Example 2

Mixed-Gas Argon/Ethylene Permeation Properties

Membranes were prepared and membrane stamps were subjected to permeation experiments using the same general procedure as in Example 1. The temperature was 23° C., the feed pressure was 165 psia, and the feed gas mixture contained approximately 9% argon, 67% methane and 24% ethylene. The pressure-normalized fluxes of argon and ethylene were measured, and the argon/ethylene selectivities were calculated. The results are shown in Table 3.

TABLE 3

| | Mixed-Gas Pressure-Normalized Flux (GPU) | | $Ar/C_2H_4$ |
|---|---|---|---|
| Membrane | Ar | $C_2H_4$ | Selectivity (–) |
| Hyflon ® AD60 | 88 | 11.9 | 7.4 |
| Hyflon ® AD80 | 265 | 42.7 | 6.2 |
| Cytop ® | 51 | 5.8 | 8.8 |

Example 3

Mixed-Gas Nitrogen/Ethylene Permeation Properties

Membranes were prepared and membrane stamps were subjected to permeation experiments using the same general procedure as in Example 1. The temperature was 23° C., the feed pressure was 165 psia, and the feed gas mixture contained 80% nitrogen and 20% ethylene. The pressure-normalized fluxes of nitrogen and ethylene were measured, and the nitrogen/ethylene selectivities were calculated. The results are shown in Table 4.

TABLE 4

| Membrane | Mixed-Gas Pressure-Normalized Flux (GPU) | | $N_2/C_2H_4$ |
|---|---|---|---|
| | $N_2$ | $C_2H_4$ | Selectivity (—) |
| Hyflon ® AD60 | 53 | 11 | 4.8 |
| Hyflon ® AD80 | 184 | 41.8 | 4.4 |
| Cytop ® | 31 | 5.3 | 5.8 |

Example 4

Mixed-Gas Carbon Dioxide/Methane Permeation Properties

Membranes were prepared and membrane stamps were subjected to permeation experiments using the same general procedure as in Example 1. The temperature was 22° C., the feed pressure was 115 psia, and the feed gas mixture contained 65% carbon dioxide, 25% methane and 10% propane. The pressure-normalized fluxes of carbon dioxide and methane were measured, and the carbon dioxide/methane selectivities were calculated. The results are shown in Table 5.

TABLE 5

| Membrane | Mixed-Gas Pressure-Normalized Flux (GPU) | | $CO_2/CH_4$ |
|---|---|---|---|
| | $CO_2$ | $CH_4$ | Selectivity (—) |
| Hyflon ® AD60 | 460 | 27 | 17 |
| Hyflon ® AD80 | 1,620 | 125 | 13 |
| Cytop ® | 128 | 5.8 | 22 |

Example 5

Binary-Mixed-Gas Carbon Dioxide/Methane Permeation Properties

A Hyflon® AD60 membrane was prepared and subjected to permeation experiments using the same general procedure as in Example 1. The temperatures ranged from −20 to 20° C., the feed pressures ranged from 115 to 415 psia, and the feed gas mixture contained 70% carbon dioxide and 30% methane. The pressure-normalized fluxes of carbon dioxide and methane were measured, and the carbon dioxide/methane selectivities were calculated. The results are shown in Table 6.

TABLE 6

| Temperature | Pressure | Mixed-Gas Pressure-Normalized Flux (GPU) | | $CO_2/CH_4$ |
|---|---|---|---|---|
| (° C.) | (psia) | $CO_2$ | $CH_4$ | Selectivity (—) |
| 20 | 115 | 89 | 5.2 | 17 |
| −20 | 115 | 92 | 2.6 | 36 |
| −20 | 215 | 113 | 3.8 | 29 |

TABLE 6-continued

| Temperature | Pressure | Mixed-Gas Pressure-Normalized Flux (GPU) | | $CO_2/CH_4$ |
|---|---|---|---|---|
| (° C.) | (psia) | $CO_2$ | $CH_4$ | Selectivity (—) |
| −20 | 315 | 279 | 13 | 21 |
| −20 | 415 | 1,420 | 167 | 8.5 |

As can be seen from the table, the membranes retained useful carbon dioxide/methane selectivities over the test range. At −20° C., the saturation vapor pressure of carbon dioxide is 285 psia. Under the extreme conditions of low temperature (−20° C.) combined with high pressure (415 psia) of the test, carbon dioxide partial pressure reached 290 psia, i.e., saturation. Even when the gas mixture was saturated with carbon dioxide, the membranes withstood plasticization by carbon dioxide well enough to retain the carbon dioxide/methane selectivity at a usable level.

Example 6

Solvent Resistance of Hyflon® AD60 compared to Polysulfone

Experiments were carried out to determine the stability of a Hyflon® AD60 membrane in the presence of hydrocarbon solvents. Samples of a Hyflon® AD60 membrane were tested in a permeation test-cell as in Example 1. The fluxes were measured and the selectivities calculated. The membrane stamps were then immersed in liquid toluene or hexane. After one week, the membranes were removed from the hydrocarbon liquid, dried at ambient temperature, and retested in the gas permeation test-cell. A polysulfone (PSF) asymmetric membrane, typically used in hydrogen separation processes, was also tested for comparison. The permeation properties of the Hyflon® AD60 and polysulfone membranes before and after exposure to the hydrocarbon solvent are summarized in Table 7.

TABLE 7

| Membrane | Initial Flux (GPU) | | Initial Selectivity (—) | | Post-Toluene Flux (GPU) | | Post-Toluene Selectivity (—) | |
|---|---|---|---|---|---|---|---|---|
| | $N_2$ | $H_2$ | $O_2/N_2$ | $H_2/CH_4$ | $N_2$ | $H_2$ | $O_2/N_2$ | $H_2/CH_4$ |
| Hyflon ® | 30 | 350 | 3.1 | 25 | 41 | 477 | 3.1 | 26 |
| PSF | 1.2 | — | 5.6 | — | Dissolved | | | |

| Membrane | Initial Flux (GPU) | | Initial Selectivity (—) | | Post-Hexane Flux (GPU) | | Post-Hexane Selectivity (—) | |
|---|---|---|---|---|---|---|---|---|
| | $N_2$ | $H_2$ | $O_2/N_2$ | $H_2/CH_4$ | $N_2$ | $H_2$ | $O_2/N_2$ | $H_2/CH_4$ |
| Hyflon ® | 31 | 350 | 3.0 | 24 | 41 | 480 | 3.1 | 27 |
| PSF | 0.6 | 50 | 6.8 | 99 | 1.6 | 87 | 5.9 | 48 |

As can be seen, the polysulfone membranes could not withstand exposure to toluene, and their hydrogen/methane selectivity declined by half after exposure to hexane. In contrast, the dioxole copolymer Hyflon® membranes, although they exhibited higher fluxes for all gases for which they were tested after soaking in liquid hydrocarbons, retained their hydrogen/methane selectivity.

Examples 7–10

Comparative Examples with Teflon® AF 2400 Composite Membranes—Not in Accordance with the Invention

Example 7

Membrane Making

Asymmetric, microporous poly(vinylidene fluoride) [PVDF] support membranes were prepared. Composite membranes were prepared by dip-coating the support membranes three times in a solution of 1 wt % 2,2-bistrifluoromethyl-4,5-difluoro-1,3-dioxole/tetrafluoroethylene copolymer [Teflon® AF2400] solution in FC-84 solvent at 1 ft/min coating speed, then dried in an oven at 60° C. for 10 minutes. The resulting membranes had a selective layer thickness of 4 μm. Samples of each finished composite membrane were cut into 12.6 cm² stamps and tested in a permeation test-cell apparatus with pure oxygen and nitrogen at 22° C. feed temperature and 65 psia feed pressure. During each test, the feed, permeate, and residue compositions were analyzed by gas chromatography (GC). The gas fluxes were measured, and the selectivities were calculated. Table 8 summarizes the pressure-normalized fluxes and selectivities of the composite Teflon® AF membranes.

TABLE 8

| Mixed-Gas Pressure-Normalized Flux (GPU) | | Selectivity (–) |
|---|---|---|
| $N_2$ | $O_2$ | $O_2/N_2$ |
| 185 | 353 | 1.9 |

Example 8

Mixed-Gas Argon/Ethylene Permeation Properties

Membranes were prepared and subjected to permeation experiments using the same general procedure as in Example 7. The temperature was 22° C., the feed pressure was 165 psia, and the feed gas mixture was approximately 8% argon, 65% methane and 27% ethylene. The pressure-normalized fluxes of the gases were measured, and the selectivities were calculated. The results are shown in Table 9.

TABLE 9

| Mixed-Gas Pressure-Normalized Flux (GPU) | | | Selectivity (–) | |
|---|---|---|---|---|
| Ar | $CH_4$ | $C_2H_4$ | $Ar/CH_4$ | $Ar/C_2H_4$ |
| 232 | 159 | 158 | 1.5 | 1.5 |

As can be seen, the membranes are only slightly selective for argon over ethylene. In contrast, Example 2 showed that the membranes of the invention had exceptionally high argon/ethylene selectivities in the range of about 6 to 9.

Example 9

Mixed-Gas Nitrogen/Ethylene Permeation Properties

Membranes were prepared and subjected to permeation experiments using the same general procedure as in Example 7. The temperature was 22° C., the feed pressure was 165 psia, and the feed gas mixture was 80% nitrogen and 20% ethylene. The pressure-normalized fluxes of nitrogen and ethylene were measured, and the nitrogen/ethylene selectivities were calculated. The results are shown in Table 10.

TABLE 10

| Mixed-Gas Pressure-Normalized Flux (GPU) | | Selectivity (–) |
|---|---|---|
| $N_2$ | $C_2H_4$ | $N_2/C_2H_4$ |
| 177 | 159 | 1.1 |

The membrane was essentially unselective for nitrogen over ethylene. In contrast, Example 3 showed selectivities of about 4 to 6 for nitrogen over ethylene for the membranes of the invention.

Example 10

Mixed-Gas Carbon Dioxide/Methane Permeation Properties

Membranes were prepared and subjected to permeation experiments using the same general procedure as in Example 7. The temperature was 22° C., the feed pressure was 115 psia, and the feed gas mixture was 64% carbon dioxide, 25% methane and 11% propane. The pressure-normalized fluxes of the gases were measured, and the selectivities were calculated. The results are shown in Table 11.

TABLE 11

| Mixed-Gas Pressure-Normalized Flux (GPU) | | | Selectivity (–) | |
|---|---|---|---|---|
| $CO_2$ | $CH_4$ | $C_3H_8$ | $CO_2/CH_4$ | $CO_2/C_3H_8$ |
| 831 | 175 | 95.7 | 4.8 | 8.7 |

In this case, the carbon dioxide/methane selectivity was only 4.8, compared with 13–22 in experiments under similar conditions with the membranes of the invention reported in Example 4.

Examples 11–13

Comparison of Pure-Gas Permeation Properties with Hyflon® AD and Teflon® AF2400 Membranes

Example 11

Hyflon® AD60 Pure-Gas Permeation Properties

Hyflon® AD60 membranes were prepared as in Example 1, except using a poly(etherimide) support layer. The resulting membranes were tested as in Example 1 with pure hydrogen, nitrogen, methane, ethane, propane, and n-butane at 35° C. at feed pressures ranging from 35 to 165 psia. The n-butane was tested only at 32 psia, which is nearly 70% of the saturation vapor pressure of n-butane at 35° C. The measured pressure-normalized gas fluxes are shown graphically in FIG. 2. The calculated nitrogen/hydrocarbon selectivities are shown graphically in FIG. 3, and the calculated hydrogen/hydrocarbon selectivities are shown in FIG. 4.

Figure 2:
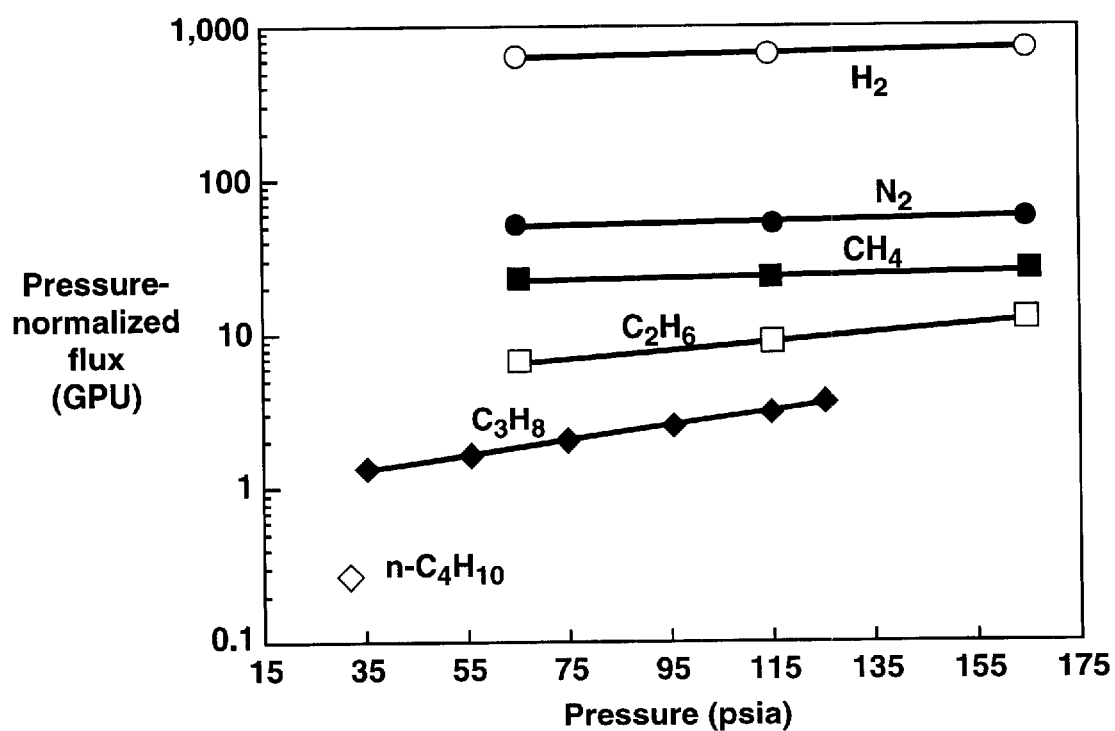
FIG. 2 is a graph of pressure-normalized pure-gas flux of hydrogen, nitrogen and several light hydrocarbons as a function of pressure for composite membranes having Hyflon® AD60 selective layers.
Figure 3:
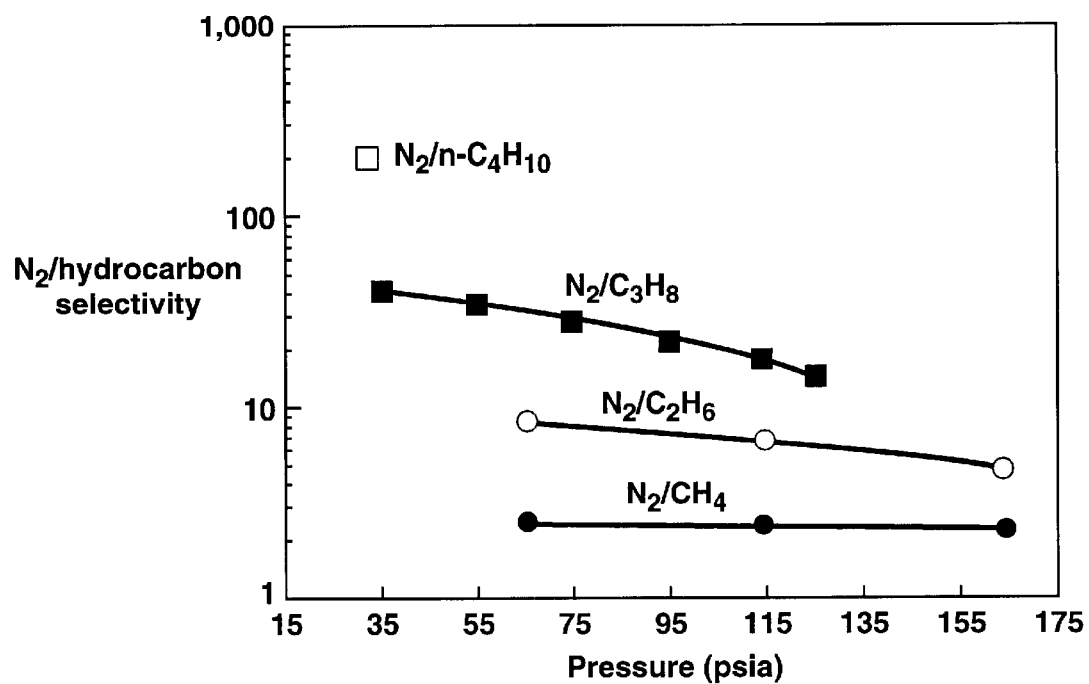
FIG. 3 is a graph of calculated nitrogen/hydrocarbon selectivity based on the pure gas data of FIG. 2.

As can be seen in FIG. 2, the hydrogen, nitrogen, and methane fluxes remained nearly constant across the range of pressures. The ethane flux increased from 6.9 GPU at 65 psia to 12.6 GPU at 165 psia, and the propane flux increased from 1.4 GPU at 35 psia to 3.9 GPU at 125 psia, which is about 70% of the saturation vapor pressure (180 psia) of propane at 35° C. As shown in FIG. 3, the nitrogen/methane selectivity remained constant at approximately 2.3 across the range of pressures. The nitrogen/ethane selectivity decreased from 8.2 at 65 psia to 4.5 at 165 psia, and the nitrogen/propane selectivity decreased from 42 at 35 psia to 30 at 125 psia. Although the nitrogen/propane selectivity decreased over the pressure range, the membrane remained nitrogen selective, at a useful selectivity, over the entire pressure range up to near-saturation.

Figure 4:
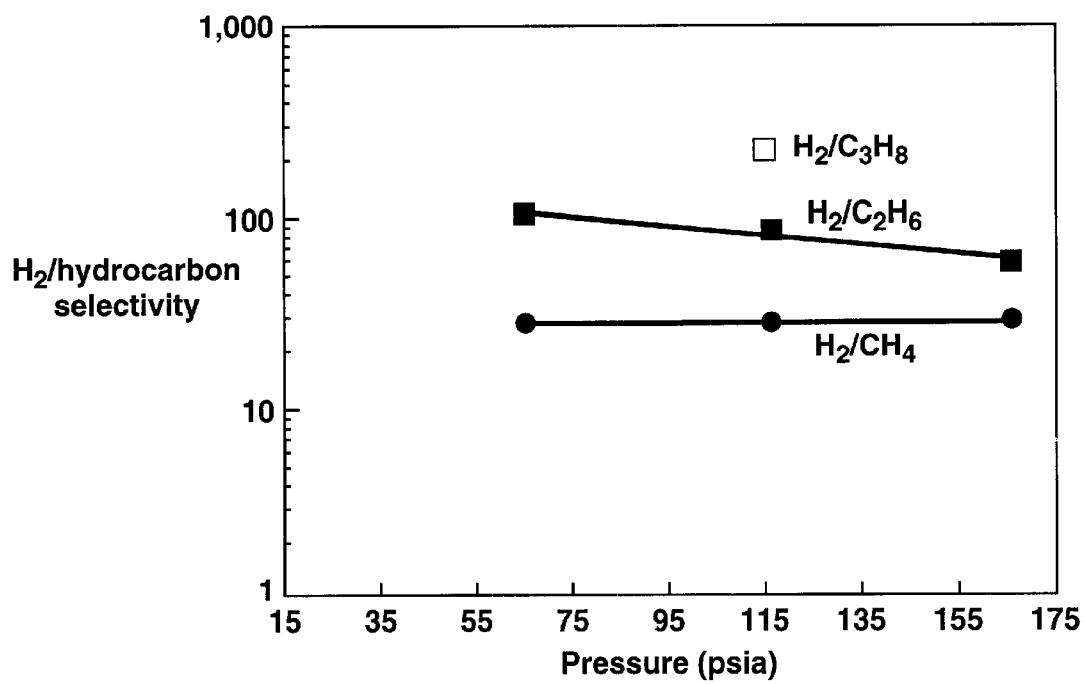
FIG. 4 is a graph of calculated hydrogen/hydrocarbon selectivity based on the pure gas data of FIG. 2.

As shown in FIG. 4, the hydrogen/methane selectivity remained constant at approximately 29 across the range of pressures. The hydrogen/ethane selectivity decreased slightly from 97 at 65 psia to 83 at 115 psia, then decreased further to 57 at 165 psia. The hydrogen/propane selectivity was 230 at 115 psia.

Example 12

Hyflon® AD80 Pure-Gas Permeation Properties

Hyflon® AD80 membranes were prepared as in Example 1, except using a poly(etherimide) support layer. The resulting membranes were tested as in Example 1 with pure hydrogen, nitrogen, methane, ethane, propane, and n-butane at 35° C. at feed pressures ranging from 35 to 165 psia. The n-butane was tested only at 32 psia, which is nearly 70% of the saturation vapor pressure of n-butane at 35° C. The measured pressure-normalized gas fluxes are shown graphically in FIG. 5. The calculated hydrogen/hydrocarbon selectivities are shown graphically in FIG. 6 and the calculated nitrogen/hydrocarbon selectivities are shown in FIG. 7.

Figure 5:
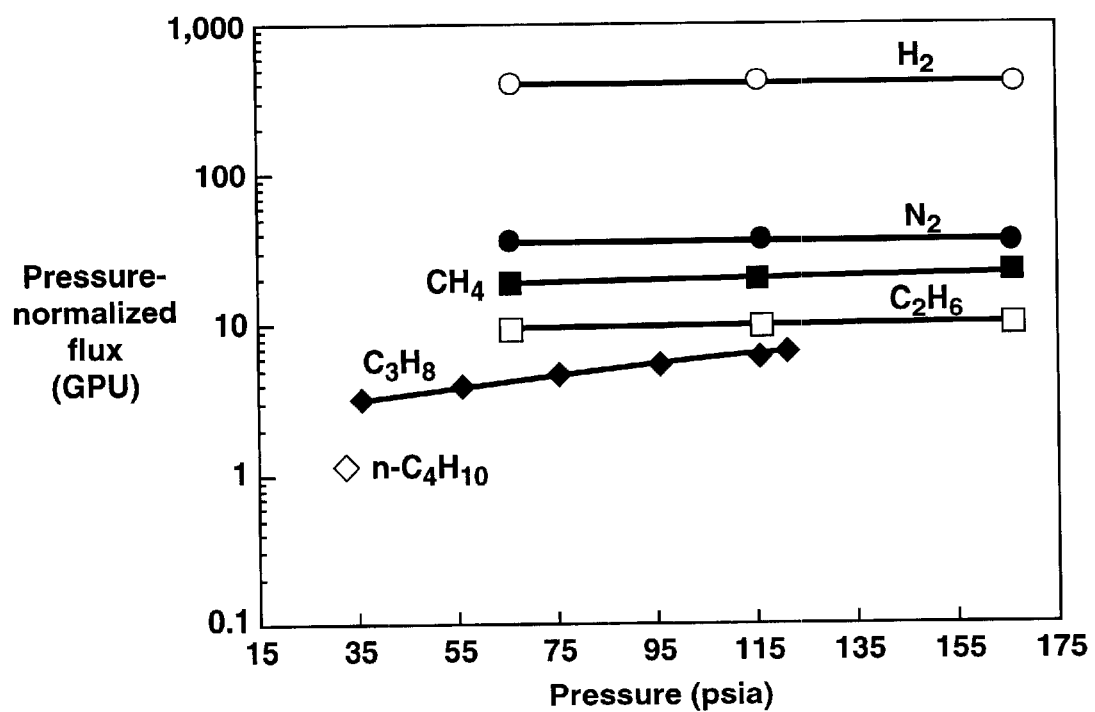
FIG. 5 is a graph of pressure-normalized pure-gas flux of hydrogen, nitrogen and several light hydrocarbons as a function of pressure for composite membranes having Hyflon® AD80 selective layers.
Figure 6:
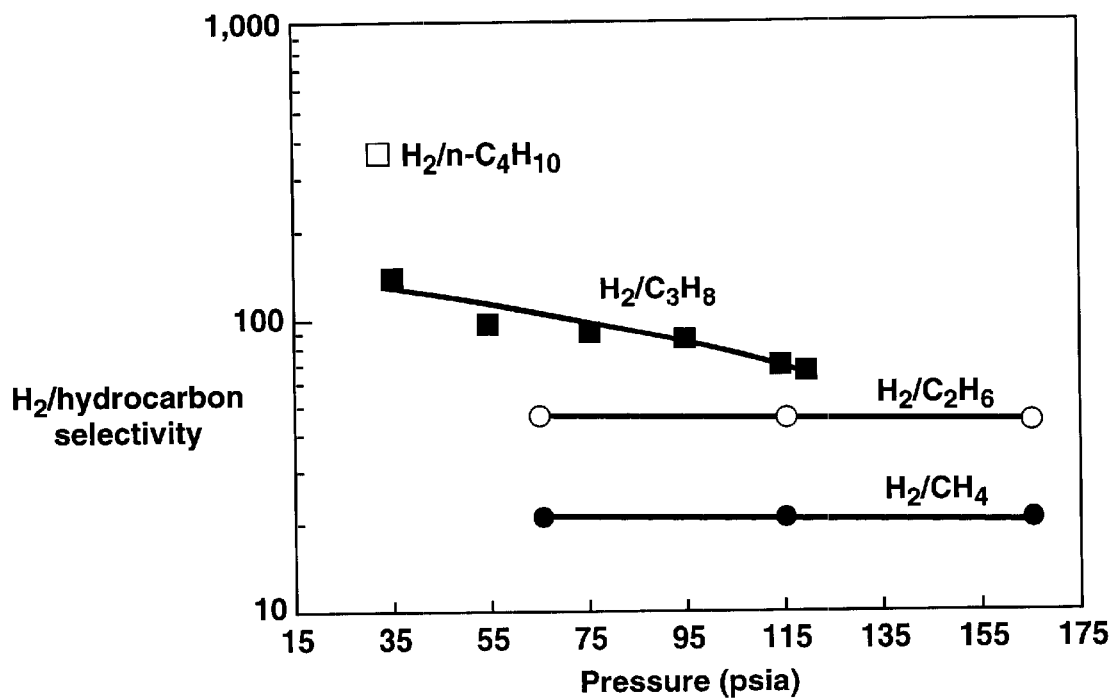
FIG. 6 is a graph of calculated hydrogen/hydrocarbon selectivity based on the pure gas data of FIG. 5.

As can be seen in FIG. 5, the hydrogen, nitrogen, methane and ethane fluxes remained nearly constant across the range of pressures. The propane flux increased from 3 GPU at 35 psia to 6.6 GPU at 120 psia. As shown in FIG. 6, the hydrogen/methane and hydrogen/ethane selectivities remained constant at approximately 20 and 44, respectively, across the range of pressures. The hydrogen/propane selectivity decreased from 140 at 35 psia to 66 at 120 psia. Thus, as in the previous example, the membranes retained useful hydrogen/hydrocarbon selectivity, even at close to hydrocarbon saturation. The hydrogen/n-butane selectivity was 373.

Figure 7:
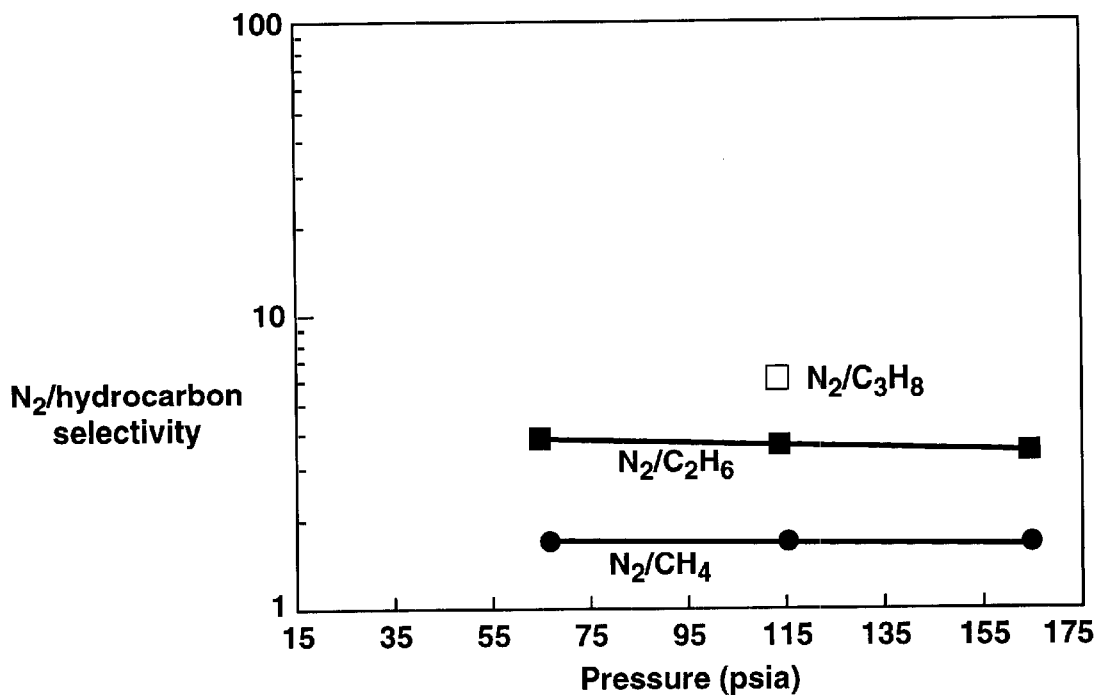
FIG. 7 is a graph of calculated nitrogen/hydrocarbon selectivity based on the pure gas data of FIG. 5.

As shown in FIG. 7, the nitrogen/methane and nitrogen/ethane selectivities remained nearly constant at approximately 1.7 and 3.8, respectively, across the range of pressures. The nitrogen/propane selectivity was 5.9 at 115 psia.

Example 13

Teflon® AF2400 Pure-Gas Permeation Properties—
Not in Accordance with the Invention Teflon® AF2400 membranes were prepared as in Example 7, except using a poly(etherimide) support layer. The resulting membranes were tested as in Example 7 with pure hydrogen, nitrogen, methane, ethane, propane, and n-butane at 35° C. at pressures ranging from 17 to 165 psia. The n-butane was tested only up to 31 psia, 31 psia being about 65% of the saturation vapor pressure of n-butane at 35° C. The measured pressure-normalized gas fluxes are shown graphically in FIG. 8. The calculated nitrogen/hydrocarbon and hydrogen/hydrocarbon selectivities are shown graphically in FIGS. 9 and 10, respectively.

Figure 8:
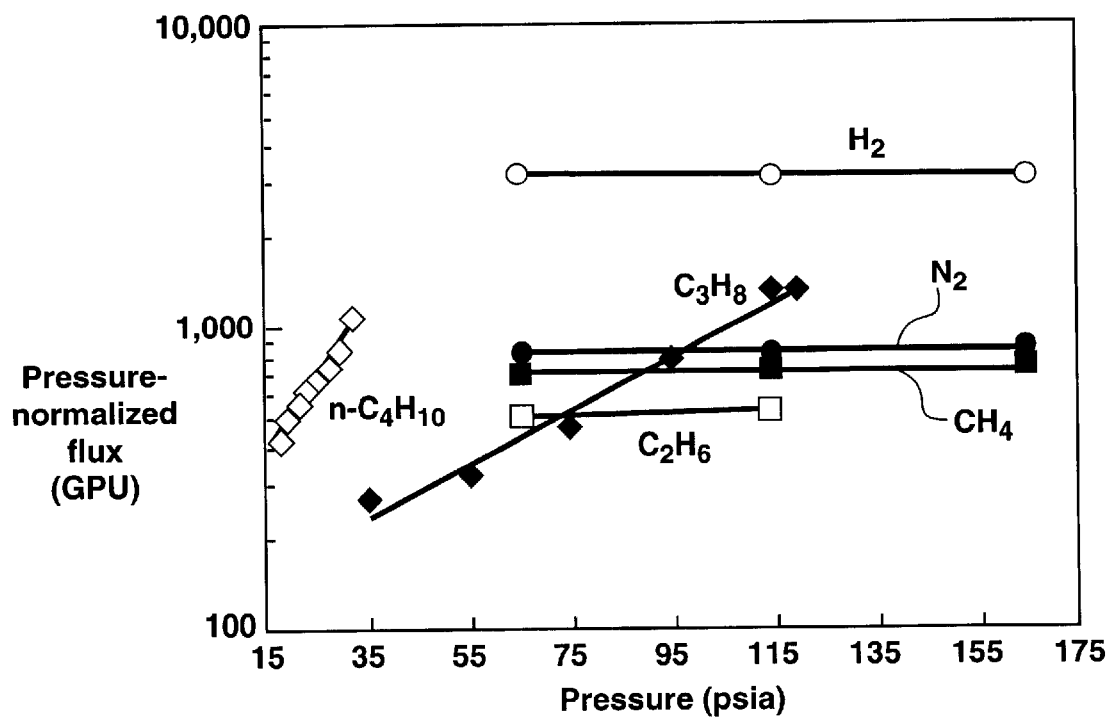
FIG. 8 is a graph of pressure-normalized pure-gas flux of hydrogen, nitrogen and several light hydrocarbons as a function of pressure for composite membranes having Teflon® AF 2400 selective layers.

As can be seen in FIG. 8, the hydrogen, nitrogen, methane, and ethane fluxes remained nearly constant across the range of pressures. The propane flux increased nearly five-fold from 268 GPU at 35 psia to 1,310 GPU at 120 psia, and the n-butane flux increased from 400 GPU at 17 psia to 1,110 GPU at 31 psia.

Figure 9:
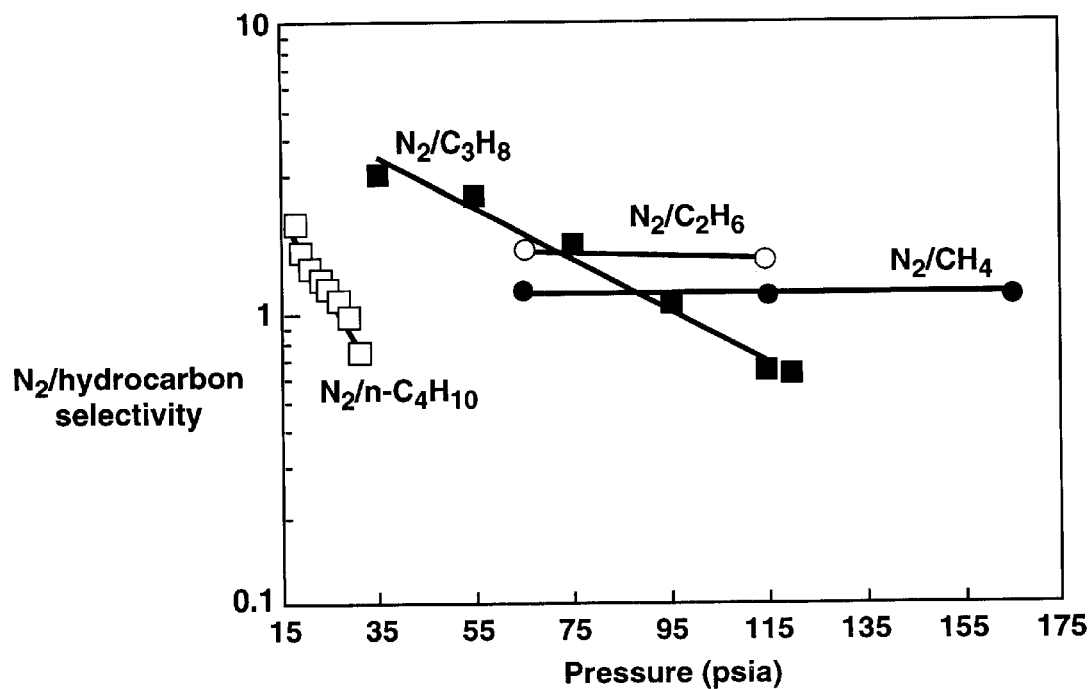
FIG. 9 is a graph of calculated nitrogen/hydrocarbon selectivity based on the pure gas data of FIG. 8.

As shown in FIG. 9, the nitrogen/methane and nitrogen/ethane selectivities were all low and remained constant at approximately 1.1 and 1.6, respectively, across the range of pressures. The nitrogen/propane selectivity decreased from 3.0 at 35 psia to 1.0 at 95 psia, about half the saturation vapor pressure of propane at 35° C., then to 0.6 at 120 psia. In other words, the membrane selectivity was initially low, and the membrane lost its nitrogen/propane selectivity completely by about 50% saturation and became hydrocarbon-selective as the pressure increased towards the propane saturation vapor pressure. Likewise, the nitrogen/n-butane selectivity decreased from 2 at 17 psia to 1 at 27 psia, then to 0.7 at 31 psia, again indicating that the membrane had become hydrocarbon-selective as the pressure increased.

Figure 10:
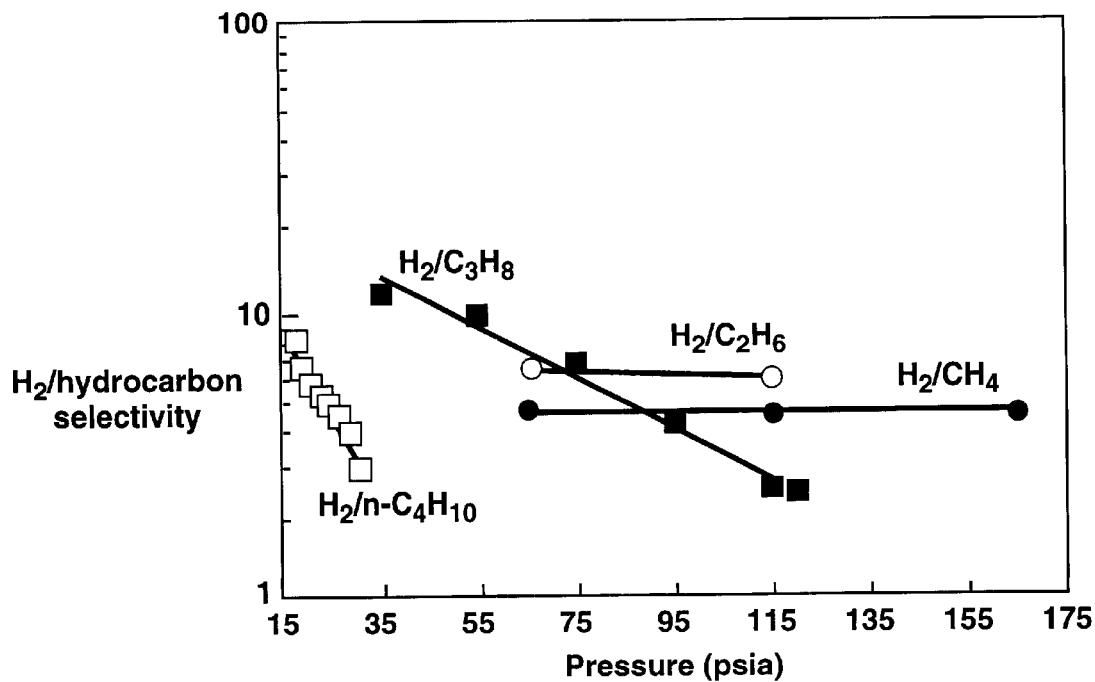
FIG. 10 is a graph of calculated hydrogen/hydrocarbon selectivity based on the pure gas data of FIG. 8.

As shown in FIG. 10, the hydrogen/methane selectivity remained constant at approximately 4.4 across the range of pressures. The hydrogen/ethane selectivity decreased slightly from 6.4 at 65 psia to 5.9 at 115 psia. The hydrogen/propane selectivity decreased from 11.6 at 35 psia to 2.4 at 120 psia, indicating that the Teflon® AF was being plasticized by the propane. The selectivity declined to about 5, less than half its original value, at a pressure of about 75 psia, which is only about 40% of the 180 psia saturation vapor pressure of propane at 35° C. Likewise, the hydrogen/n-butane selectivity decreased from 7.8 at 17 psia to 2.8 at 31 psia, again indicating that the material had plasticized and lost its hydrogen-selective capability in the presence of $C_{3+}$ hydrocarbons.

Examples 14–15

Hyflon® AD60 Multicomponent Mixed-Gas
Permeation Properties as a Function of Pressure Example 14

Hyflon® AD60 membranes were prepared as in Example 11 above and were tested with a gas mixture containing approximately 63% carbon dioxide, 27% methane, and 10% propane at 22° C. at feed pressures ranging from 115 to 415 psia. The saturation vapor pressure of the gas mixture is about 915 psia; thus, at 415 psia, the mixture was about 45% saturated. The measured pressure normalized gas fluxes are shown graphically in FIG. 11. The calculated carbon dioxide/hydrocarbon selectivities are shown graphically in FIG. 12.

Figure 11:
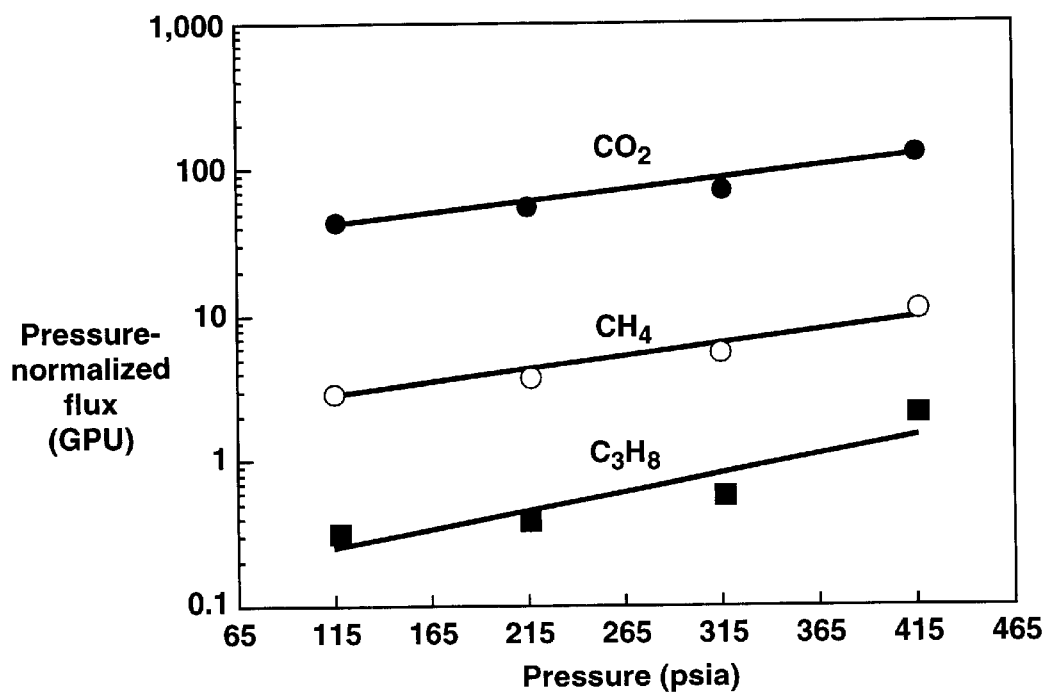
FIG. 11 is a graph of pressure-normalized mixed-gas flux of carbon dioxide, methane and propane as a function of pressure for composite membranes having Hyflon® AD 60 selective layers.
Figure 12:
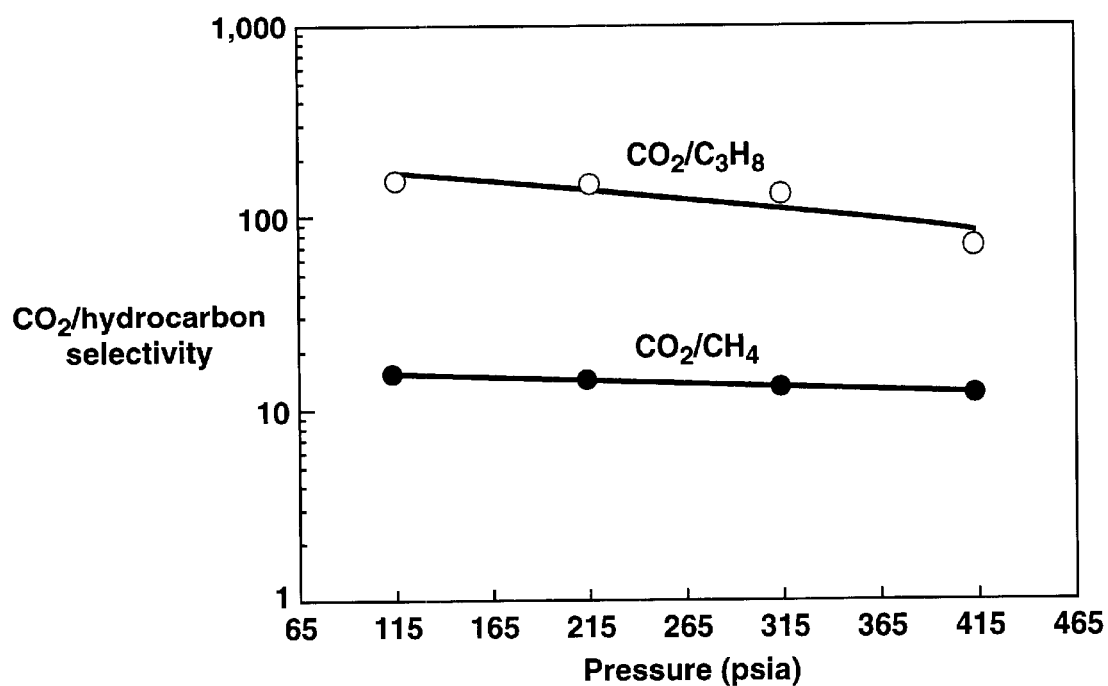
FIG. 12 is a graph of mixed-gas carbon dioxide/methane and carbon dioxide/propane selectivity based on the mixed gas data of FIG. 11.

As can be seen in FIG. 11, the fluxes all increased across the range of pressures. The carbon dioxide flux increased from 46.5 GPU to 136 GPU. The methane flux increased from 3.1 GPU to 11.6 GPU. The propane flux increased from 0.3 GPU to 2.0 GPU. As shown in FIG. 12, the carbon dioxide/methane selectivity decreased only slightly from 15 to 12 across the range of pressures. The carbon dioxide/propane selectivity decreased from 152 to 68.

Example 15

Hyflon® AD60 membranes were prepared as in Example 11 above and were tested with a gas mixture containing approximately 42% hydrogen, 20% methane, 25% ethane, 11% propane, and 1.4% n-butane at 25° C. at feed pressures ranging from 115 to 415 psia. The saturation vapor pressure of the gas mixture was about 1,130 psia; thus, at 415 psia, the mixture was about 37% saturated. The measured pressure-normalized gas fluxes are shown graphically in FIG. 13. The calculated hydrogen/hydrocarbon selectivities are shown graphically in FIG. 14.

Figure 13:
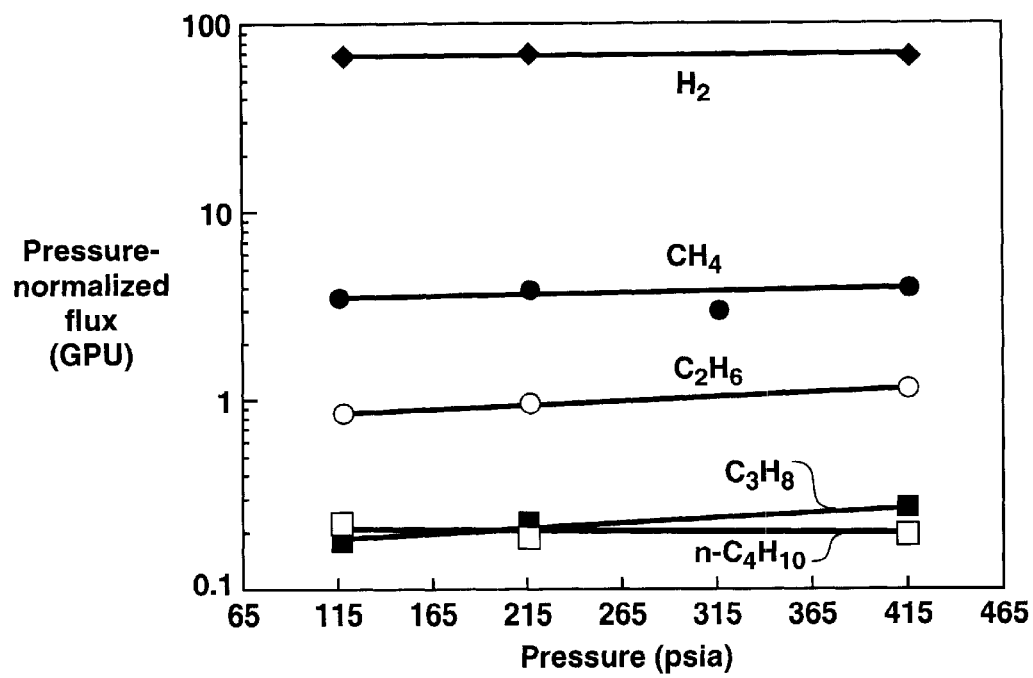
FIG. 13 is a graph of pressure-normalized mixed-gas flux of hydrogen and several light hydrocarbons as a function of pressure for composite membranes having Hyflon® AD 60 selective layers.
Figure 14:
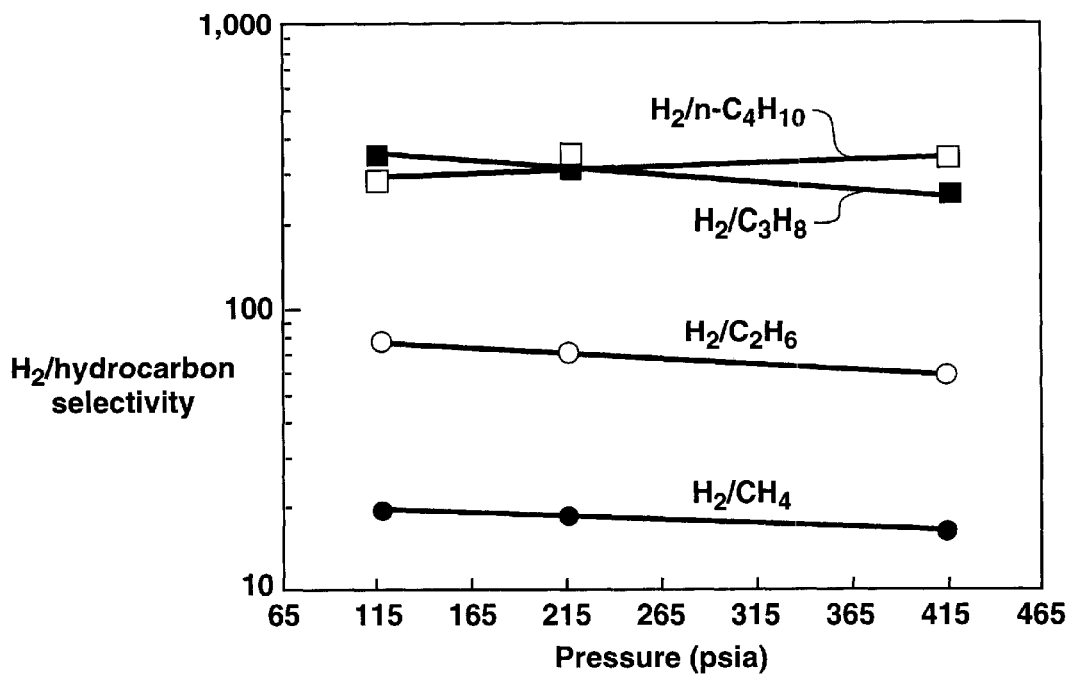
FIG. 14 is a graph of mixed-gas hydrogen/hydrocarbon selectivities based on the mixed gas data of FIG. 13.

As can be seen in FIG. 13, the fluxes of hydrogen, methane, ethane, and propane increased slightly across the range of pressures. The n-butane flux decreased slightly from 0.23 GPU at 115 psia to 0.20 GPU at 415 psia. As shown in FIG. 14, the hydrogen/methane, hydrogen/ethane, and hydrogen/propane selectivities decreased slightly across the range of pressures. The hydrogen/n-butane selectivity appeared to increase from 280 to 328 as the feed pressure increased, but this apparent increase is within the range of experimental error.

Examples 16–18

Comparison of Methane/n-Butane Permeation Properties with Hyflon® AD and Teflon® AF2400 Membranes

Example 16

Methane/n-Butane Permeation Properties with Hyflon® AD60 Membranes

Hyflon® AD60 membranes were prepared and membrane stamps were subjected to permeation experiments using the same general procedure as in Example 1. The temperature was 21° C., the pressure was 115 psia, and the feed gas mixture contained n-butane in varying concentrations from 2–8% and the balance methane. The saturation vapor pressure of n-butane at 21° C. is about 31 psia; thus, at the highest n-butane concentration (8%), the gas mixture was about 25% saturated. The pressure-normalized fluxes of methane and n-butane were measured, and the methane/n-butane selectivities at the varying n-butane concentrations were calculated. The results are shown in Table 12.

TABLE 12

| $n-C_4H_{10}$ Concentration | Mixed-Gas Pressure-Normalized Flux (GPU) | | $CH_4/n-C_4H_{10}$ Selectivity |
|---|---|---|---|
| (%) | $CH_4$ | $n-C_4H_{10}$ | (–) |
| 2 | 11.4 | 2.6 | 4.4 |
| 4 | 11.0 | 2.4 | 4.5 |
| 6 | 10.6 | 2.5 | 4.2 |
| 8 | 10.5 | 2.6 | 4.1 |

Figure 15:
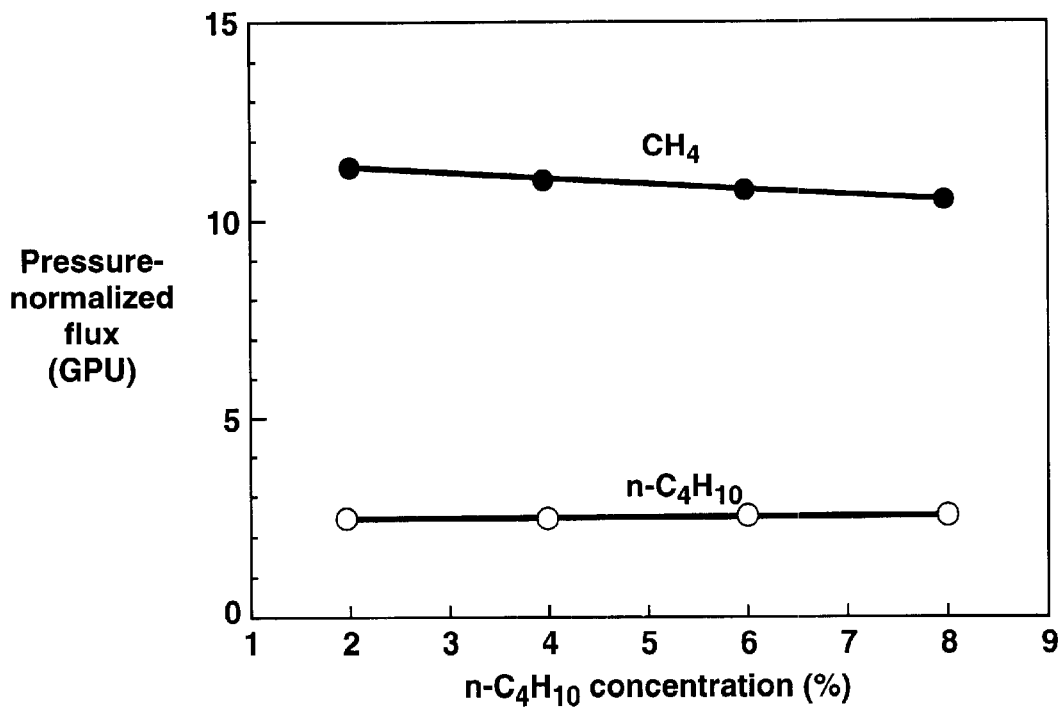
FIG. 15 is a graph of pressure-normalized mixed-gas flux of methane and n-butane as a function of n-butane concentration for composite membranes having Hyflon® AD 60 selective layers.
Figure 16:
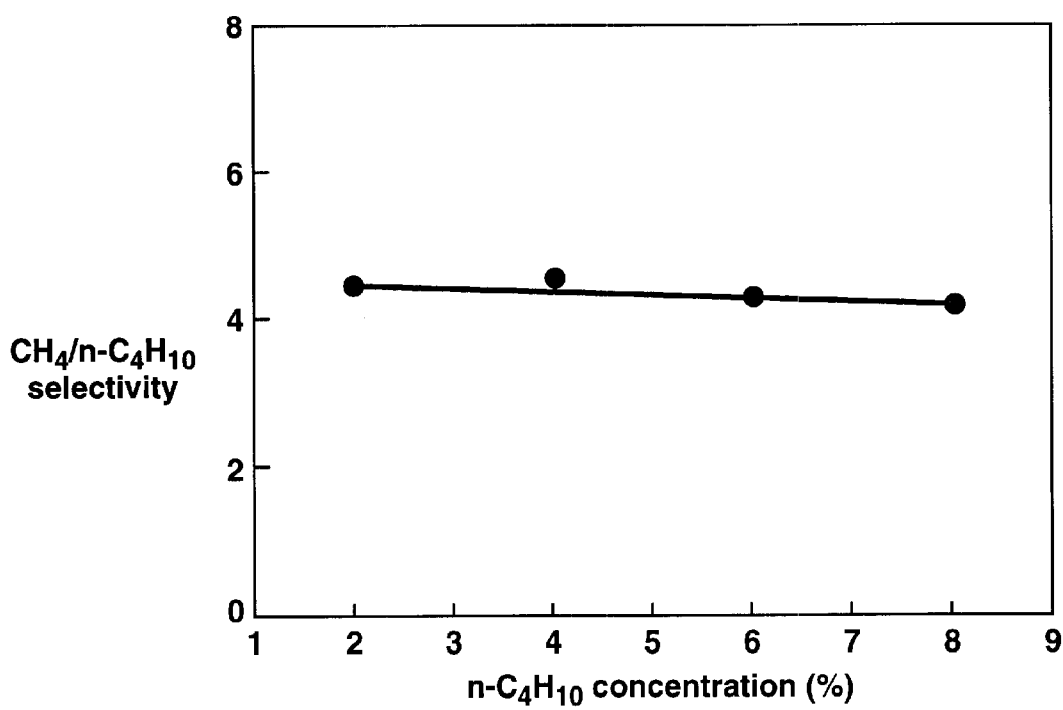
FIG. 16 is a graph of mixed-gas methane/n-butane selectivity based on the mixed gas data of FIG. 15.

FIGS. 15 and 16 are graphs showing the measured pressure-normalized fluxes and the calculated selectivities, respectively. As can be seen, the fluxes and selectivities remain nearly constant over the range of n-butane concentrations.

Example 17

Methane/n-Butane Permeation Properties with Hyflon® AD80 Membranes

Hyflon® AD80 membranes were prepared and membrane stamps were subjected to permeation experiments using the same general procedure as in Example 1. The temperature was 21° C., the pressure was 115 psia, and the feed gas mixture contained n-butane in varying concentrations from 2–8% and the balance methane. Again, at the highest n-butane concentration (8%), the gas mixture was about 25% saturated. The pressure-normalized fluxes of methane and n-butane were measured, and the methane/n-butane selectivities at the varying n-butane concentrations were calculated. The results are shown in Table 13.

TABLE 13

| $n-C_4H_{10}$ Concentration | Mixed-Gas Pressure-Normalized Flux (GPU) | | $CH_4/n-C_4H_{10}$ Selectivity |
|---|---|---|---|
| (%) | $CH_4$ | $n-C_4H_{10}$ | (–) |
| 2 | 31 | 4.8 | 6.4 |
| 4 | 32 | 4.7 | 6.7 |
| 6 | 29 | 4.7 | 6.3 |
| 8 | 31 | 4.7 | 6.6 |

Figure 17:
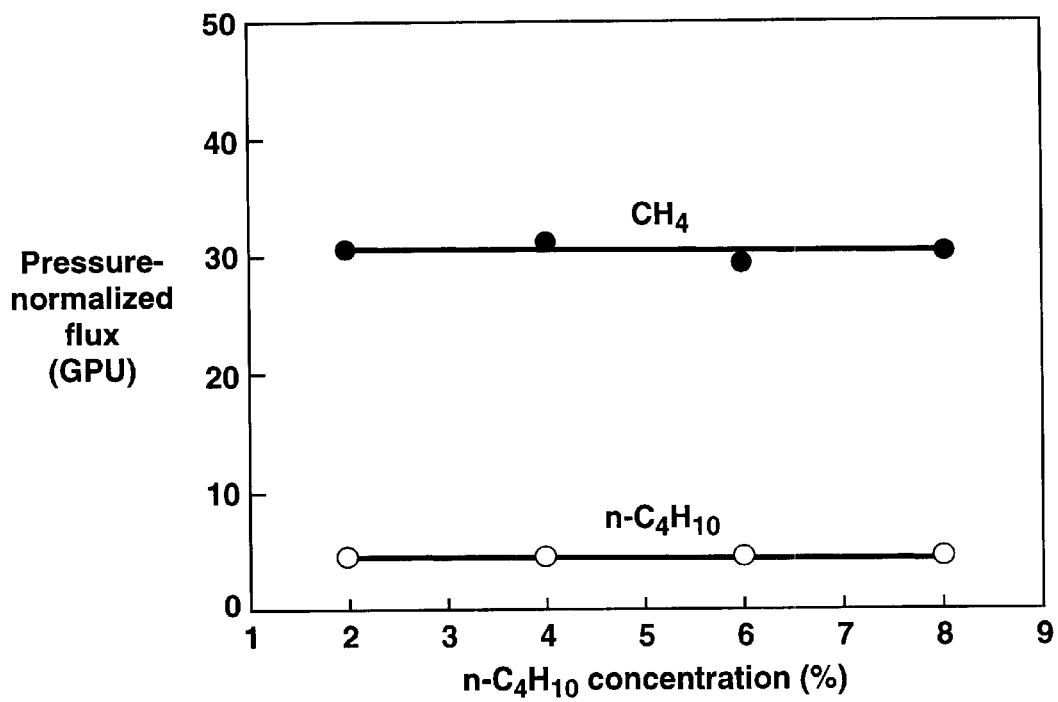
FIG. 17 is a graph of pressure-normalized mixed-gas flux of methane and n-butane as a function of n-butane concentration for composite membranes having Hyflon® AD 80 selective layers.
Figure 18:
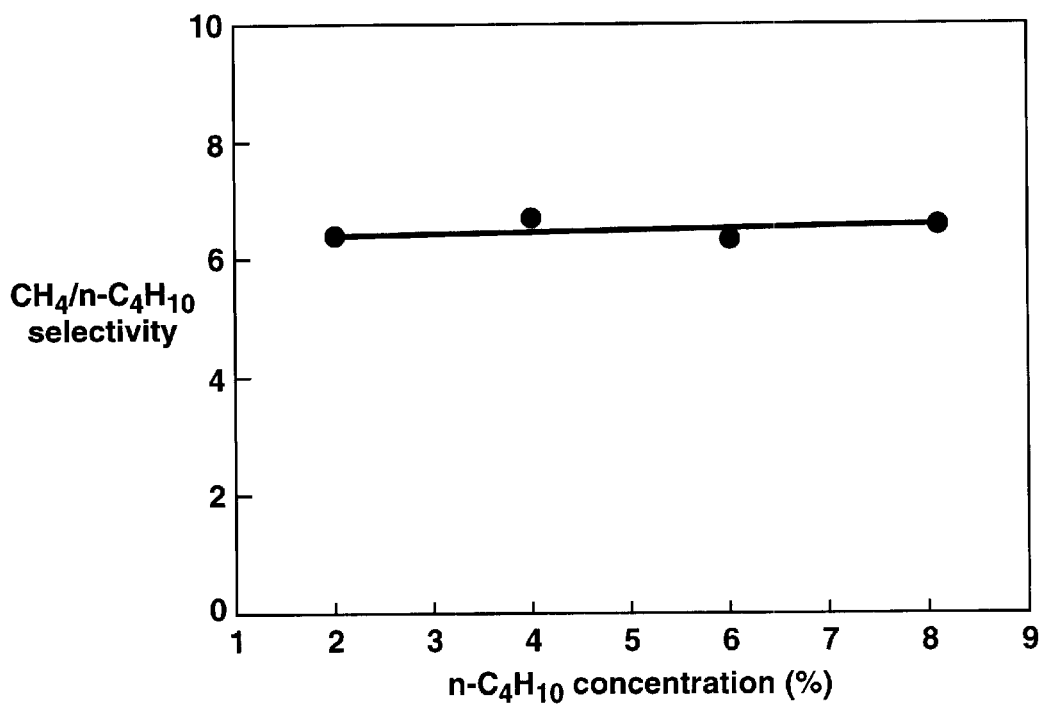
FIG. 18 is a graph of mixed-gas methane/n-butane selectivity based on the mixed gas data of FIG. 17.

FIGS. 17 and 18 are graphs showing the measured pressure-normalized fluxes and the calculated selectivities, respectively. As can be seen, the fluxes and selectivities remain nearly constant over the range of n-butane concentrations.

Example 18

Methane/n-Butane Permeation Properties with Teflon® AF2400 Membranes—Not in Accordance with the Invention Teflon® AF2400 membranes were prepared and membrane stamps were subjected to permeation experiments using the same general procedure as in Example 7. The temperature was 21° C., the pressure was 115 psia, and the feed gas mixture contained n-butane in varying concentrations from 2–8% and the balance methane. Again, at the highest n-butane concentration (8%), the gas mixture was about 25% saturated. The pressure-normalized fluxes of methane and n-butane were measured, and the methane/n-butane selectivities at the varying n-butane concentrations were calculated. The results are shown in Table 14.

TABLE 14

| $n-C_4H_{10}$ Concentration | Mixed-Gas Pressure-Normalized Flux (GPU) | | $CH_4/n-C_4H_{10}$ Selectivity |
|---|---|---|---|
| (%) | $CH_4$ | $n-C_4H_{10}$ | (–) |
| 2 | 103 | 71 | 1.4 |
| 4 | 122 | 82 | 1.5 |
| 6 | 92 | 80 | 1.2 |
| 8 | 112 | 103 | 1.1 |

Figure 19:
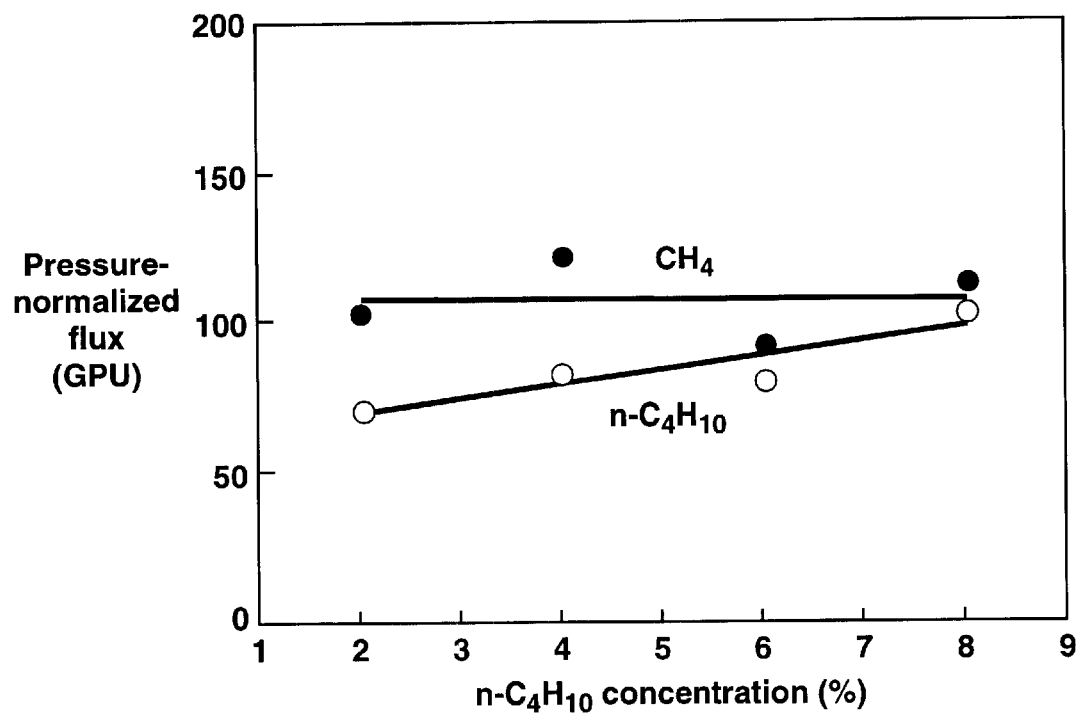
FIG. 19 is a graph of pressure-normalized mixed-gas flux of methane and n-butane as a function of n-butane concentration for composite membranes having Teflon® AF2400 selective layers.
Figure 20:
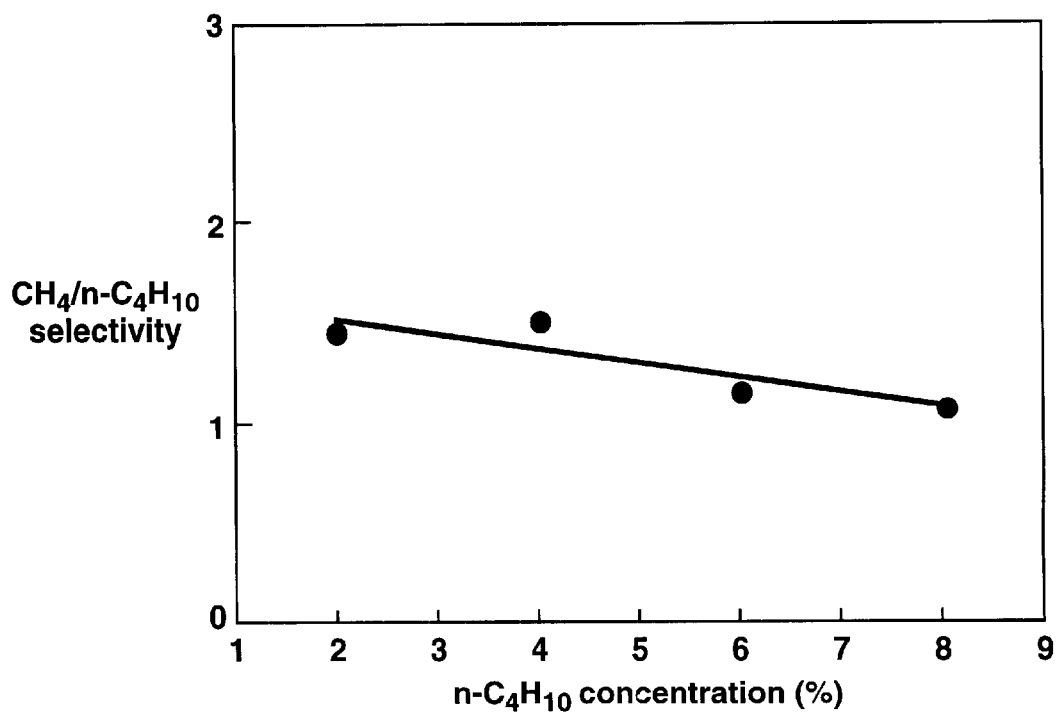
FIG. 20 is a graph of mixed-gas methane/n-butane selectivity based on the mixed gas data of FIG. 19.

FIGS. 19 and 20 are graphs showing the measured pressure-normalized fluxes and the calculated selectivities, respectively. As can be seen in FIG. 20, the membranes are only marginally selective for methane over n-butane, and decreasingly so at higher n-butane concentrations.

Examples 19–21

Mixed-Gas Permeation Properties in Modules

Example 19

Hyflon® AD60 Membrane Module Permeation Properties at 20° C.

Hyflon® AD60 membranes were prepared as in Example 11. The resulting membranes were rolled into a spiral-wound module, which was tested in a module test apparatus at 20° C. at varying pressures. The feed gas mixture was 65% methane, 10% ethane, 5% propane, and 20% carbon dioxide. The saturation vapor pressure of this gas mixture was calculated to be approximately 1,150 psia. The pressure-normalized gas fluxes were measured and the selectivities calculated. The results are shown in Table 15.

TABLE 15

| Pressure | Pressure-Normalized Flux (GPU) | | | | $CO_2/CH_4$ Selectivity | $CO_2/C_3H_8$ Selectivity | $CH_4/C_3H_8$ Selectivity |
|---|---|---|---|---|---|---|---|
| (psia) | $CH_4$ | $C_2H_6$ | $C_3H_8$ | $CO_2$ | (-) | (-) | (-) |
| 213 | 8.1 | 3.4 | 1.6 | 135 | 16.6 | 84.5 | 5.1 |
| 315 | 7.9 | 3.4 | 1.7 | 117 | 14.8 | 69.0 | 4.6 |
| 414 | 9.2 | 4.1 | 2.0 | 123 | 13.4 | 61.6 | 4.6 |
| 515 | 11.1 | 4.9 | 2.3 | 132 | 11.8 | 57.3 | 4.8 |
| 615 | 14.4 | 6.5 | 2.6 | 148 | 10.2 | 56.7 | 5.5 |
| 715 | 16.0 | 7.4 | 3.0 | 146 | 9.1 | 48.8 | 4.6 |
| 815 | 18.8 | 8.9 | 3.5 | 148 | 7.9 | 42.4 | 5.4 |
| 915 | 22.8 | 11.5 | 4.4 | 152 | 6.7 | 34.5 | 5.2 |
| 1,015 | 29.1 | 15.8 | 7.0 | 146 | 5.0 | 20.8 | 4.1 |

As can be seen, the carbon dioxide flux remained relatively stable across the range of pressures. The methane and propane fluxes increased 3- to 4-fold with increasing pressure, resulting in the carbon dioxide/methane and carbon dioxide/propane selectivities decreasing with increasing pressure. However, even at 615 psia, at greater than 50% saturation, the membrane maintained a carbon dioxide/methane selectivity of 10.

Example 20

Hyflon® AD60 Membrane Module Permeation Properties at 0° C.

The experiment of Example 19 was repeated, except at 0° C. at varying pressures. The feed gas mixture was 65% methane, 10% ethane, 5% propane, and 20% carbon dioxide. At this low temperature, the saturation vapor pressure of the gas mixture was calculated to be approximately 915 psia. The pressure-normalized gas fluxes were measured and the selectivities calculated. The results are shown in Table 16.

TABLE 16

| Pressure | Pressure-Normalized Flux (GPU) | | | | $CO_2/CH_4$ Selectivity | $CO_2/C_3H_8$ Selectivity | $CH_4/C_3H_8$ Selectivity |
|---|---|---|---|---|---|---|---|
| (psia) | $CH_4$ | $C_2H_6$ | $C_3H_8$ | $CO_2$ | (-) | (-) | (-) |
| 213 | 5.3 | 2.6 | 1.7 | 116 | 21.6 | 67.9 | 3.1 |
| 315 | 5.1 | 2.5 | 1.6 | 95.2 | 18.8 | 59.5 | 3.2 |
| 414 | 6.5 | 3.3 | 1.8 | 108 | 16.7 | 59.9 | 3.6 |
| 515 | 7.4 | 3.7 | 2.1 | 120 | 16.2 | 57.0 | 3.5 |
| 615 | 12.5 | 6.7 | 3.2 | 151 | 12.0 | 47.2 | 3.9 |
| 715 | 17.1 | 10.0 | 4.2 | 170 | 10.0 | 40.6 | 4.1 |
| 815 | 22.5 | 13.8 | 6.9 | 184 | 8.1 | 26.6 | 3.3 |
| 915 | 45.2 | 36.6 | 20.5 | 222 | 4.9 | 10.8 | 2.2 |
| 1,015 | 54.5 | 43.7 | 23.6 | 224 | 4.1 | 9.5 | 2.3 |

As can be seen, the carbon dioxide flux nearly doubled across the range of pressures. The methane and propane fluxes increased 10- to 14-fold with increasing pressure, resulting in the carbon dioxide/methane and carbon dioxide/propane selectivities again decreasing with increasing pressure. However, even at 715 psia, at nearly 80% saturation, the membrane maintained a carbon dioxide/methane selectivity of 10.

Example 21

Effect of Temperature and Hydrocarbon Saturation on Selectivity

Figure 21:
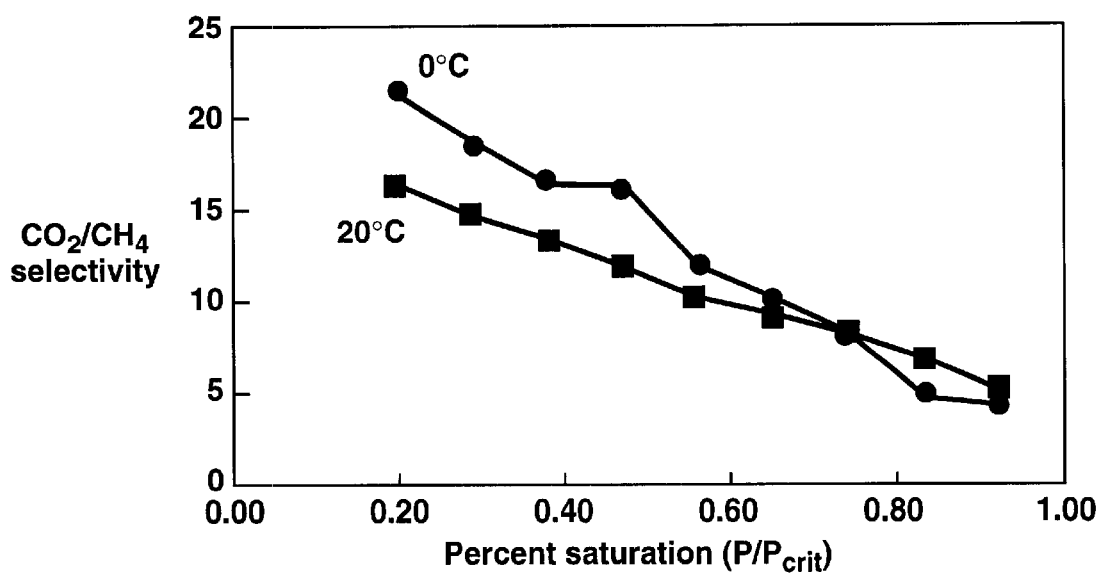
FIG. 21 is a graph of mixed-gas carbon dioxide/methane selectivity as a function of percent saturation of the gas mixture.

Based on the data from Examples 19 and 20, the carbon dioxide/methane selectivity was calculated as a function of temperature and percent saturation, expressed as the ratio of pressure to saturated vapor pressure or critical pressure. The results are shown in FIG. 21. As can be seen, selectivity declines with increasing saturation, but remains acceptable even at high saturation levels.

Examples 22–25

Effect of Carbon Dioxide on Plasticization of Hyflon® Membranes

Example 22

Hyflon® AD60 Membrane Permeation Properties at 20° C. at Varying Pressures

Figure 22:
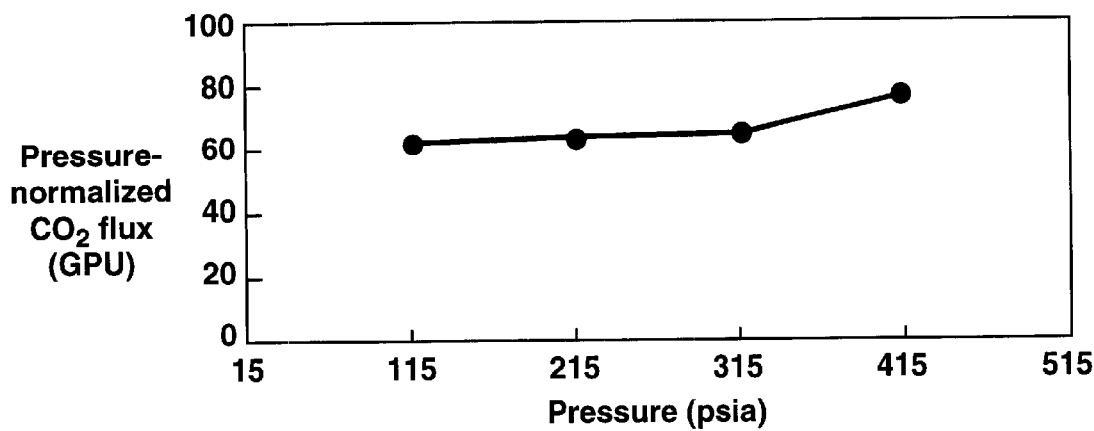
FIG. 22 is a graph of pressure-normalized mixed-gas flux of carbon dioxide at 20° C. as a function of pressure for composite membranes having Hyflon® AD 60 selective layers.
Figure 23:
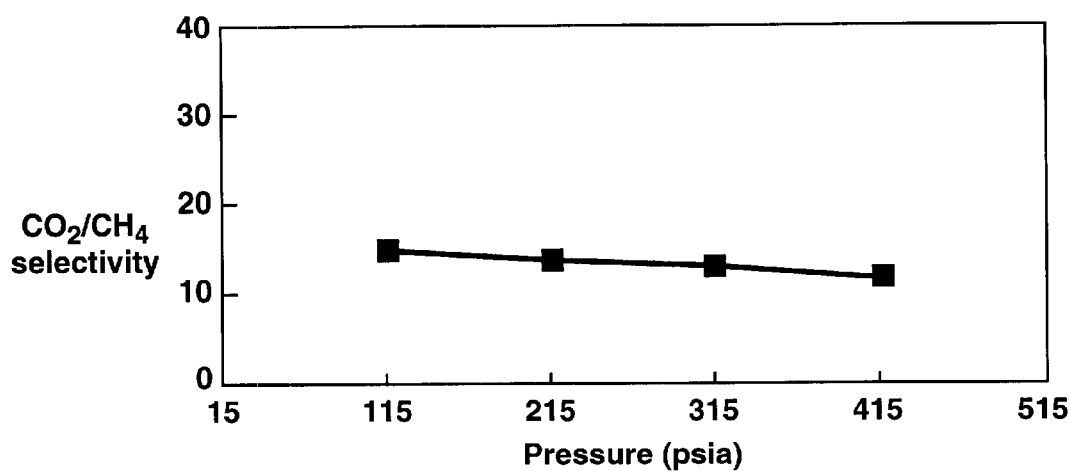
FIG. 23 is a graph of mixed-gas carbon dioxide/methane selectivity based on the mixed-gas data of FIG. 22.

A Hyflon® AD60 membrane was made and a membrane stamp was tested as in Example 11 at 20° C. at varying pressures. The feed gas contained 30% methane and 70% carbon dioxide. The pressure-normalized gas fluxes were measured and the selectivities calculated. The results are shown in FIGS. 22 and 23, respectively. As can be seen in FIG. 22, the carbon dioxide flux increased only slightly from 63 GPU at 115 psia to 76 GPU at 415 psia. FIG. 23 shows that, as a result, the carbon dioxide/methane selectivity decreased only slightly from 15 at 15 psia to 12 at 415 psia.

Example 23

Hyflon® AD60 Membrane Permeation Properties at −20° C. at Varying Pressures

Figure 24:
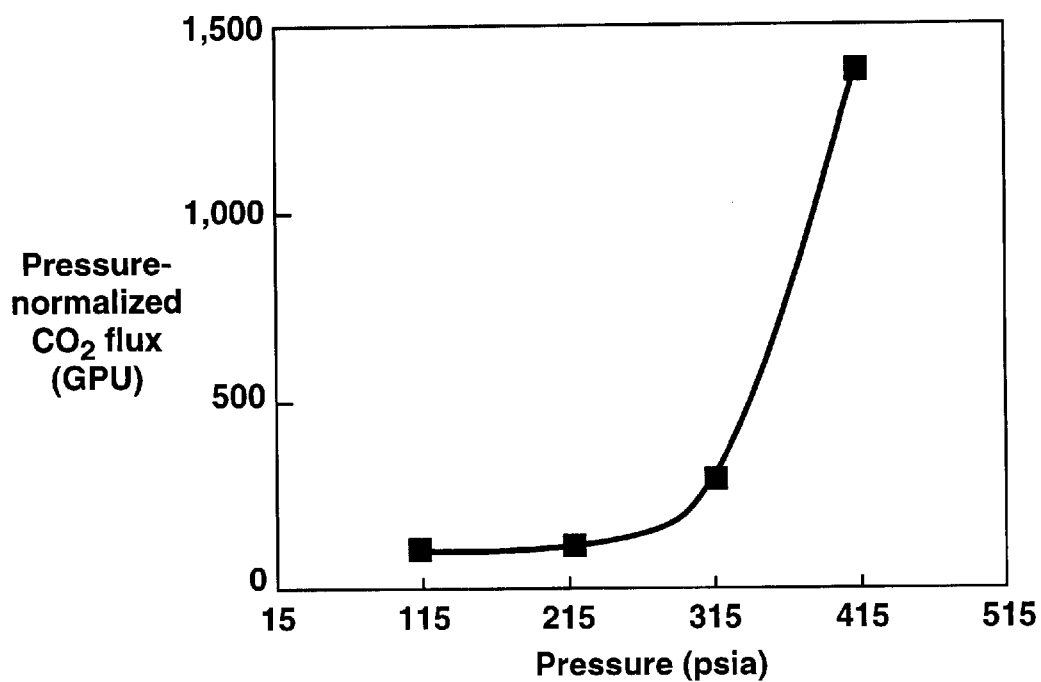
FIG. 24 is a graph of pressure-normalized mixed-gas flux of carbon dioxide at −20° C. as a function of pressure for composite membranes having Hyflon® AD 60 selective layers.
Figure 25:
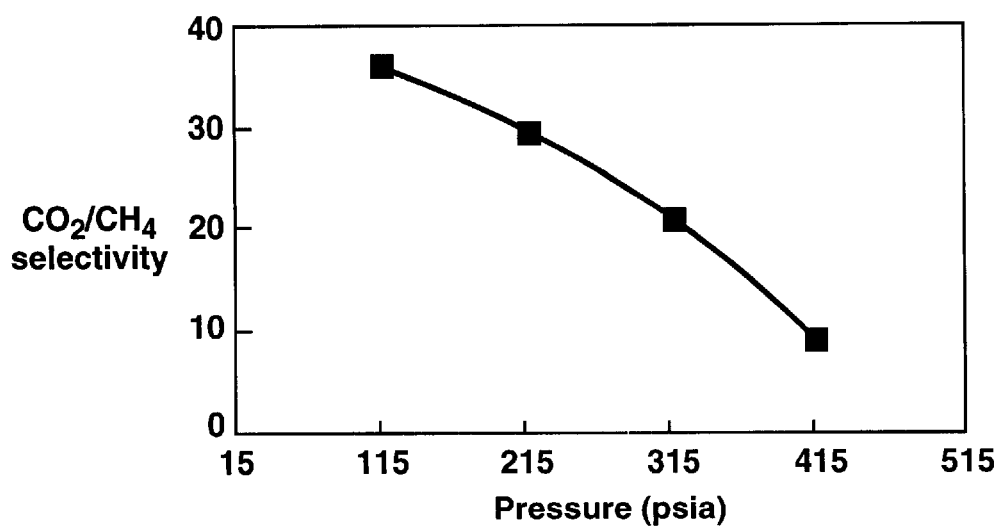
FIG. 25 is a graph of mixed-gas carbon dioxide/methane selectivity based on the mixed-gas data of FIG. 24.

The experiment of Example 22 was repeated, except at −20° C. at varying pressures. At −20° C., the saturation vapor pressure of carbon dioxide is about 285 psia. The gas fluxes were measured and the selectivities calculated. The results are shown in FIGS. 24 and 25, respectively. As can be seen in FIG. 24, the carbon dioxide flux increased only slightly from 94 GPU at 115 psia to 113 GPU at 215 psia. The flux then increased to 280 GPU at 315 psia, and then sharply to 1,430 GPU at 415 psia, indicating that the membrane had plasticized under the extreme conditions of low temperature and high pressure. FIG. 25 shows that, as a result, the carbon dioxide/methane selectivity decreased from 36 at 115 psia to 9 at 415 psia.

Example 24

Reversal of Plasticization in Hyflon® AD60 Membrane Module

The membrane stamps used in the experiments of Examples 22 and 23 had been tested for their pure-gas permeation properties before they were used under the high-pressure, low-temperature conditions that caused them to become severely plasticized. After the plasticization experiments had been completed, the membranes were retested with the same set of pure gases. The results of the tests are shown in Table 17.

TABLE 17

| Pressure-Normalized Flux (GPU) | | | | | | | | Selectivity (–) | | | |
|---|---|---|---|---|---|---|---|---|---|---|---|
| Before Test | | | | After Test | | | | Before Test | | After Test | |
| $O_2$ | $N_2$ | $CO_2$ | $CH_4$ | $O_2$ | $N_2$ | $CO_2$ | $CH_4$ | $O_2/N_2$ | $CO_2/CH_4$ | $O_2/N_2$ | $CO_2/CH_4$ |
| 55.0 | 17.2 | 135 | 4.1 | 47.8 | 14.5 | 137 | 6.5 | 3.2 | 19.0 | 3.3 | 21.0 |

As can be seen, the pre- and post-plasticization-test permeation properties are essentially the same, within the limits of experimental error. The Hyflon® membranes were able to regain their original permeation properties. Thus, the plasticization did not cause irreversible damage.

Example 25

Selectivity at Varying Saturation Levels and Partial Pressures

Figure 26:
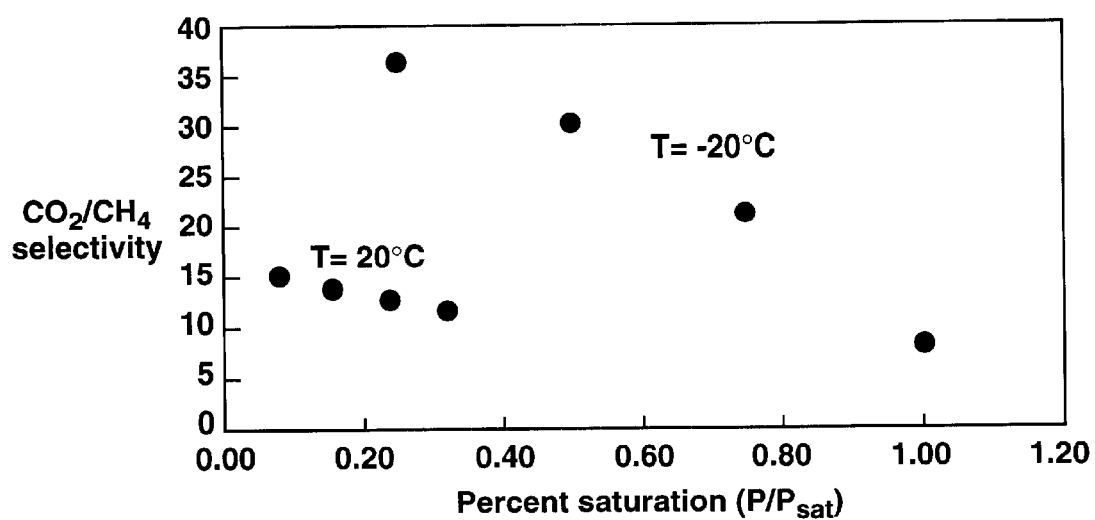
FIG. 26 is a graph of mixed-gas carbon dioxide/methane selectivity as a function of percent saturation of the gas mixture, based on the mixed-gas data of FIGS. 23 and 25.

Based on the data of Examples 22 and 23, the carbon dioxide/methane selectivity was calculated as a function of percent saturation, expressed as the ratio of pressure to saturation vapor pressure. The results are shown graphically in FIG. 26. As can be seen, at 20° C., the selectivity decreased slightly, from 15 to 12, over the saturation range. At –20° C., the selectivity decreased sharply from 36 at about 30% saturation to 9 as the gas mixture approached saturation.

Example 26

Mixed-Gas Nitrogen/Propylene Permeation Properties with Hyflon® and Cytop® Membranes Hyflon® and Cytop® membranes were prepared and membrane stamps were subjected to permeation experiments using the same general procedure as in Example 1. The temperature was 23° C., the pressure was 165 psia, and the feed gas mixture contained 90% nitrogen and 10% propylene. The saturation vapor pressure of propylene at 23° C. is about 160 psia, so the gas mixture was only about 10% saturated. The pressure-normalized fluxes of nitrogen and propylene were measured, and the nitrogen/propylene selectivities were calculated. The results are shown in Table 18.

TABLE 18

| | Mixed-Gas Pressure-Normalized Flux (GPU) | | $N_2/C_3H_6$ |
|---|---|---|---|
| Membrane | $N_2$ | $C_3H_6$ | Selectivity (–) |
| Hyflon ® AD60 | 50 | 4.5 | 11 |
| Hyflon ® AD80 | 167 | 17.8 | 9.4 |
| Cytop ® | 30 | 2.3 | 13 |

Example 27

Comparative Example of Mixed-Gas Nitrogen/Propylene Permeation Properties with Teflon® AF 2400 Membranes—Not in Accordance with the Invention Teflon® AF 2400 membranes were prepared and subjected to permeation experiments using the same general procedure as in Example 7. The temperature was 22° C., the pressure was 165 psia, and the feed gas mixture was 90% nitrogen and 10% propylene. Again, the saturation vapor pressure of propylene at 22° C. is about 160 psia, so the gas mixture was only about 10% saturated. The pressure-normalized fluxes of nitrogen and propylene were measured, and the nitrogen/propylene selectivity was calculated. The results are shown in Table 19.

TABLE 19

| Mixed-Gas Pressure-Normalized Flux (GPU) | | Selectivity (–) |
|---|---|---|
| $N_2$ | $C_3H_6$ | $N_2/C_3H_6$ |
| 151 | 176 | 0.85 |

As can be seen by comparing Examples 26 and 27, the membranes of the invention provided exceptionally high nitrogen/propylene selectivities that ranged from about 9 to 13. In contrast, the Teflon® AF 2400 membranes were essentially unselective, but slightly favored permeation of ethylene over nitrogen.

Examples 28–31

Comparison of Olefin/Paraffin Separation using Hyflon® AD60 Membranes (According to the Invention) and Polyimide Membranes (Not in Accordance with the Invention)

Example 28

Olefin/Paraffin Separation Properties with a Hyflon® AD60 Membrane Module

The spiral-wound Hyflon® AD60 module prepared in Example 19 above was tested with a gas mixture comprising approximately 60% propylene and 40% propane at 30° C. at pressures ranging from 65 to 165 psia. The saturation vapor pressure of the gas mixture at 30° C. is about 177 psia; thus, at the highest pressure tested, the gas mixture was near saturation. The measured pressure-normalized propylene fluxes are shown graphically in FIG. 27. The calculated propylene/propane selectivities are shown graphically in FIG. 28.

Figure 27:
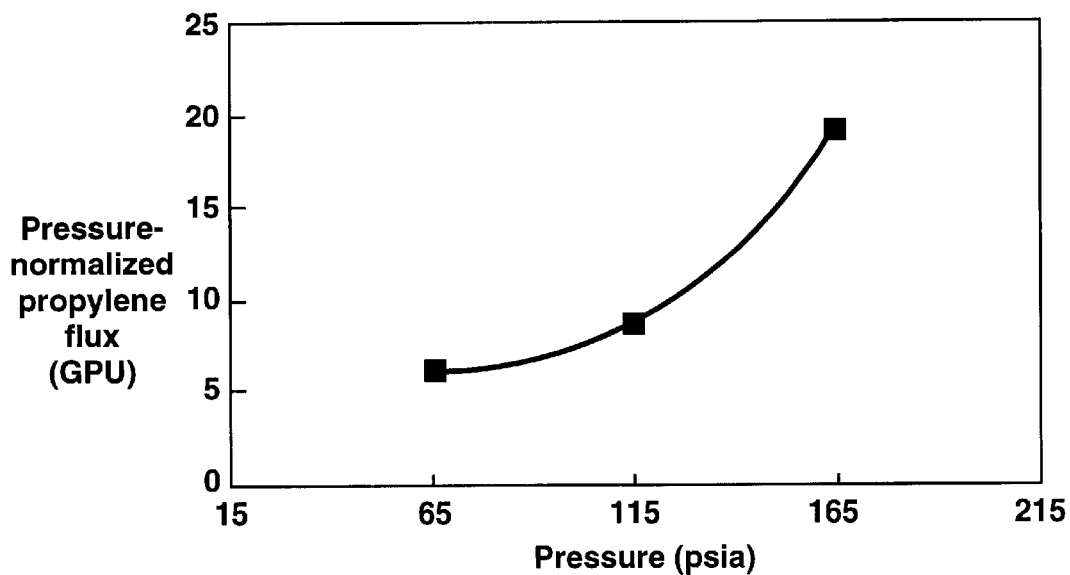
FIG. 27 is a graph of pressure-normalized mixed-gas flux of propylene as a function of pressure for a spiral-wound module containing Hyflon® AD 60 membranes.
Figure 28:
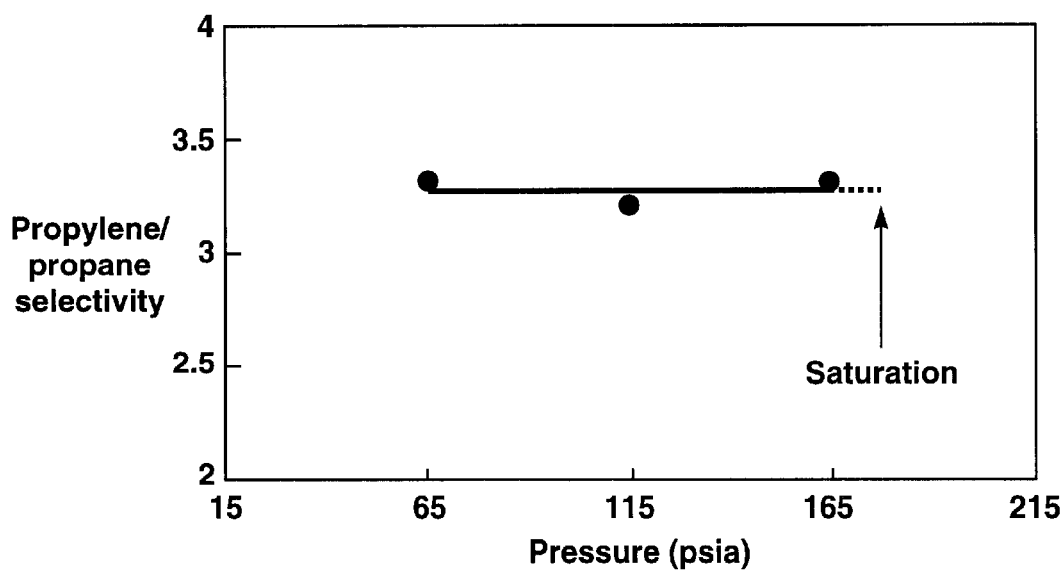
FIG. 28 is a graph of mixed-gas propylene/propane selectivity based on the mixed-gas data of FIG. 27.

As can be seen in FIG. 27, the propylene flux increased from about 6 GPU at 65 psia, to about 9 GPU at 115 psia, and to about 19 GPU at 165 psia. As shown in FIG. 28, the propylene/propane selectivities remained essentially constant in the range 3.0 to 3.3 across the range of pressures.

Figure 29:
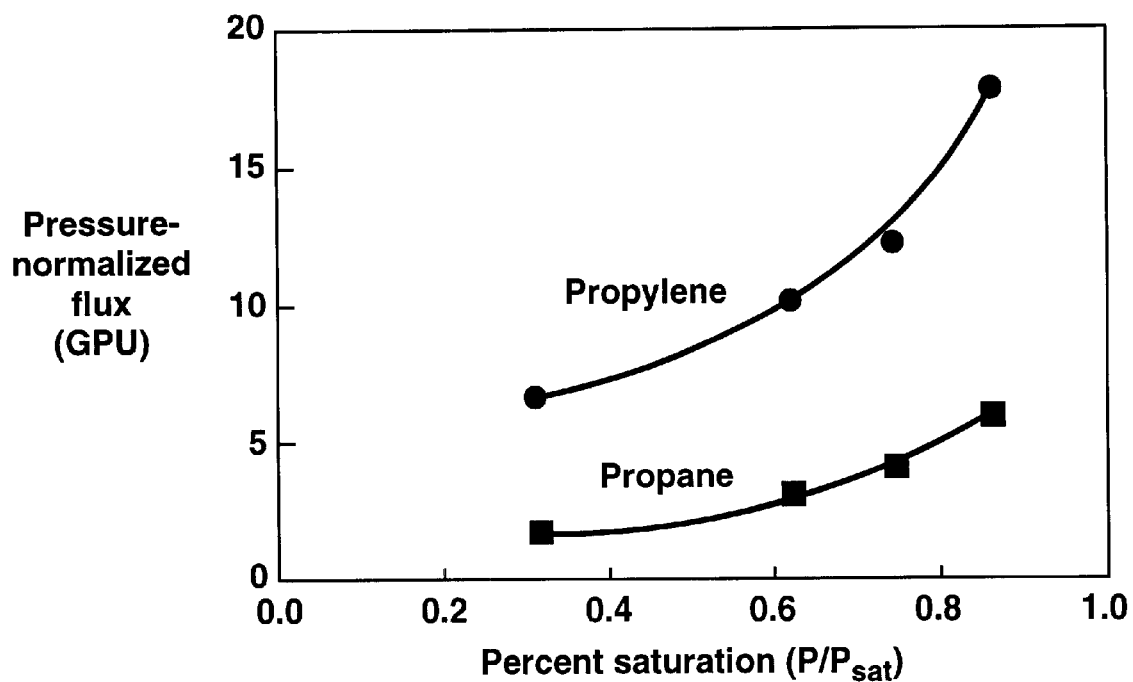
FIG. 29 is a graph of pressure-normalized mixed-gas fluxes of propylene and propane as a function of percent saturation of the gas mixture for a spiral-wound module containing Hyflon® AD 60 membranes.

Another spiral-wound module prepared as in Example 19 was subjected to the same tests and yielded very similar results. The propylene and propane fluxes are shown in FIG. 29 as a function percent saturation, expressed as the ratio of pressure to saturation vapor pressure. As can be seen, the fluxes increased only gradually, and remained essentially stable up to about 80% saturation.

Example 29

Olefin/Paraffin Separation Properties with a Polyimide Membrane Module

Asymmetric, microporous poly(vinylidene fluoride) [PVDF] support membranes were prepared. Composite membranes were prepared using a coating solution of 1 wt % of the polyimide poly(3,4,3',4'-biphenyltetracarboxylic dianhydride-2,4,6-m-phenylenediamine) [BPDA-TMPD] in a hexafluoropropanol/chloroform solvent.

Figure 30:
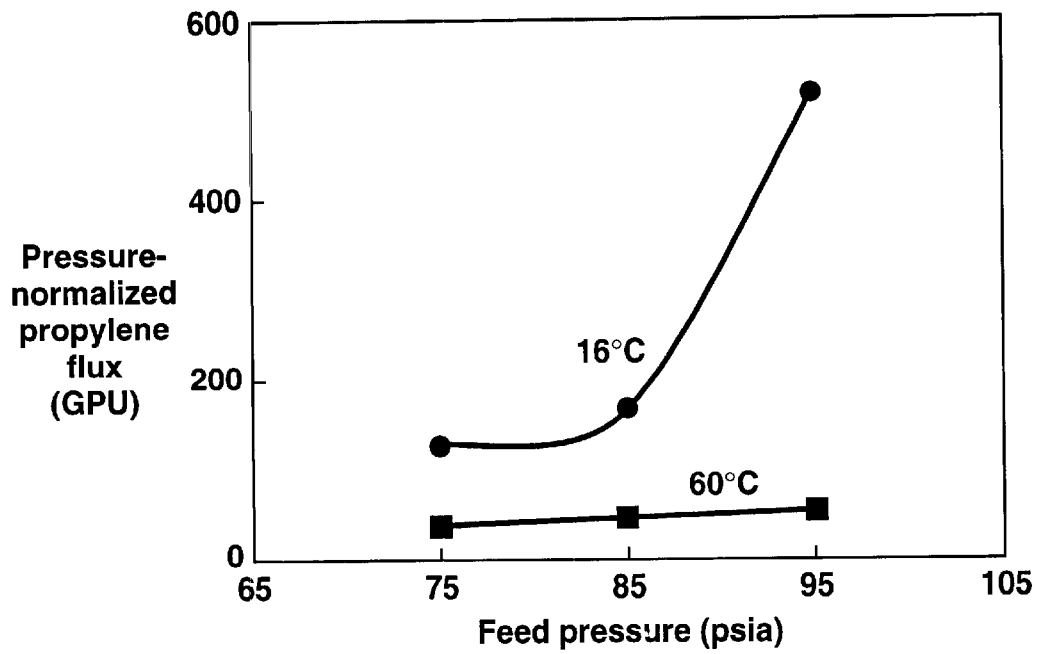
FIG. 30 is a graph of pressure-normalized mixed-gas flux of propylene as a function of pressure for a spiral-wound module containing BPDA-TMPD polyimide membranes.
Figure 31:
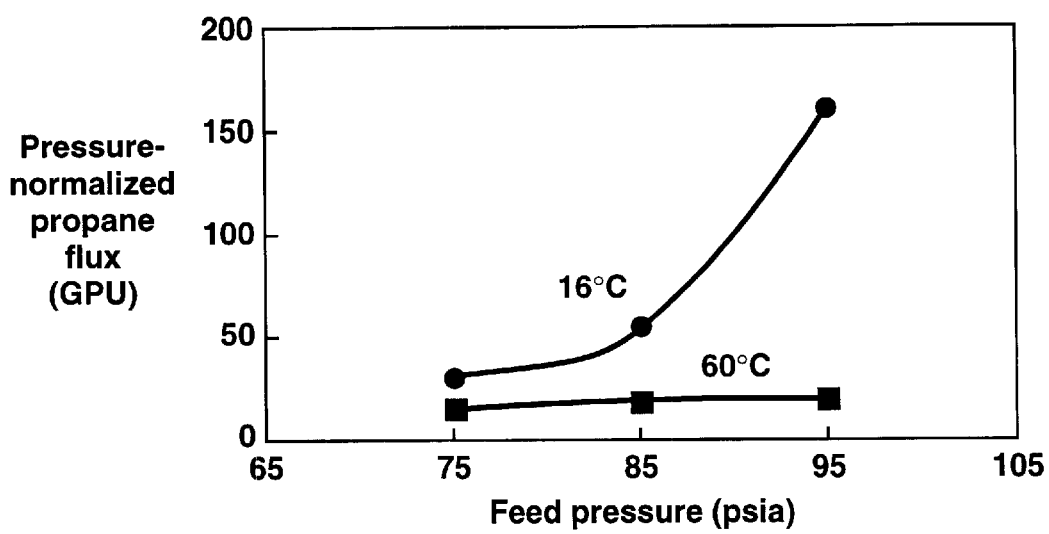
FIG. 31 is a graph of pressure-normalized mixed-gas flux of propane as a function of pressure for a spiral-wound module containing BPDA-TMPD polyimide membranes.

The support membranes were dip-coated in the BPDA-TMPD solution at 0.5 ft/min coating speed, then dried in an oven at 100° C. for 30 minutes. The resulting membranes had a selective layer approximately 0.2 µm thick. The membranes were rolled into a spiral-wound module, which was tested in a module test apparatus with pure oxygen and nitrogen to determine the integrity of the membrane. The module was then subjected to experiments at 16° C. and 60° C. at 75–95 psia. The feed gas mixture was approximately 60% propylene and 40% propane. The saturation vapor pressure of the gas mixture at 16° C. is about 125 psia, and at 60° C. is about 350 psia; thus, at the highest pressure tested, 95 psia, the gas mixture was about 76% saturated at 16° C., and about 27% saturated at 60° C. The pressure-normalized gas fluxes were measured. The results are presented in FIGS. 30 and 31, graphs of the propylene and propane fluxes, respectively, as a function of feed pressure at the two temperatures. For both gases at the lower temperature, the fluxes increased sharply above 85 psia, that is, above about 68% saturation. Because the increases in the gas fluxes were proportionate, the calculated selectivities remained between about 2.5 to 4 across the pressure range.

Example 30

Recovery of Separation Properties in a Polyimide Membrane Module

The BPDA-TMPD membrane module used in Example 29 was operated continuously for eight days in the module test apparatus with a 60% propylene/40% propane gas mixture at 65 psia and 30° C. At the end of this time, the module was retested with pure oxygen and nitrogen. A BPDA-TMPD membrane stamp, which was also subjected to the tests of Example 29, was tested with pure oxygen and nitrogen for comparison. The gas fluxes were measured and the selectivities calculated. The results are summarized in Table 20.

TABLE 20

| | Pressure-Normalized Flux (GPU) | | | | Selectivity (–) | |
|---|---|---|---|---|---|---|
| | Before Test | | After Test | | Before Test | After Test |
| Configuration | $O_2$ | $N_2$ | $O_2$ | $N_2$ | $O_2/N_2$ | $O_2/N_2$ |
| Stamp | 22.9 | 4.3 | 5.5 | 2.0 | 5.3 | 2.8 |
| Module | 6.0 | 1.1 | 4.7 | 2.3 | 5.6 | 2.0 |

The stamp and module oxygen/nitrogen selectivities were comparable prior to the tests. After the tests, the oxygen/nitrogen selectivities decreased significantly in both configurations. The results indicate that the damage done to the polyimide membranes as a result of long-term exposure to the hydrocarbons was irreversible.

Examples 31–33

Comparison of Nitrogen/VOC Permeation Properties using Hyflon® AD60 Membranes (According to the Invention) and Polyimide Membranes (Not in Accordance with the Invention)

Example 31

Nitrogen/Dimethylethylamine Mixed-Gas Separation Properties

Hyflon® AD60 membranes were prepared as in Example 11, and membrane stamps were subjected to permeation experiments using the same general procedure as in Example 1. The temperature was 21° C., the pressure was 65 psia, and the feed gas mixture contained dimethylethylamine (DMEA) in varying concentrations from 3.2–16.6% (16.6% is saturation) and the balance nitrogen. The pressure-normalized fluxes of DMEA and nitrogen were measured, and the nitrogen/DMEA selectivities at the varying DMEA concentrations were calculated. The results are shown in Table 21.

TABLE 21

| DMEA Concentration | Mixed-Gas Pressure-Normalized Flux (GPU) | | $N_2$/DMEA Selectivity |
|---|---|---|---|
| (%) | $N_2$ | DMEA | (–) |
| 3.2 | 10.4 | 0.06 | 163 |
| 7.5 | 9.5 | 0.08 | 115 |
| 13.5 | 9.1 | 0.13 | 73 |
| 16.6 | 8.8 | 0.15 | 60 |

Figure 32:
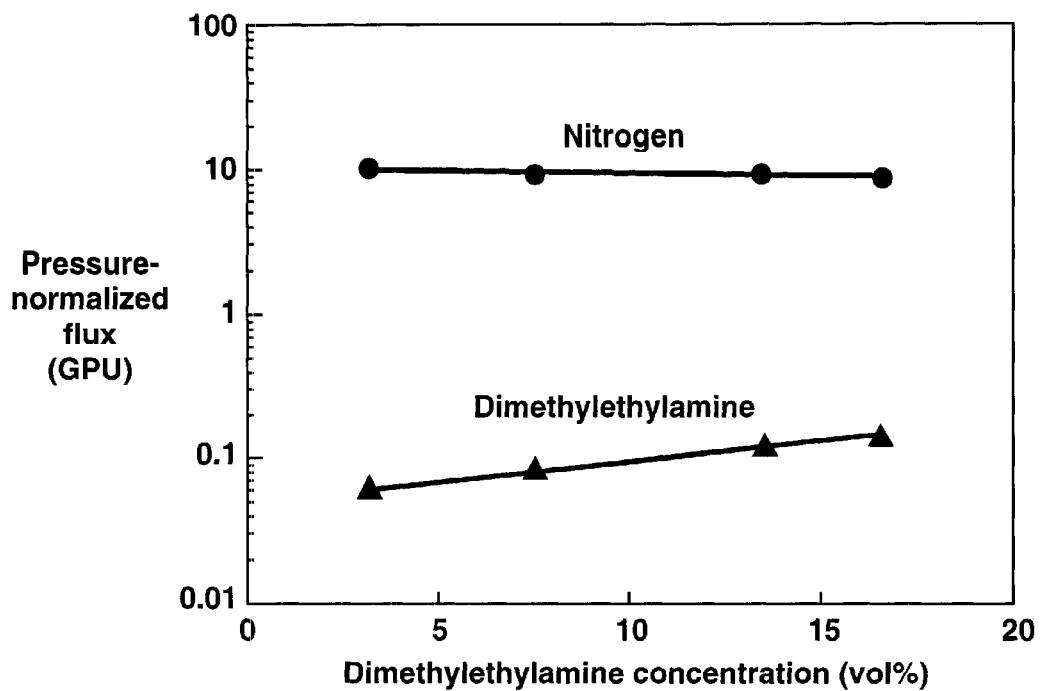
FIG. 32 is a graph of pressure-normalized mixed-gas flux of nitrogen and dimethylethylamine as a function of dimethylethylamine concentration for composite membranes having Hyflon® AD 60 selective layers.
Figure 33:
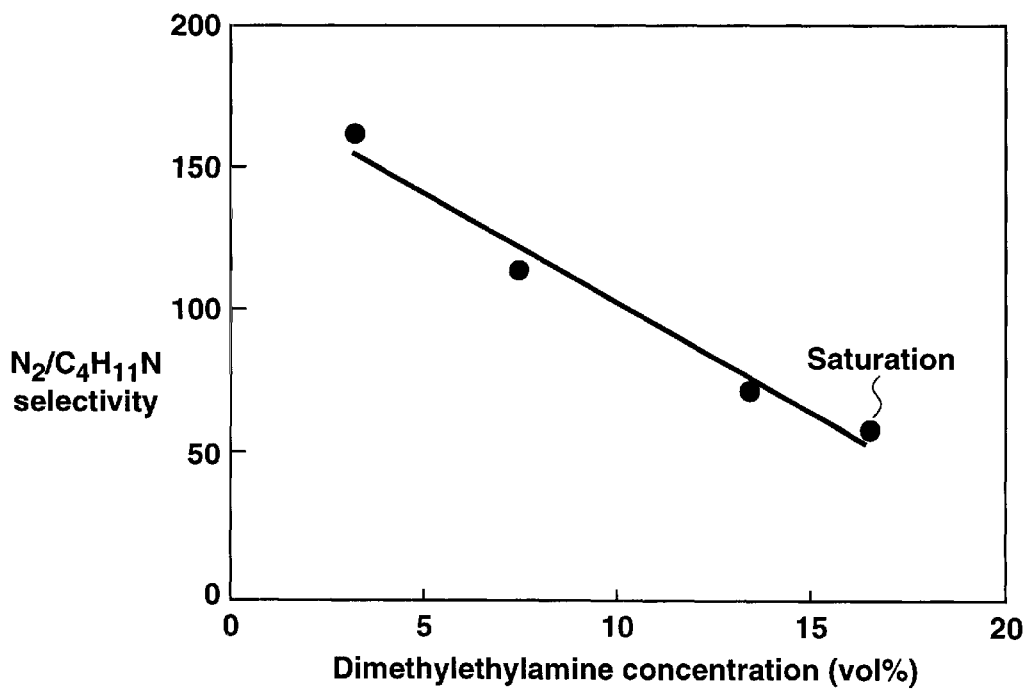
FIG. 33 is a graph of mixed-gas nitrogen/dimethylethylamine selectivity based on the mixed-gas data of FIG. 32.

FIGS. 32 and 33 are graphs showing the measured pressure-normalized fluxes and the calculated selectivities, respectively. As can be seen in FIG. 32, the nitrogen flux remained nearly constant over the range of DMEA concentrations; the DMEA flux increased as the DMEA concentration increased. As a result, the nitrogen/DMEA selectivity decreased as the DMEA concentration increased, as shown in FIG. 33. The membranes retained acceptable flux and selectivity even in the presence of DMEA at saturation.

Example 32

Nitrogen/Triethylamine Mixed-Gas Separation Properties

Hyflon® AD60 membranes were prepared as in Example 11, and membrane stamps were subjected to permeation experiments using the same general procedure as in Example 1. The temperature was 21° C., the pressure was 65 psia, and the feed gas mixture contained triethylamine (TEA) in varying concentrations from 0.7–1.9% (1.9% is saturation) and the balance nitrogen. The pressure-normalized fluxes of TEA and nitrogen were measured, and the nitrogen/TEA selectivities at the varying TEA concentrations were calculated. The results are shown in Table 22.

TABLE 22

| TEA Concentration | Mixed-Gas Pressure-Normalized Flux (GPU) | | $N_2$/TEA Selectivity |
|---|---|---|---|
| (%) | $N_2$ | TEA | (–) |
| 0.7 | 17.5 | 0.08 | 220 |
| 1.6 | 16.6 | 0.11 | 151 |
| 1.7 | 16.2 | 0.28 | 58 |
| 1.9 | 15.8 | 0.25 | 63 |

Figure 34:
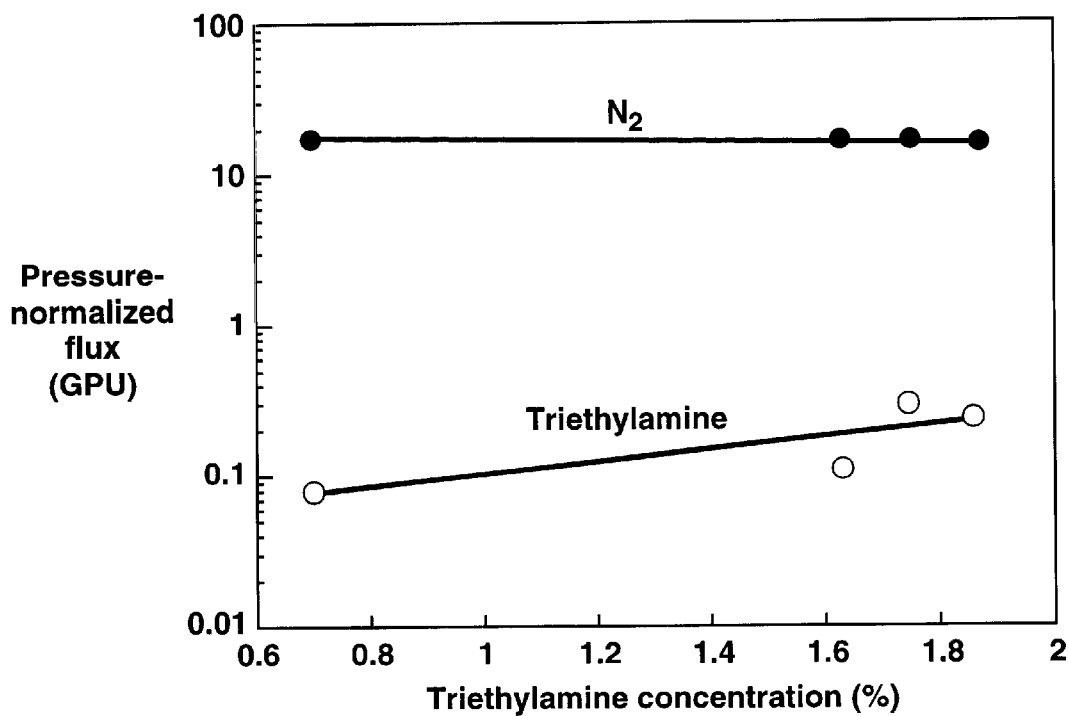
FIG. 34 is a graph of pressure-normalized mixed-gas flux of nitrogen and triethylamine as a function of triethylamine concentration for composite membranes having Hyflon® AD 60 selective layers.
Figure 35:
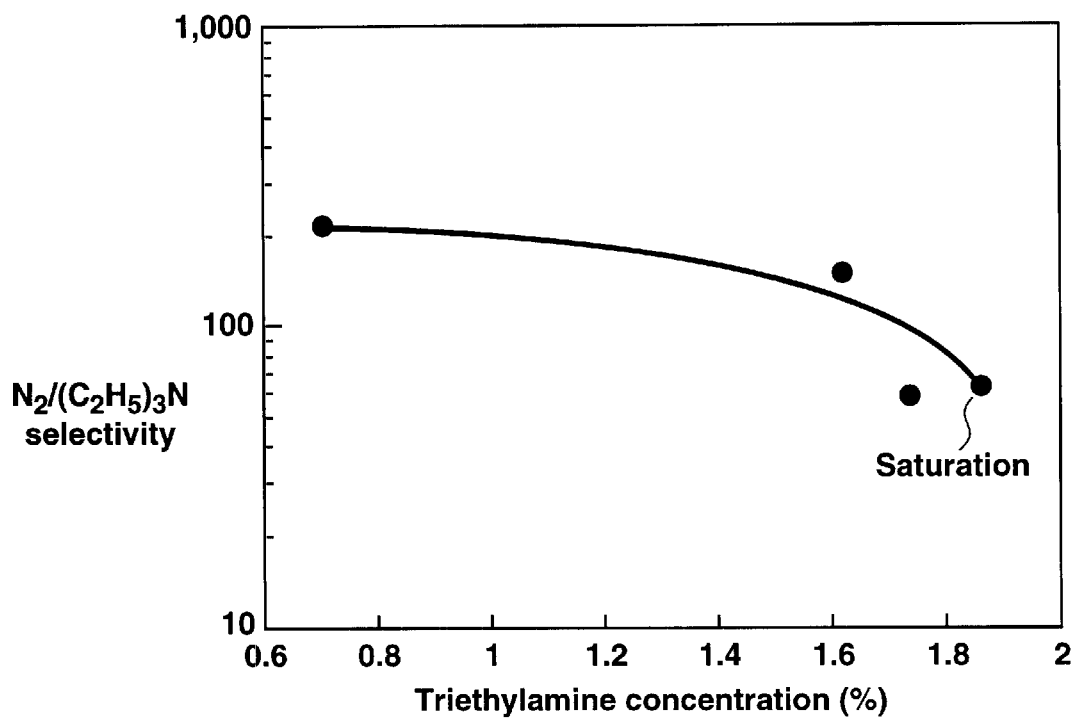
FIG. 35 is a graph of mixed-gas nitrogen/triethylamine selectivity based on the mixed-gas data of FIG. 34.

FIGS. 34 and 35 are graphs showing the measured pressure-normalized fluxes and the calculated selectivities, respectively. As can be seen in FIG. 34, the nitrogen flux remained nearly constant over the range of TEA concentrations; the TEA flux increased as the TEA concentration increased. As a result, the nitrogen/TEA selectivity decreased as the TEA concentration increased, as shown in FIG. 35. Again, the membranes retained acceptable flux and selectivity even in the presence of TEA at saturation.

Example 33

Comparative Example with Polyimide Membrane

A polyimide membrane (BPDA-TMPD) was prepared as in Example 29, and membrane stamps were subjected to permeation experiments using the same general procedure as in Example 1. The temperature was 22° C., the pressure was 65 psia, and the feed gas mixture contained 1.6% triethylamine (TEA) and 98.4% nitrogen. The pressure-normalized fluxes of TEA and nitrogen were measured, and the nitrogen/TEA selectivity was calculated. The results are shown in Table 23.

TABLE 23

| Mixed-Gas Pressure-Normalized Flux (GPU) | | $N_2$/TEA Selectivity |
|---|---|---|
| $N_2$ | TEA | (-) |
| 6.2 | 610 | 0.01 |

As can be seen, the polyimide membrane is clearly TEA-selective, in contrast to the membranes of the invention, which maintain useful nitrogen/TEA selectivities throughout the range of TEA concentrations.

Examples 34–36

Process Designs

Example 34

Hydrogen Recovery

Figure 36:
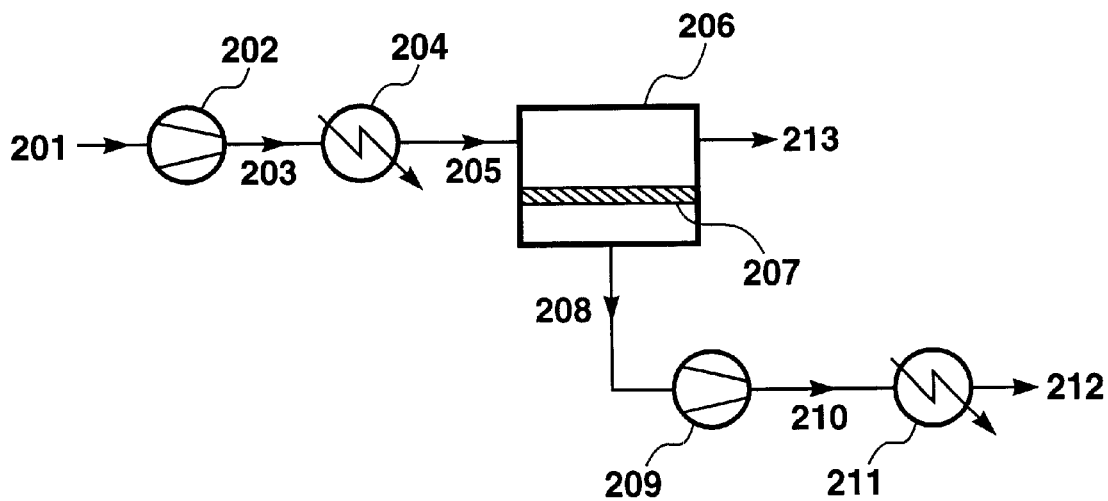
FIG. 36 is a schematic drawing of the process of the invention applied to treatment of refinery off-gas.

A computer calculation was performed with a modeling program, ChemCad V (ChemStations, Inc., Houston, Tex.), to illustrate the process of the invention as reflected in the recovery of hydrogen from refinery off-gas destined for the fuel header. The process was assumed to be carried out as shown in FIG. 36. Referring to this figure, refinery off-gas stream 201 at 200 psia passes to compressor 202 where it is compressed to 400 psia, stream 203. After passing through the compressor aftercooler, 204, the gas is passed as feed stream 205 to membrane separation unit 206. The membrane separation unit was assumed to contain membranes, 207, providing gas fluxes consistent with the membranes taught in the detailed description of the invention, for example, Hyflon® D AD60.

The flow rate of the raw off-gas was assumed to be 5 MMscfd, and the gas was assumed to contain 35% hydrogen, 5% nitrogen and 60% $C_1$–$C_6$ hydrocarbons, of which 15% were assumed to be $C_{3+}$ hydrocarbons. The raw gas was assumed to be at 200 psia and 33° C. The permeate side of the membrane was assumed to be at 20 psia. The results of the calculations are summarized in Table 24.

TABLE 24

| | Stream | | | | |
|---|---|---|---|---|---|
| | 201 | 205 | 208 | 212 | 213 |
| Flow (MMscfd) | 5 | 5 | 1.4 | 1.4 | 3.6 |
| Pressure (psia) | 200 | 400 | 20 | 200 | 400 |
| Temperature (° C.) | 33 | 60 | 60 | 40 | 63 |
| Dewpoint (° C.) | 33 | 49 | −76 | −49 | 58 |
| Component (vol %): | | | | | |
| Hydrogen | 35 | 35 | 90.0 | 90.0 | 13.6 |
| Methane | 30 | 30 | 6.5 | 6.5 | 39.1 |
| Ethane | 15 | 15 | 0.4 | 0.4 | 20.7 |
| Propane | 10 | 10 | 0.2 | 0.2 | 13.8 |
| n-Butane | 3 | 3 | <0.1 | <0.1 | 4.2 |

TABLE 24-continued

| | Stream | | | | |
|---|---|---|---|---|---|
| | 201 | 205 | 208 | 212 | 213 |
| n-Hexane | 2 | 2 | <0.1 | <0.1 | 2.8 |
| Nitrogen | 5 | 5 | 2.9 | 2.9 | 5.8 |

The hydrogen-rich permeate stream, 208, is withdrawn from the membrane unit and passes to compressor 209, where it is recompressed to 200 psia, stream 210. After passing through the compressor aftercooler, 211, the hydrogen product stream emerges as stream 212 for use as a hydrogen source in the refinery. Obviously, if the hydrogen were not needed at pressure, the second compressor could be omitted. The residue stream, 213, now at close to its dewpoint, is withdrawn from the feed side of the membrane unit. This stream is reduced in volume from 5 MMscfd to 3.6 MMscfd and in hydrogen content from 35% to 14%, and would be suitable for sending to the fuel header. The process of the invention recovers about 70% of the hydrogen originally in the raw off-gas in reusable form.

Example 35

Carbon Dioxide Removal/Hydrocarbon Recovery

A computer calculation was performed with a modeling program, ChemCad V (ChemStations, Inc., Houston, Tex.), to illustrate the process of the invention for the recovery of carbon dioxide, pipeline gas, and natural gas liquids from associated gas produced by oilfield flood operations. It was assumed that the process involved treatment of the raw associated gas by Hyflon® AD60 membranes, followed by treatment of the remaining hydrocarbon-rich gas by membranes selective for the heavier hydrocarbons over methane. In this way, the process was able to deliver three product streams: a carbon dioxide stream suitable for reinjection into the formation; a natural gas liquids (NGL) stream; and a light methane-rich stream, containing only 4% carbon dioxide, suitable for acceptance into a natural gas pipeline. The flow rate of the raw associated gas was assumed to be 20 MMscfd, and the gas was assumed to be of the following composition:

| Carbon Dioxide | 60.0% |
|---|---|
| Methane | 23.5% |
| Ethane | 7.0% |
| Propane | 6.0% |
| n-Butane | 3.0% |
| n-Pentane | 0.5% |

Figure 37:
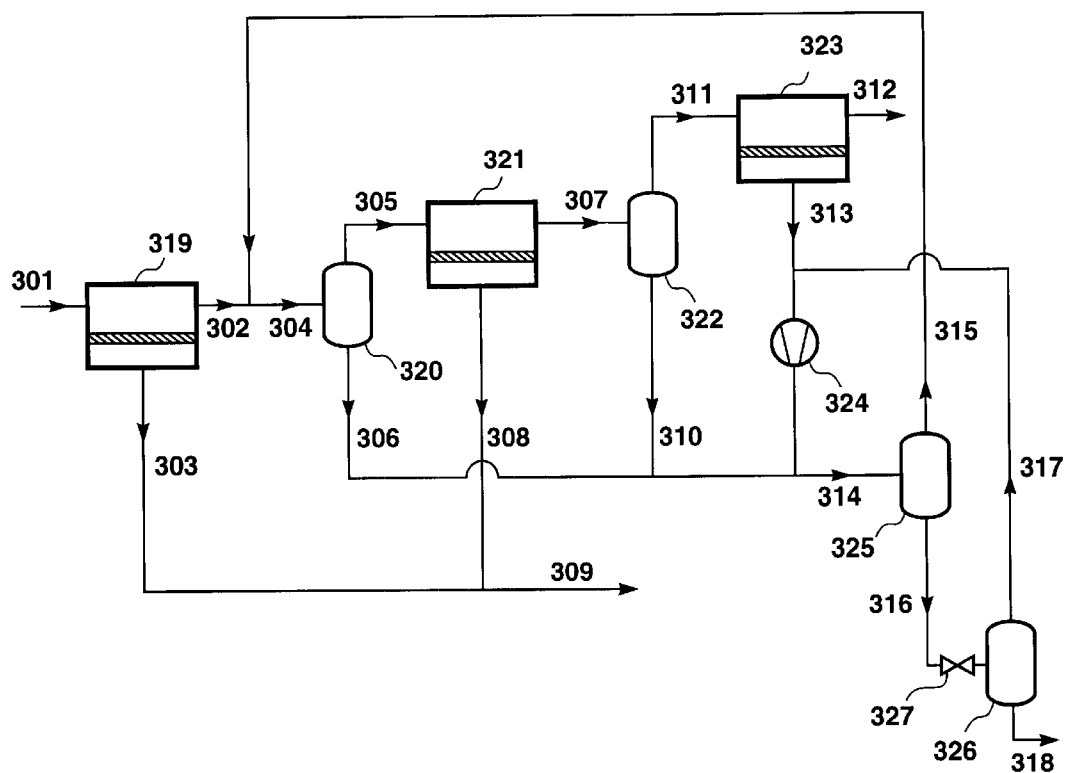
FIG. 37 is a schematic drawing of the process of the invention applied to treatment of an olefin/paraffin mixture from a petrochemical manufacturing plant.

The process was assumed to be carried out as shown in FIG. 37. Referring to this figure, gas stream 301 at 415 psia is passed as the feed stream to the first membrane separation unit, 319, which was assumed to contain membranes as in Example 34. Carbon dioxide permeates the membrane preferentially to produce permeate stream 303, which contains almost 97% carbon dioxide and is suitable for reinjection. As a result of removal of carbon dioxide, the first residue stream, 302, is enriched in hydrocarbons, thereby taking the hydrocarbon content beyond the dewpoint and creating a two-phase mixture. Stream 302 is mixed with the light-hydrocarbon-enriched off-gas, stream 315, from separator 325. The mixed stream, 304, is passed to the first phase separator, 320, from which is withdrawn a small liquid hydrocarbon stream, 306. The separator overhead stream, 305, is passed to the second membrane separation unit, 321, which was assumed to contain the same membranes as in membrane unit 319. The second residue stream, 307, is passed to the second phase separator, 322, from which is withdrawn an additional liquid hydrocarbon stream, 310. The second permeate stream, 308, is mixed with first permeate stream, 303, to form carbon dioxide-enriched stream 309 for reinjection. The second separator overhead stream, 311, is passed to the third membrane separation unit, 323, which was assumed to contain silicone rubber membranes. Methane-enriched residue stream 312 may be passed to the pipeline directly or after additional treatment. Permeate stream 313 is mixed with overhead stream 317 and recompressed in compressor 324. This stream is mixed with $C_{2+}$-hydrocarbon-enriched streams 306 and 310, and passed as stream 314 to the third separator, 325. The separator overhead stream, 315, is recirculated to the first residue stream for additional hydrocarbon recovery. The $C_{2+}$-hydrocarbon-enriched bottoms stream, 316, is lowered in pressure through valve 327 and passed to the fourth separator, 326, from which is withdrawn a natural gas liquids product stream, 318. The separator overhead stream, 317, is mixed with the third permeate stream for additional hydrocarbon recovery.

The results of the calculations are shown in Table 25.

process. The feed gas was assumed to be at 150 psia and 25° C. The results of the calculations are summarized in Table 26.

TABLE 26

| | Stream | | |
|---|---|---|---|
| | 1 | 4 | 5 |
| Mass Flow (lb/h) | 3,724 | 540 | 3,184 |
| Pressure (psia) | 150 | 150 | 15 |
| Temperature (° C.) | 25 | 24 | 25 |
| Component (lb/h) | | | |
| Propane | 773 | 307 | 467 |
| Propylene | 2,951 | 234 | 2,717 |
| Component (mol %): | | | |
| Propane | 20.0 | 55.6 | 14.1 |
| Propylene | 80.0 | 44.4 | 85.9 |

Membrane area=2,598 $m^2$

We claim:

1. A process for separating a desired gas from a gas mixture comprising the desired gas and a $C_{3+}$ hydrocarbon vapor, the process comprising the steps of:
  (a) passing the gas mixture across the feed side of a separation membrane having a feed side and a permeate

TABLE 25

| Stream | 301 | 302 | 303 | 304 | 305 | 306 | 307 | 308 | 309 | 310 | 311 | 312 | 313 | 314 | 315 | 316 | 317 | 318 |
|---|---|---|---|---|---|---|---|---|---|---|---|---|---|---|---|---|---|---|
| Gas Flow (MMscfd) | 20 | 15.2 | 4.8 | 20.6 | 20.6 | — | 12.3 | 8.3 | 13.1 | — | 11.3 | 5.4 | 5.9 | — | 5.4 | — | 1.1 | — |
| Liquid Flow (bpsd) | — | — | — | — | — | 17.5 | — | — | — | 667 | — | — | — | 1,634 | — | 1,687 | — | 1,070 |
| Flow (lbmol/h) | 2,196 | 1,668 | 528 | 2,262 | 2,259 | 3.0 | 1,352 | 907 | 1,435 | 112 | 1,241 | 591 | 650 | 884 | 594 | 289 | 119 | 170 |
| Pressure (psia) | 415 | 415 | 20 | 415 | 415 | 415 | 415 | 20 | 20 | 415 | 415 | 415 | 20 | 415 | 415 | 415 | 20 | 20 |
| Temperature (° F.) | 68 | 58 | 63 | 59 | 59 | 59 | 66 | 62 | 63 | 66 | 66 | 22 | 44 | 66 | 63 | 63 | −62 | −62 |
| Component (mol %): | | | | | | | | | | | | | | | | | | |
| Carbon Dioxide | 60.0 | 48.4 | 96.7 | 39.5 | 39.5 | 17.3 | 8.2 | 86.2 | 90.0 | 3.4 | 8.6 | 4.0 | 12.8 | 11.6 | 14.4 | 6.0 | 13.0 | 1.1 |
| Methane | 23.5 | 30.1 | 2.6 | 32.2 | 32.2 | 6.4 | 47.1 | 9.9 | 7.2 | 9.9 | 50.5 | 69.7 | 33.0 | 28.0 | 37.9 | 7.8 | 18.6 | 0.3 |
| Ethane | 7.0 | 9.1 | 0.5 | 14.4 | 14.4 | 12.6 | 22.2 | 2.7 | 1.9 | 18.8 | 22.5 | 17.9 | 26.5 | 27.8 | 29.2 | 25.0 | 43.3 | 12.2 |
| Propane | 6.0 | 7.8 | 0.2 | 9.8 | 9.8 | 25.4 | 15.7 | 0.9 | 0.7 | 34.0 | 14.1 | 7.0 | 20.5 | 22.5 | 15.3 | 37.3 | 22.8 | 47.5 |
| n-Butane | 3.0 | 3.9 | 0.1 | 3.7 | 3.7 | 28.0 | 6.0 | 0.2 | 0.2 | 27.7 | 4.0 | 1.3 | 6.5 | 8.6 | 3.0 | 20.2 | 2.2 | 32.9 |
| n-Pentane | 0.5 | 0.7 | --- | 0.5 | 0.5 | 10.3 | 0.9 | --- | --- | 6.3 | 0.4 | 0.1 | 0.7 | 1.3 | 0.2 | 3.6 | 0.1 | 6.0 |

--- = less than 0.1
Membrane area = 1,000 + 4,350 $m^2$ (Hyflon ® AD60) + 419 $m^2$ (Silicone rubber)
Horsepower requirement (theoretical) = 1,092 hp The 20 MMscfd of raw associated gas entering the system yields 13.1 MMscfd of carbon dioxide for reinjection, and 5.4 MMscfd of pipeline-quality natural gas. In addition, nearly 1,100 barrels per day (bpsd) of natural gas liquids (stream 318) are recovered.

Example 36

Olefin/Paraffin Separation

A computer calculation was performed with a modeling program, ChemCad V (ChemStations, Inc., Houston, Tex.), to illustrate the process of the invention for the separation of olefin/paraffin mixtures as might be necessary in a petrochemical manufacturing plant. The stream to be treated was assumed to contain 80% propylene and 20% propane. The membrane separation process was assumed to be carried out in a single stage as shown in FIG. 1. The membrane, 3, was assumed to be as in Example 34. Stream 1 is the feedstream, stream 4 is the propylene-depleted residue, and stream 5 is the propylene-enriched permeate, which may be recompressed if necessary and recycled to the manufacturing side, the separation membrane having a selective layer comprising a polymer having:
  (i) a ratio of fluorine to carbon atoms in the polymer greater than 1:1;
  (ii) a fractional free volume no greater than about 0.3; and
  (iii) a glass transition temperature of at least about 100° C.; and the separation membrane being characterized by a post-exposure selectivity for the desired gas over the $C_{3+}$ hydrocarbon vapor, after exposure of the separation membrane to liquid toluene and subsequent drying, that is at least about 65% of a pre-exposure selectivity for the desired gas over the $C_{3+}$ hydrocarbon vapor, as measured pre- and post-exposure with a test gas mixture of the same composition and under like conditions;
(b) providing a driving force for transmembrane permeation;
(c) withdrawing from the permeate side a permeate stream enriched in the desired gas compared to the gas mixture;

(d) withdrawing from the feed side a residue stream depleted in the desired gas compared to the gas mixture.

2. The process of claim 1, wherein the desired gas is chosen from the group consisting of hydrogen, nitrogen, oxygen, argon, carbon dioxide and organic compounds.

3. The process of claim 1, wherein the desired gas is hydrogen.

4. The process of claim 1, wherein the desired gas is nitrogen.

5. The process of claim 1, wherein the desired gas is methane.

6. The process of claim 1, wherein the desired gas is carbon dioxide.

7. The process of claim 1, wherein the desired gas is propylene.

8. The process of claim 1, wherein the $C_{3+}$ hydrocarbon vapor comprises a paraffin.

9. The process of claim 1, wherein the $C_{3+}$ hydrocarbon vapor comprises an olefin.

10. The process of claim 1, wherein the $C_{3+}$ hydrocarbon vapor comprises an aromatic compound.

11. The process of claim 1, wherein the $C_{3+}$ hydrocarbon vapor is chosen from the group consisting of halogenated compounds, amines, ketones and alcohols.

12. The process of claim 1, wherein the gas mixture further comprises methane.

13. The process of claim 1, wherein the desired gas is nitrogen and the gas mixture further comprises methane.

14. The process of claim 1, wherein the selective layer comprises a perfluorinated polymer.

15. The process of claim 1, wherein the selective layer comprises a polymer formed from a fluorinated dioxole monomer.

16. The process of claim 1, wherein the selective layer comprises a polymer formed from a fluorinated dioxolane monomer.

17. The process of claim 1, wherein the selective layer comprises a polymer formed from a fluorinated cyclically polymerizable alkyl ether.

18. The process of claim 1, wherein the selective layer comprises a perfluorinated polyimide.

19. The process of claim 1, wherein the selective layer comprises a copolymer.

20. The process of claim 1, wherein the selective layer comprises a copolymer formed from fluorinated dioxole and tetrafluoroethylene repeat units.

21. The process of claim 1, wherein the polymer has the formula:

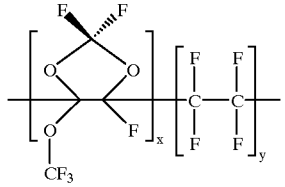

where x and y represent the relative proportions of the dioxole and the tetrafluoroethylene blocks, such that x+y=1.

22. The process of claim 1, wherein the selective layer comprises a polymer having the formula:

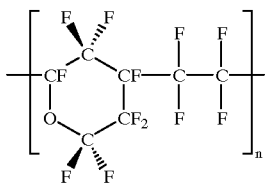

where n is a positive integer.

23. The process of claim 1, wherein the separation membrane is an integral asymmetric membrane.

24. The process of claim 1, wherein the separation membrane is a composite membrane comprising the selective layer supported on a microporous support membrane.

25. The process of claim 1, wherein the separation membrane comprises a composite membrane that comprises a support membrane, a gutter layer and the selective layer, the gutter layer forming a layer between the support membrane and the selective layer.

26. The process of claim 25, wherein the gutter layer comprises a copolymer of perfluoro-2,2-dimethyl-1,3-dioxole and tetrafluoroethylene.

27. The process of claim 1, wherein the gas mixture, as brought into contact with the feed side, has a total $C_{3+}$ hydrocarbons partial pressure of at least about 25 psia.

28. The process of claim 1, wherein the gas mixture contains at least about 5% $C_{3+}$ hydrocarbons.

29. The process of claim 1, wherein the gas mixture, as brought into contact with the feed side, has a pressure of at least about 30% of the saturation vapor pressure of the gas mixture.

30. The process of claim 1, wherein the post-exposure selectivity is at least about 70% of the pre-exposure selectivity.

31. A process for separating hydrogen from a gas mixture comprising hydrogen and a $C_{3+}$ hydrocarbon vapor, the process comprising the steps of:

(a) passing the gas mixture across the feed side of a separation membrane having a feed side and a permeate side, the separation membrane having a selective layer comprising a polymer having:

(i) a ratio of fluorine to carbon atoms in the polymer greater than 1:1;

(ii) a fractional free volume no greater than about 0.3; and (iii) a glass transition temperature of at least about 100° C.; and the separation membrane being characterized by a post-exposure selectivity for hydrogen over the $C_{3+}$ hydrocarbon vapor, after exposure of the separation membrane to liquid toluene and subsequent drying, that is at least about 65% of a pre-exposure selectivity for hydrogen over the $C_{3+}$ hydrocarbon vapor, as measured pre- and post-exposure with a test gas mixture of the same composition and under like conditions;

(b) providing a driving force for transmembrane permeation;

(c) withdrawing from the permeate side a permeate stream enriched in hydrogen compared to the gas mixture;

(d) withdrawing from the feed side a residue stream depleted in hydrogen compared to the gas mixture.

32. The process of claim 31, wherein the selective layer comprises a polymer formed from a fluorinated monomer chosen from the group consisting of dioxoles, dioxolanes, alkyl ethers and perfluorinated polyimides.

33. The process of claim 31, wherein the selective layer comprises a copolymer formed from fluorinated dioxole and tetrafluoroethylene repeat units.

34. The process of claim 31, wherein the polymer has the formula:

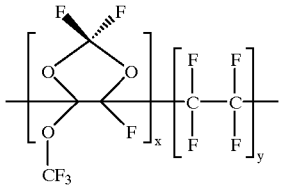

where x and y represent the relative proportions of the dioxole and the tetrafluoroethylene blocks, such that x+y=1.

35. The process of claim 31, wherein the separation membrane comprises the selective layer supported on a microporous support membrane.

36. The process of claim 31, wherein the gas mixture further comprises methane.

37. The process of claim 31, wherein the separation membrane exhibits a mixed-gas selectivity for hydrogen over methane as measured at the operating conditions of the process of at least about 10.

38. The process of claim 31, wherein the separation membrane exhibits a mixed-gas selectivity for hydrogen over propane as measured at the operating conditions of the process of at least about 50.

39. The process of claim 31, wherein the gas mixture is a refinery off-gas stream.

40. The process of claim 31, wherein the post-exposure selectivity is at least about 70% of the pre-exposure selectivity.

41. A process for separating propylene from a gas mixture comprising propylene and propane, the process comprising the steps of:
  (a) passing a gas mixture comprising propylene and propane across the feed side of a separation membrane having a feed side and a permeate side, the separation membrane having a selective layer comprising a polymer having:
    (i) a ratio of fluorine to carbon atoms in the polymer greater than 1:1;
    (ii) a fractional free volume no greater than about 0.3; and
    (iii) a glass transition temperature of at least about 100° C.; and the separation membrane being characterized by a post-exposure selectivity for propylene over propane, after exposure of the separation membrane to liquid toluene and subsequent drying, that is at least about 65% of a pre-exposure selectivity for propylene over propane as measured pre- and post-exposure with a test gas mixture of the same composition and under like conditions;
  (b) providing a driving force for transmembrane permeation;
  (c) withdrawing from the permeate side a permeate stream enriched in propylene compared to the gas mixture;
  (d) withdrawing from the feed side a residue stream depleted in propylene compared to the gas mixture.

42. The process of claim 41, wherein the selective layer comprises a polymer formed from a fluorinated monomer chosen from the group consisting of dioxoles, dioxolanes, alkyl ethers and perfluorinated polyimides.

43. The process of claim 41, wherein the selective layer comprises a copolymer formed from fluorinated dioxole and tetrafluoroethylene repeat units.

44. The process of claim 41, wherein the polymer has the formula:

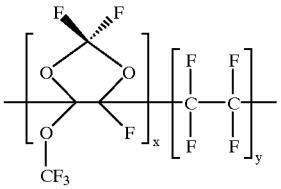

where x and y represent the relative proportions of the dioxole and the tetrafluoroethylene blocks, such that x+y=1.

45. The process of claim 41, wherein the separation membrane comprises the selective layer supported on a microporous support membrane.

46. The process of claim 41, wherein the separation membrane exhibits a mixed-gas selectivity for propylene over propane as measured at the operating conditions of the process of at least about 2.5.

47. The process of claim 41, wherein the post-exposure selectivity is at least about 70% of the pre-exposure selectivity.

* * * * *